(12) United States Patent
Sekiguchi

(10) Patent No.: US 7,397,575 B2
(45) Date of Patent: Jul. 8, 2008

(54) COMMUNICATION APPARATUS AND METHOD HAVING ELECTRONIC MAIL COMMUNICATION FUNCTION, AND PROGRAM

(75) Inventor: Kenzo Sekiguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 791 days.

(21) Appl. No.: 09/918,499

(22) Filed: Aug. 1, 2001

(65) Prior Publication Data

US 2002/0054335 A1   May 9, 2002

(30) Foreign Application Priority Data

Aug. 1, 2000   (JP)   .............................. 2000-233233
Aug. 1, 2001   (JP)   .............................. 2001-234089

(51) Int. Cl.
*G06F 15/00* (2006.01)

(52) U.S. Cl. ...................... 358/1.15; 358/405; 358/434; 382/203; 382/237; 709/200; 709/237; 709/238

(58) Field of Classification Search ................ 358/1.15, 358/405, 434; 709/200, 206, 238, 237; 382/203, 382/237
See application file for complete search history.

(56) References Cited

U.S. PATENT DOCUMENTS

| 6,094,277 | A | * | 7/2000 | Toyoda | ...................... 358/1.15 |
| 6,101,244 | A | * | 8/2000 | Okada | ................... 379/100.08 |
| 6,141,695 | A | | 10/2000 | Sekiguchi et al. | ........... 709/246 |
| 6,157,389 | A | * | 12/2000 | Knowlton | .................... 345/660 |
| 6,185,604 | B1 | | 2/2001 | Sekiguchi | .................... 709/206 |
| 6,243,174 | B1 | * | 6/2001 | Fukasawa | .................... 358/530 |
| 6,424,996 | B1 | * | 7/2002 | Killcommons et al. | ....... 709/206 |
| 6,825,955 | B1 | * | 11/2004 | Shibata | ........................ 358/402 |
| 6,868,183 | B1 | * | 3/2005 | Kodaira et al. | .............. 382/203 |
| 7,089,286 | B1 | * | 8/2006 | Malik | ......................... 709/206 |

FOREIGN PATENT DOCUMENTS

| EP | 0 898 410 A2 | 2/1999 |
| EP | 1 022 894 A2 | 7/2000 |
| JP | 11196218 A | * 7/1999 |

\* cited by examiner

*Primary Examiner*—Mark Zimmerman
*Assistant Examiner*—Peter K Huntsinger
(74) *Attorney, Agent, or Firm*—Fitzpatrick, Cella, Harper & Scinto

(57) ABSTRACT

There are provided a communication apparatus and method that enables the retransmission of an electronic mail if an error occurs in the transmission of the electronic mail due to its excessive data size, by reducing the data capacity of the electronic mail without taking time and labor, and a program for implementing the method. In a digital copying machine as the communication apparatus, when an electronic mail that notifies an error relating to an electronic mail transmitted with image data attached is received, the error notification electronic mail is analyzed. If an error that is attributable to the data capacity of the electronic mail is detected from the analysis result, the image data attached to the electronic mail for which the error notice has been received is acquired and the capacity of the image data is reduced by lowering its resolution. The electronic mail to which the image data thus reduced in capacity is attached is retransmitted.

23 Claims, 54 Drawing Sheets

```
************************************************************
* DOCUMENT RETRANSMISSION REPORT *
************************************************************
THE FOLLOWING DOCUMENT WAS NOT TRANSMITTED WITH
RESOLUTION LOWERED DUE TO THE SHORTAGE OF
STORAGE CAPACITY AT DESTINATION SIDE.

[ORIGINAL DOCUMENT INFORMATION]
MESSAGE ID: 199808171030. TAA20109@dsn.gp2dp.co.jp
TRANSMISSION DATE: P.M. 7:19, AUGUST 17, 1998
SENDER MAIL ADDRESS : sekiguti@dsn.gp2dp.co.jp
DESTINATION MAIL ADDRESS: suzuki@mailsrv.ip.co.jp
SUBJECT: Catalog materials for IFAX
NUMBER OF TRANSMITTED IMAGES: 1
READING RESOLUTION:600×600DPI
AUTOMATIC CONVERSION DESIGNATION MINIMUM RESOLUTION:  200×200DPI
READ DOCUMENT SIZE: A3
AUTOMATIC CONVERSION DESIGNATION MINIMUM DOCUMENT SIZE:
  [RETRANSMISSION INFORMATION]
TRANSMISSION DATE: P.M. 8:10, AUGUST 17, 1998
TRANSMISSION RESOLUTION: 400×400DPI
TRANSMITTED DOCUMENT SIZE: A3
NUMBER OF RETRANSMISSIONS: 1
```

FIG. 12

```
┌─ Email Address ──────────────────────────────────── 301
│                                                     302
│  From:    sekiguti@dsnmail.dsn.gp2dp.co.jp          303
│  To:      suzuki@mailsrv.ip.co.jp                   304
│  Subject: Catalog materials for IFAX
│  Comments: TO MR. SUZUKI OF XXX CORPORATION         305
│            FROM SEKIGUCHI OF YYY CORPORATION
│            WE SEND YOU A PIECE OF DOCUMENT
│            BY YOUR REQUEST.
└─────────────────────────────────────────────────────

┌──────────────────────────────────────── 306
│  ☑ 600×600 DPI    ☐ 200×400 DPI
│  ☐ 400×400 DPI    ☐ 200×200 DPI    ☑ COLOR(JPEG)
│  ☐ 300×300 DPI    ☐ 200×100 DPI
└──────────────────────────────────────── 309
┌─ Resolution Conversion Steup ────────── 307
│  ○ Disable           ● Available
│     ☐ 600×600 DPI    ☐ 200×400 DPI
│     ☑ 400×400 DPI    ☑ 200×200 DPI
│     ☐ 300×300 DPI    ☐ 200×100 DPI
└──────────────────────────────────────── 313
┌─ Document Size Conversion Setup ─────── 311
│  ○ Disable           ● Available
│     ☐ B4             ☐ Letter
│     ☐ Legal          ☐ B5
│     ☑ A4             ☐ A5
└────────────────────────────────────────
┌─ Retransmit Mode Steup ──────────────── 315
│  ☑ Retransmit inf. Store
│     ☑ Message ID Check
│     ☑ Document Delete After Tx.
│  Restransmit proc. priority:
│  ● Quality-of-image  ○ Document Size  ○ Page Binding
└──────────────────────────────────────── 324
┌─ Page boundray division Steup ───────── 322
│  ○ Disable           ● Available
└──────────────────────────────────────── 327
┌─ Maximum Tx Data Size Stup ──────────── 325
│  ○ Disable           ● Available
│  Up to:  [  4  ]  maga Byes
│  Decrement Data Size At ReTx: [ 1 ] Maga Byes
└──────────────────────────────────────── 329
┌─ Color Data Compression Rate Conversion Steup ─ 330
│  ○ Disable           ● Available
└──────────────────────────────────────── 332
┌─ Color → BW Conversion setup ────────── 333
│  ○ Disable           ● Available
└──────────────────────────────────────── 325
```

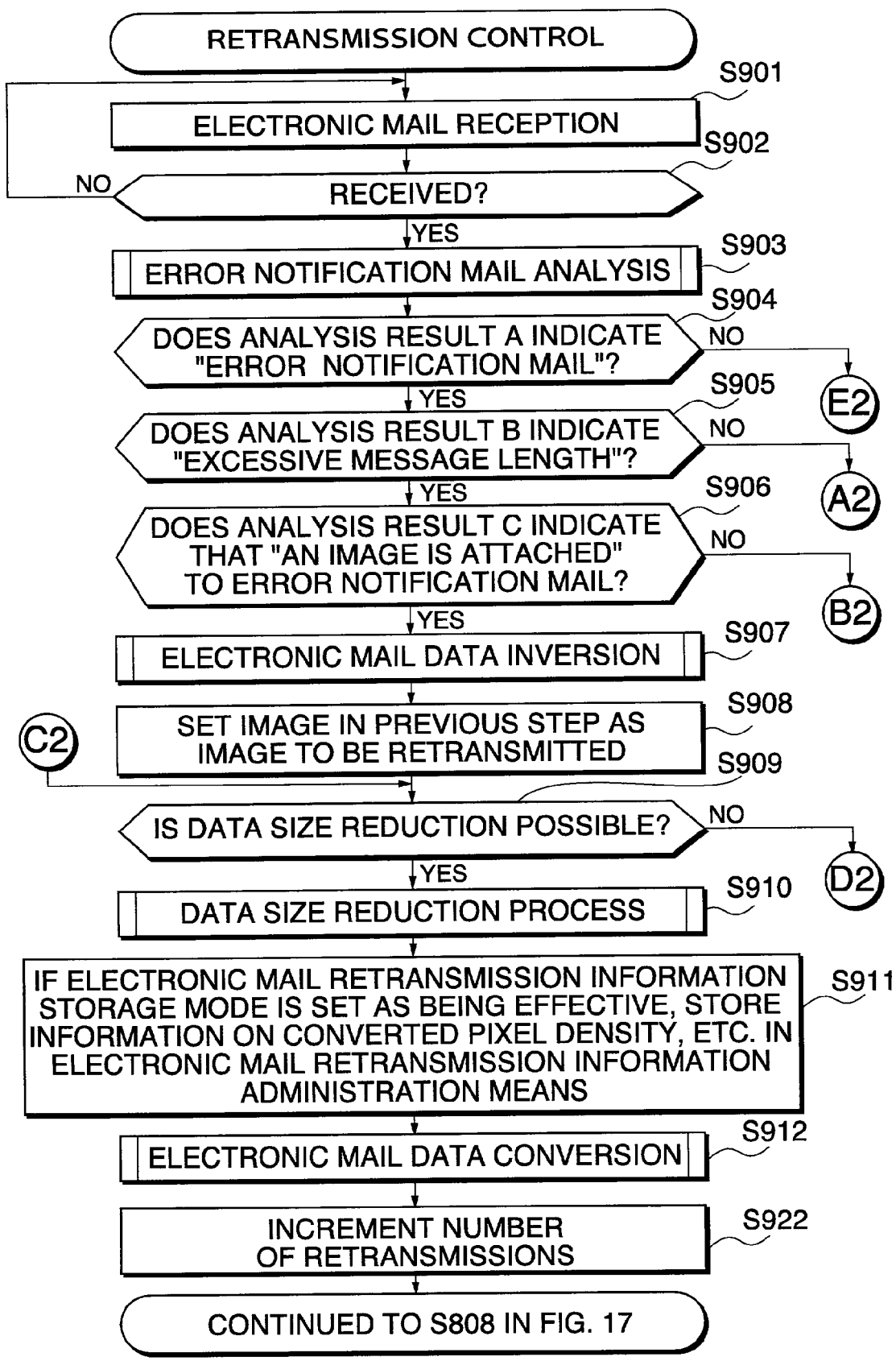

FIG. 36

```
***************************************
* DOCUMENT RETRANSMISSION REPORT *
***************************************

THE FOLLOWING DOCUMENT WAS NOT TRANSMITTED WITH
RESOLUTION LOWERED DUE TO THE SHORTAGE OF
STORAGE CAPACITY AT DESTINATION SIDE.

[ORIGINAL DOCUMENT INFORMATION]
MESSAGE ID: 19980817103. TAA20109@dsn.gp2dp.co.jp
TRANSMISSION DATE: P.M. 7:19, AUGUST 17, 1998
SENDER MAIL ADDRESS : sekiguti@dsn.gp2dp.co.jp
DESTINATION MAIL ADDRESS: suzuki@mailsrv.ip.co.jp
SUBJECT: Catalog materials for IFAX
NUMBER OF TRANSMITTED IMAGES: 1
READING RESOLUTION:600×600DPI
AUTOMATIC CONVERSION DESIGNATION MINIMUM RESOLUTION: 200×200DPI
READ DOCUMENT SIZE: A3
AUTOMATIC CONVERSION DESIGNATION MINIMUM DOCUMENT SIZE:

[RETRANSMISSION INFORMATION]
TRANSMISSION DATE: P.M. 8:10, AUGUST 17, 1998
TRANSMISSION RESOLUTION: 400×400DPI
TRANSMITTED DOCUMENT SIZE: A3
NUMBER OF RETRANSMISSIONS: 1
```

*FIG. 37*

```
**************************************
* DOCUMENT RETRANSMISSION ERROR REPORT *
**************************************

THE FOLLOWING DOCUMENT WAS NOT TRANSMITTED
DUE TO THE SHORTAGE OF STORAGE CAPACITY
AT DESTINATION SIDE.

[ORIGINAL DOCUMENT INFORMATION]
MESSAGE ID: 19980817I030. TAA20109@dsn.gp2dp.co.jp
TRANSMISSION DATE: P.M. 7:19, AUGUST 17, 1998
SENDER MAIL ADDRESS : sekiguti@dsn.gp2dp.co.jp
DESTINATION MAIL ADDRESS: suzuki@mailsrv.ip.co.jp
SUBJECT: Catalog materials for IFAX
NUMBER OF TRANSMITTED IMAGES: 1
READING RESOLUTION:600×600DPI
AUTOMATIC CONVERSION DESIGNATION MINIMUM RESOLUTION: 200×200DPI
READ DOCUMENT SIZE: A3
AUTOMATIC CONVERSION DESIGNATION MINIMUM DOCUMENT SIZE:

[RETRANSMISSION INFORMATION]
TRANSMISSION DATE: A.M. 0:10, AUGUST 18, 1998
TRANSMISSION RESOLUTION: 200×200DPI
TRANSMITTED DOCUMENT SIZE: A3
NUMBER OF RETRANSMISSIONS: 4
```

FIG. 41

TableG DC COEFFICIENT CODING: TableG (R1<C1)−TableE(R1,C1) = 65−80 = −15 → SSSS = 4  SSSS CODE = 101  ADDITIONAL BIT CODE = 0000  DC COEFFICIENT CODE = 1010000 (7BITS)

TableG AC COEFFICIENT CODING:

| | OBSERVED COEFFICIENT VALUE | 0 RUN LENGTH | SSSS | SSSS CODE | ADDITIONAL BIT | EFFECTIVE COEFFICIENT CODE | EFFECTIVE COEFFICIENT CODE BIT LENGTH |
|---|---|---|---|---|---|---|---|
| TableG(R1,C2) | 2 | 0 | 2 | 01 | 10 | 0110 | 4 |
| TableG(R2,C1) | −3 | 0 | 2 | 00 | 00 | 0100 | 4 |
| TableG(R2,C2) | 1 | 1 | 1 | 1100 | 1 | 11001 | 5 |
| END | | | | | | 1010(EOB) | 4 |

TableG CODE: 1010000 0110 0100 11001 1010 (24 BITS IN TOTAL)

FIG. 42

| TableG DC COEFFICIENT CODING | TableG (R1<C1)−TableE(R1,C1) → SSSS =−65−80=−15 =4 | | ADDITIONAL BIT CODE =0000 | SSSS CODE=101 | DC COEFFICIENT CODE =1010000(7BITS) | |
|---|---|---|---|---|---|---|

| TableG AC COEFFICIENT CODING | OBSERVED COEFFICIENT | COEFFICIENT VALUE | 0 RUN LENGTH | SSSS | SSSS CODE | ADDITIONAL BIT | EFFECTIVE COEFFICIENT CODE | EFFECTIVE COEFFICIENT CODE BIT LENGTH |
|---|---|---|---|---|---|---|---|---|
| | TableH(R1,C2) | 9 | 0 | 4 | 1011 | 1001 | 10111001 | 8 |
| | TableH(R2,C1) | −15 | 0 | 4 | 1011 | 0000 | 10110000 | 8 |
| | TableH(R3,C1) | 7 | 1 | 3 | 1111001 | 111 | 1111001111 | 10 |
| | TableH(R1,C3) | −3 | 0 | 2 | 01 | 00 | 0100 | 4 |
| | TableH(R3,C2) | −1 | 2 | 1 | 11100 | 00 | 111000 | 6 |
| | TableH(R4,C1) | −1 | 0 | 1 | 00 | 0 | 000 | 3 |
| | END | | | | | | 1010(EOB) | 4 |

TableH CODE: 1010000 10111001 10110000 1111001111 0100 111000 000 1010 (50 BITS IN TOTAL)

COMMUNICATION APPARATUS AND METHOD HAVING ELECTRONIC MAIL COMMUNICATION FUNCTION, AND PROGRAM

BACKGROUND OF THE INVENTION

1. Field of the Invention

This invention generally relates to a communication apparatus and method for use in transmitting an image that is inputted at a predetermined resolution, as an attachment to an electronic mail and a program for implementing the method.

2. Description of Related Art

In recent years, there has been developed an internet facsimile apparatus having a facsimile function and an electronic mail communication function that is executed through a public communication network.

The internet facsimile apparatus is capable of reading an image, converting the read image into an electronic mail data format, attaching it as a file to an electronic mail, and transmitting the electronic mail with the image attached to a desired destination through the Internet.

Such an electronic mail with an image attached is transmitted to a designated address via a mail server of an electronic mail exchange system on the Internet. The transmissible data capacity (data size) of an electronic mail is not standardized, but is usually restricted to a capacity that is specified by an administrator of a mail server. For example, the maximum transmissible data size of an electronic mail is set to several megabytes. Mail servers on the Internet have different capacities for handling electronic mails. No communication protocol has been established for exchanging the data of an electronic mail per communication between mail servers.

For example, if the above-stated conventional internet facsimile apparatus reads a plurality of document images at a high resolution and transmits the plurality of read images attached to an electronic mail, or if the conventional internet facsimile apparatus reads ten to twenty document images at a low resolution and transmits the reads images attached to an electronic mail, the data size of the transmitted electronic mail may be too large as to exceed the maximum capacity of a mail server per communication.

An electronic mail, whose data size exceeds the maximum capacity, cannot be transmitted to a destination address, and an error notification mail for this electronic mail is returned from a mail server. The error notification mail is a DSN (Delivery Status Notification) mail described in RFC (Request For Comments) 1894.

However, a user who gives an instruction for transmitting the electronic mail cannot know the data size of the electronic mail or the maximum capacity therefor although he or she can know the occurrence of an error in the transmission of the electronic mail due to the error notification mail. Thus, a user needs to read a document at a low resolution and attach the read document to an electronic mail, and divide an electronic mail into plural pieces to reduce the data size of an electronic mail to be transmitted. The data size of an electronic mail is not reduced based on a certain standard but is reduced arbitrarily by a user, and thus, the same error may occur in the transmission and retransmission of an electronic mail. This necessitates repeating the procedure for reducing the data size of an electronic mail. That is, if an error occurs in the transmission of an electronic mail due to the excessive data size thereof, it takes much time to retransmit the electronic mail.

Further, since the transmissible data size differs according to destination addresses, the data size must be adjusted according to destination addresses. This makes the electronic mail transmission very complicated.

SUMMARY OF THE INVENTION

It is therefore an object of the present invention to provide a communication apparatus and method that solves the above described problems, and a program for implementing the method.

It is another object of the present invention to provide an improved communication apparatus having an electronic mail function, and an improved communication method using the same, as well as a program for implementing the method.

It is another object of the present invention to provide a communication apparatus and method that enables the retransmission of an electronic mail if an error occurs in the transmission of the electronic mail due to its excessive data size, by reducing the data capacity of the electronic mail without taking time and labor, and a program for implementing the method.

It is another object of the present invention to provide a communication apparatus and method that enables the transmission of an electronic mail whose data size is suitable for a destination address, and a program for implementing the method.

To attain the above objects, the present invention provides a communication apparatus comprising connecting means for connecting the communication apparatus to a communication network containing an electronic mail exchange device, input means for inputting image data representing an image, transmitting means for transmitting an electronic mail, to which the image data inputted by the input means is attached, via the connecting means, receiving means for receiving an electronic mail for notifying an error via the connecting means, analyzing means for analyzing the electronic mail for notifying the error received by the receiving means, converting means for converting a capacity of the image data, inputted by the input means, into a smaller capacity according to an analysis result obtained by the analyzing means, and control means for carrying out a controlling operation so as to retransmit the electronic mail, to which the image data with the capacity thereof converted by the converting means is attached, by the transmitting means.

To attain the above objects, the present invention also provides a communication method comprising an input step of inputting image data representing an image, a transmitting step of transmitting an electronic mail to which the image data inputted by the input means is attached, a receiving step of receiving an electronic mail for notifying an error, an analyzing step of analyzing the electronic mail for notifying the error received in the receiving step, a converting step of converting a capacity of the image data inputted by the input means into a smaller capacity according to an analysis result obtained in the analyzing step, and a controlling step of carrying out a controlling operation so as to retransmit the electronic mail to which the image data with the capacity thereof converted in the converting step is attached, by the transmitting step.

To attain the above objects, the present invention further provides a program for performing a communication method by a computer, the communication method comprising an input step of inputting image data representing an image, a transmitting step of transmitting an electronic mail to which the image data inputted by the input means is attached, a receiving step of receiving an electronic mail for notifying an error, an analyzing step of analyzing the electronic mail for notifying the error received by the receiving means, a converting step of converting a capacity of the image data inputted by the input means into a smaller capacity according to an analysis result obtained in the analyzing step, and a controlling step of carrying out a controlling operation so as to retransmit the electronic mail to which the image data with the capacity thereof converted in the converting step is attached, by the transmitting step.

Preferably, the conversion of the capacity of the image data into a smaller capacity is performed on image data specified by the electronic mail analyzed by the analyzing means.

Preferably, the conversion of the capacity of the image data into a smaller capacity is performed using one of the following conversion methods or a combination thereof:

The resolution of an image represented by the inputted image data is lowered;

The size of an image represented by the inputted image data is reduced;

The inputted image data is divided into a plurality of pieces, to thereby reduce the capacity per electronic mail;

The compression rate of the inputted image data is raised;

The inputted image data which is color image data is converted into black-and-white image data;

The inputted image data which is multivalued image data is converted into binary image-data.

Further preferably, a plurality of conversion methods to be used, may be selectively set, so that the capacity of the image data may be converted by the set conversion method.

Preferably, the control means or step repeats the conversion by the converting means or step and the retransmission by the transmission means or step every time the receiving means or step receives an electronic mail for notifying an error.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 12 is a diagram showing an example of an operation screen for use in carrying out a variety of settings relating to the transmission of an electronic mail in the digital copying machine in FIG. 1;

FIGS. 21-28 are flow charts showing the procedures for inverting electronic mail data in a step S907 in FIG. 21;

FIGS. 36 and 37 are views showing examples of a document retransmission report;

FIG. 41 is a view showing a process of calculating run length coded data by using a quantization table (target at $\frac{1}{16}$ compression) 1605 for JPEC compression controlled by the image compression section of the digital copying machine in FIG. 1 and the compression rate raising process in FIG. 50, and the coded data;

FIG. 42 is a view showing a process of calculating run length coded data by using a quantization table (target at $\frac{1}{4}$ compression) 1606 for JPEC compression controlled by the image compression section of the digital copying machine in FIG. 1 and the compression rate raising process in FIG. 50, and the coded data;

DETAILED DESCRIPTION OF THE PREFERRED EMBODIMENTS

A detailed description of preferred embodiments will hereunder be given with reference to the accompanying drawings.

Figure 1:
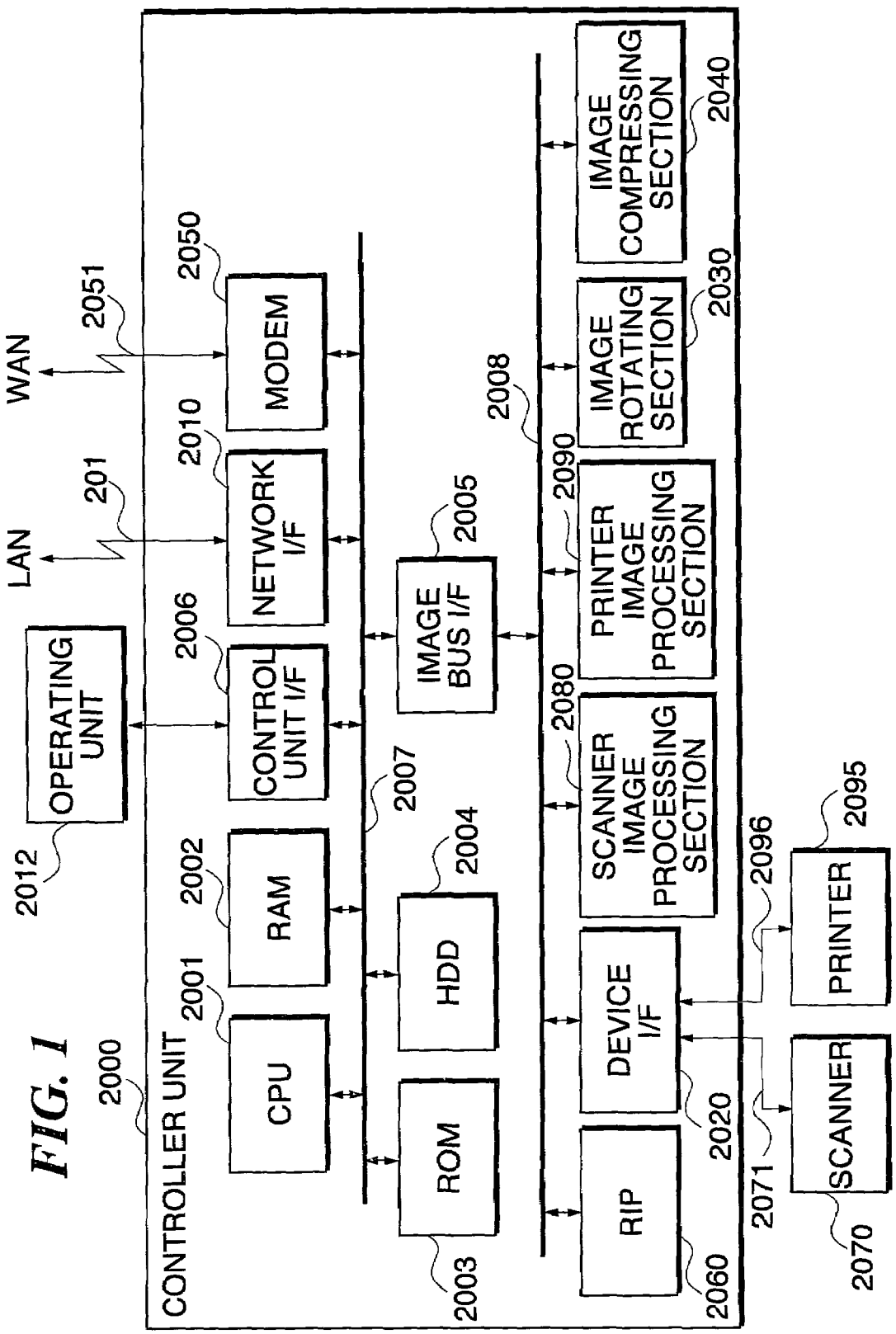
FIG. 1 is a block diagram showing the construction of a communication apparatus according to an embodiment of the present invention.

FIG. 1 is a block diagram showing the construction of a communication apparatus according to an embodiment of the present invention. In this embodiment, the communication apparatus according to the present invention is embodied as a digital copying machine having an electronic mail function.

As shown in FIG. 1, the digital copying machine is comprised of a controller unit 2000 to which are connected a scanner 2070, a printer 2095, a LAN 201 and a public communication line (WAN) 2051. The controller unit 2000 executes a controlling operation for the input and output of image information and device information for use in carrying out the following functions: a copying function, a printer function of printing data supplied from the outside through the LAN 201, a facsimile function executed through the public communication line (WAN) 2051, and a function of transmitting an electronic mail with a read image attached through the LAN 201. The controller unit 2000 also controls the whole communication apparatus.

The controller unit 2000 has a CPU 2001 that actuates the system according to a boot program stored in a ROM 2003, reads out a variety of control programs stored in a HDD (hard disk device) 2004 on this system, and carries out predetermined operations using a RAM 2002 as a work area. The HDD 2004 contains image data as well as the variety of control programs.

The RAM 2002, the ROM 2003, the HDD 2004, an operating unit I/F (operating unit interface) 2006, a LAN I/F (LAN interface) 2010, a modem 2050, and an image bus I/F (image bus interface) 2005 are connected to the CPU 2001 via a system bus 2007.

The operating unit I/F 2006 is an interface for communicating information to an operating unit 2012. The operating unit I/F 2006 transmits image data to be displayed on the operating unit 2012 to the operating unit 2012 and transmits a signal generated by an inputting operation at the operating unit 2012. The operating unit 2012 has a display for showing the present setting conditions of the respective functions relating to image formation, an information input screen for inputting setting information on the respective functions, and an input section including keys, etc. for use in inputting the setting information on the respective functions. The construction of the operating unit 2012 will be described later in further detail.

The LAN I/F 2010 is connected to the LAN 201, and inputs and outputs information through the LAN 201. The modem 2050 is connected to the public communication line (WAN) 2051, and inputs and outputs information through the public communication line 2051. The image bus I/F 2005 connects an image bus 2008 to a system bus 2007, and is comprised of a bus bridge that converts data structure. The image bus 2008 is comprised, for example, of a PCI bus that is capable of transmitting image data at a high speed or a bus according to the IEEE 1394 standard.

To the image bus 2008 are connected a RIP (raster image processor) 2060, a device I/F (device interface) 2020, a scanner image processing section 2080, a printer image processing section 2090, an image rotating section 2030, and an image compressing section 2040.

The RIP 2060 develops a PDL code into a bit map image. The device I/F 2020 connects the scanner 2070 and the printer 295 to the controller unit 2000, and converts image data from a synchronous system to a nonsynchronous system and vice versa. In this embodiment, the device I/F 2020 and the scanner 2070 are connected together via a cable 2071, and the device I/F 2020 and the printer 2095 are connected together via a cable 2096.

The scanner image processing section 2080 corrects, converts and edits the inputted image data. The printer image processing section 2090 corrects the printer and converts the resolution for image data outputted by the printer. The image rotating section 2030 rotates image data. The image compressing section 2040 executes a JPEG compression/expansion process such for multivalued image data, and executes a JBIG, MMR or MH compression/expansion processes for binary image data.

Thus, the CPU 2001 of the controller unit 2000 comprehensively controls the access to a variety of devices connected to the system bus 2007 according to control programs, and reads image information from the scanner 2070 via the device I/F 2020 and carries out predetermined operations for the read image information. The CPU 2001 then carries out a controlling operation such as outputting the image information to the printer 2095 via the device I/F 2020.

Figure 2:
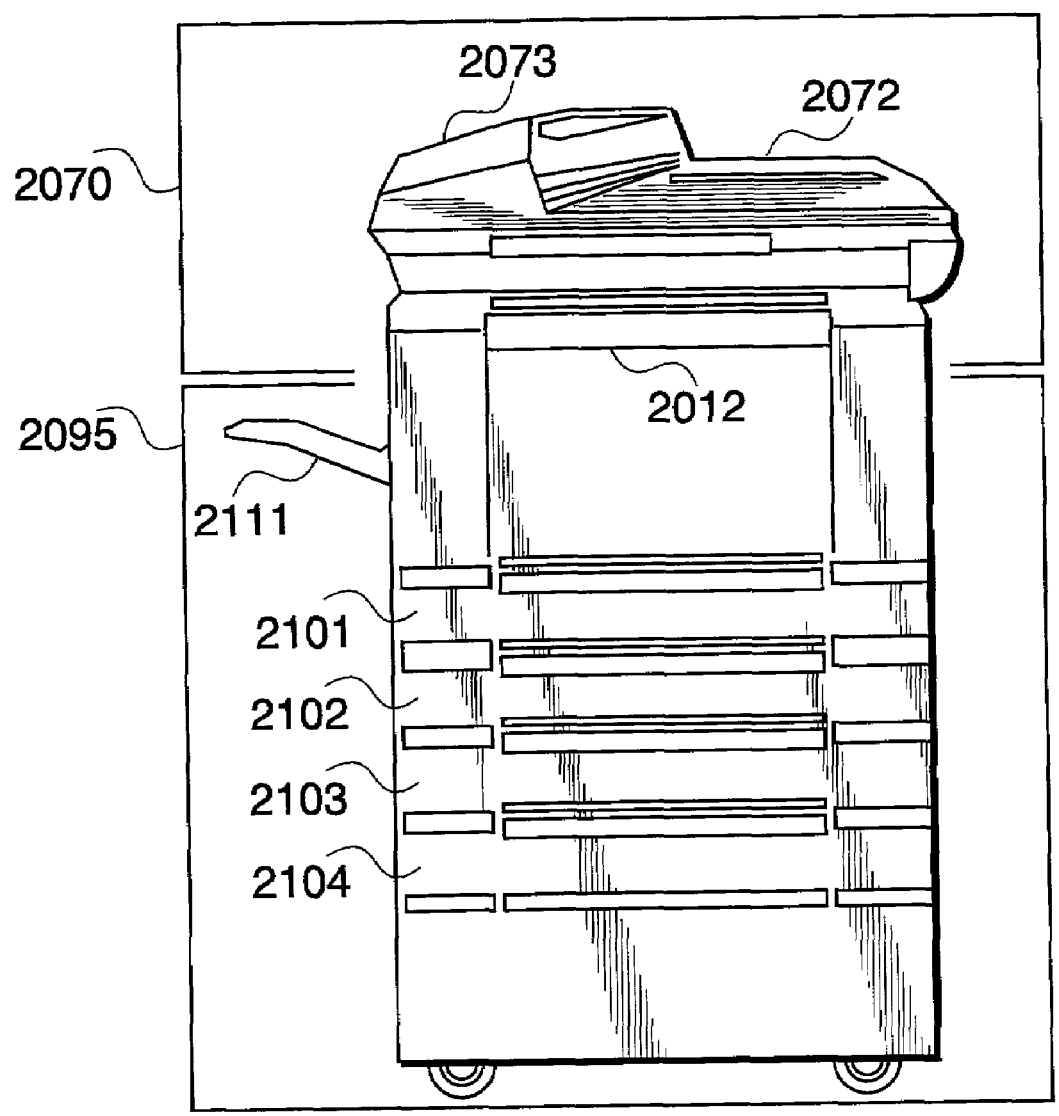
FIG. 2 is a view showing the exterior appearance of a digital copying machine in FIG. 1.

Referring next to FIG. 2, there will be described the outside construction of the digital copying machine. FIG. 2 is a view showing the exterior appearance of the digital copying machine in FIG. 1.

As shown in FIG. 2, the scanner 2070 and the printer 2095 are integrally incorporated in the digital copying machine, and the scanner 2070 is provided with the operating unit 2012.

The scanner 2070 reads an image on a document or document by illuminating and scanning with an image reading line sensor (CCD line sensor) (not illustrated) comprised of a plurality of light-receiving elements, and photoelectrically converts the read image into raster image data of a predetermined resolution in a main scanning direction and a sub-scanning direction. The document is set on a tray 2073 of a document feeder 2072. If a user gives an instruction for starting a document reading operation via the operating unit 2012, the CPU 2001 of the controller unit 2000 (shown in FIG. 1) instructs the scanner 2070 to start the document reading operation. In response to the instruction from the CPU 2001, documents are fed from the document feeder 2072 on a sheet-by-sheet basis so as to read images on the respective documents.

The printer 2095 performs image formation by converting raster image data transferred from the device I/F 2000 via the cable 2096 into a visual image to be recorded on a sheet. For example, the image formation is performed by electrophotography, in which a laser beam is scanned on an electrostatic latent image carrier such as a photosensitive drum and a photosensitive belt according to the raster image data to form an electrostatic latent image. According to the present embodiment, the image formation is performed by this electrophotography, but another image formation method may be adopted such as an inkjet printing method wherein the ink is jetted from a micro nozzle array to print an image directly on sheet.

The printing operation is started in response to an instruction from the CPU 2001 of the controller unit 2000 (shown in FIG. 1). The printer 2095 is comprised of a plurality of sheet feeding stages to enable the selection of different sheet sizes or different sheet directions. Sheet cassettes 2101, 2102, 2103 are mounted in the respective sheet feeding stages, so that sheets of corresponding sizes can be placed in corresponding directions. A sheet on which an image is formed is discharged onto a sheet discharge tray 2111.

Figure 3:
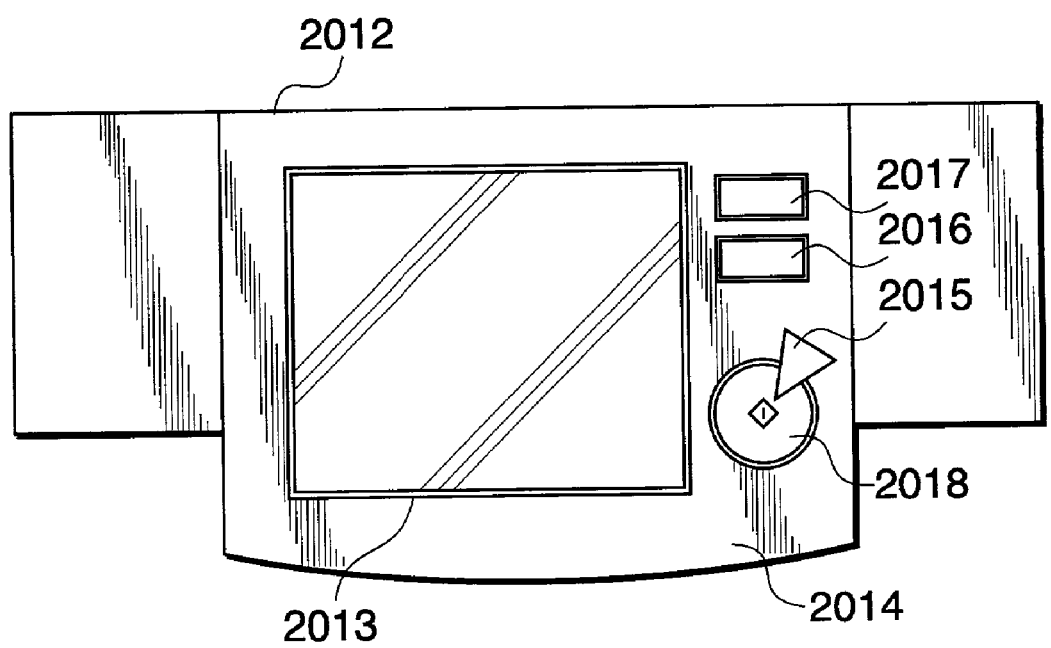
FIG. 3 is a view showing the exterior appearance of an operating unit 2012 in FIG. 2.

Referring next to FIG. 3, there will be described the construction of the operating unit 2012. FIG. 3 is a view showing the exterior appearance of the operating unit 2012 in FIG. 1.

As shown in FIG. 3, the operating unit 2012 has a liquid crystal display (hereinafter referred to as LCD) 2013, in which a touch panel sheet is attached to a screen thereof, and a plurality of hard keys. The LCD 2013 displays a system operating screen and soft keys. When one of the displayed soft keys is depressed, the positional information thereof is outputted to the CPU 2001 of the controller unit 2000 via the operating unit I/F 2006. Examples of hard keys are a start key 2014, a stop key 2015, an ID key 2016, and a reset key 2017. The start key 2014 is used for giving an instruction for starting the document image reading operation. A dichromatic LED 2018 comprised of green and red colors is mounted at the center of the key 2014. The lighting of the red color at the dichromatic LED 2018 indicates that the depression of the start key 2014 cannot be accepted. The lighting of the green color indicates that the depression of the start key 2014 can be accepted. The stop key 2015 is used for stopping the operation in progress. The ID key 2016 is used for inputting a user's ID. The reset key 2017 is used for initializing the setting inputted through the operating unit 2012.

Figure 4:
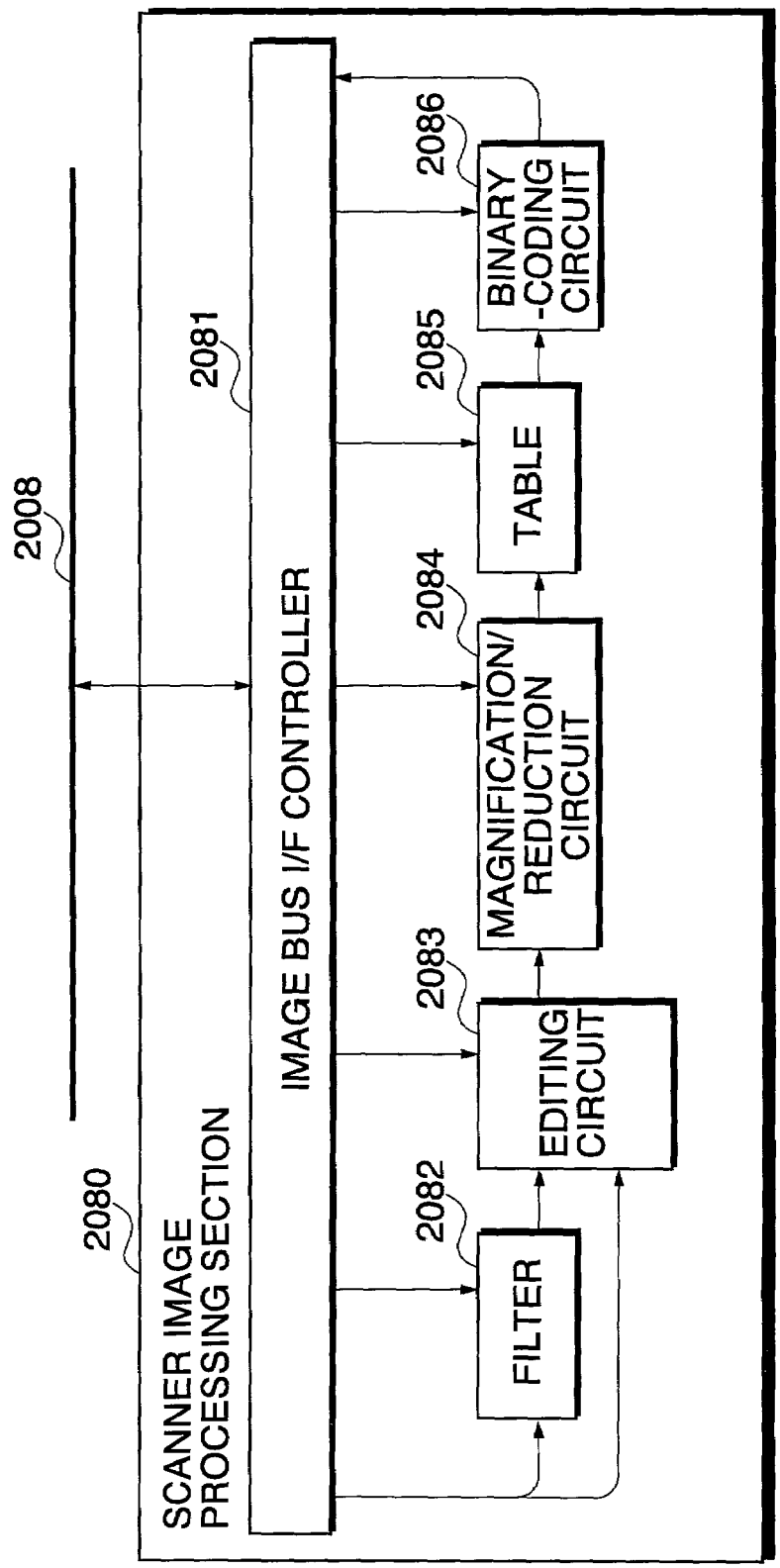
FIG. 4 is a block diagram showing the construction of a scanner image processing section 2080 in FIG. 1.
Figure 5:
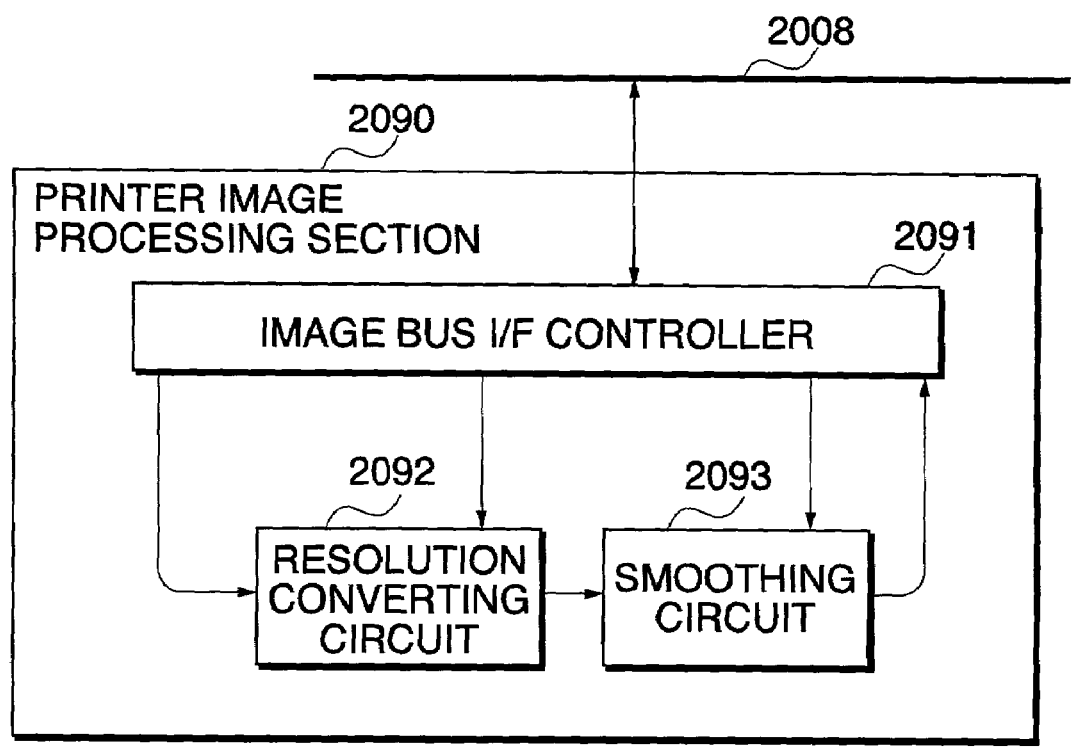
FIG. 5 is a block diagram showing the construction of a printer image processing section 2090 in FIG. 2.
Figure 6:
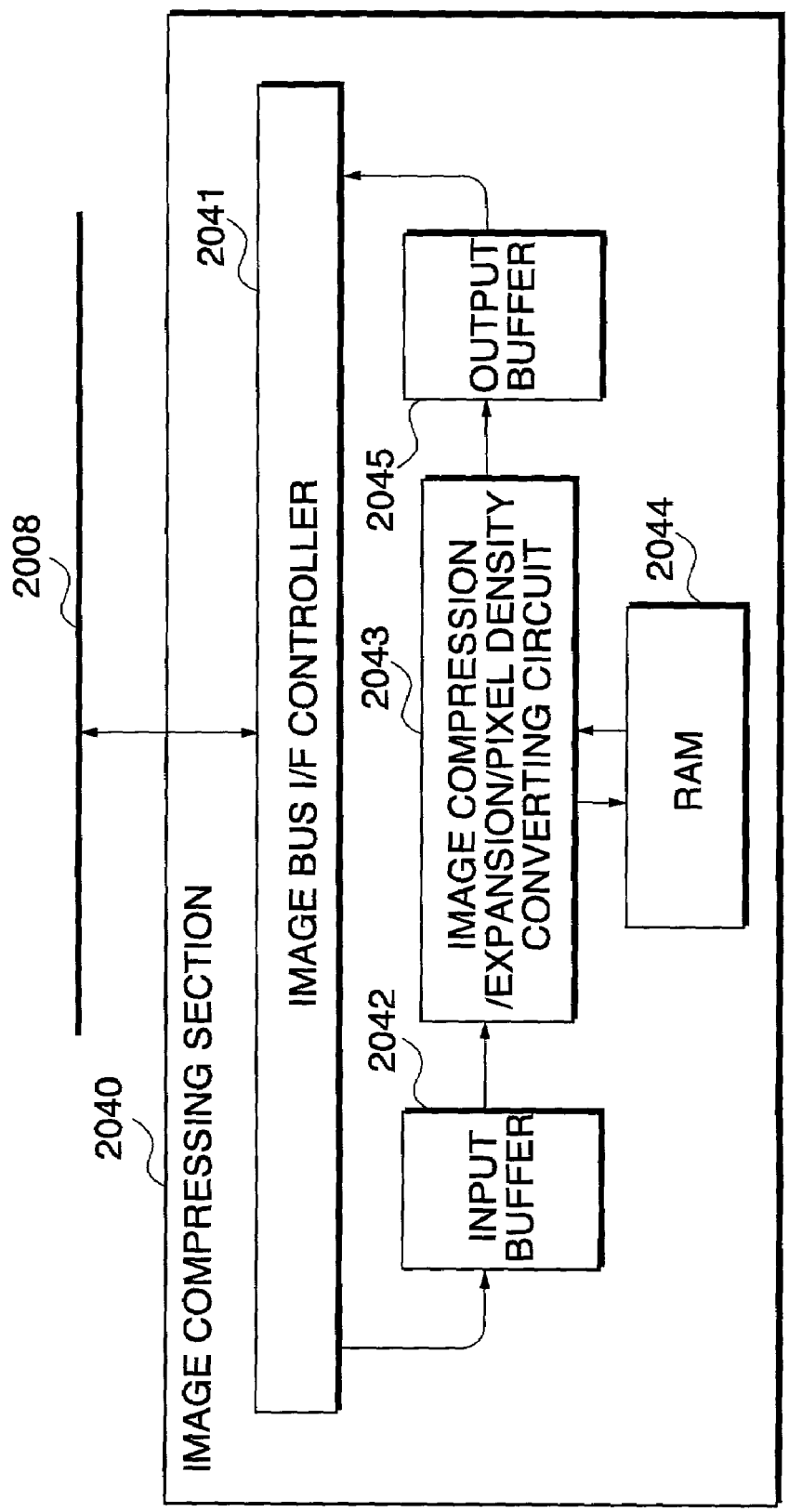
FIG. 6 is a block diagram showing the construction of an image compressing section 2040 in FIG. 1.
Figure 7:
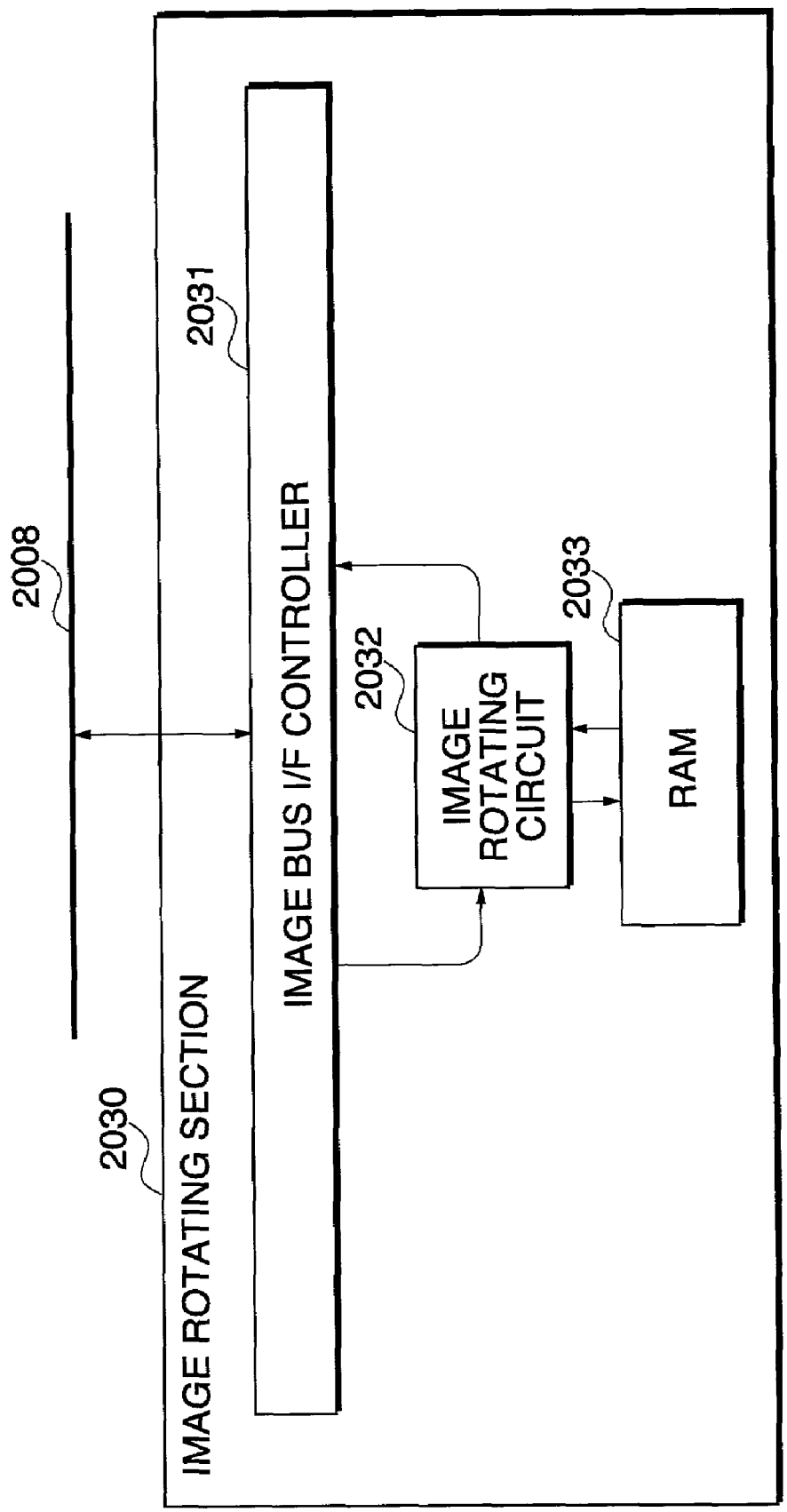
FIG. 7 is a block diagram showing the construction of an image rotating section 2030 in FIG. 1.
Figure 8:
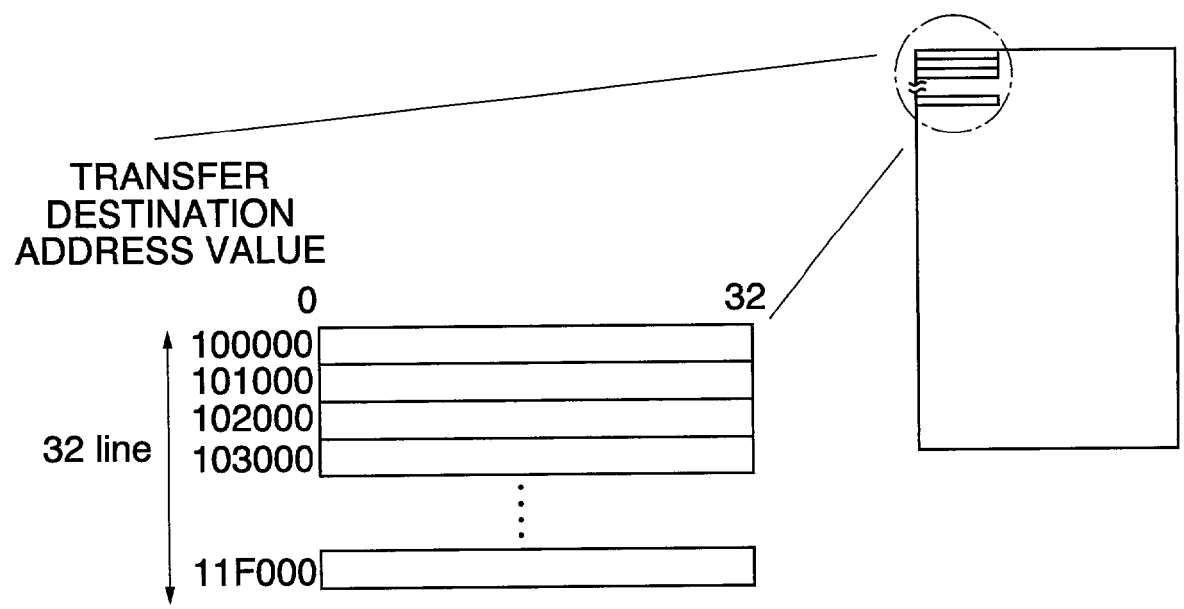
FIG. 8 is a diagram showing the procedure for rotating an image by the image rotating section 2030 in FIG. 7.
Figure 9:
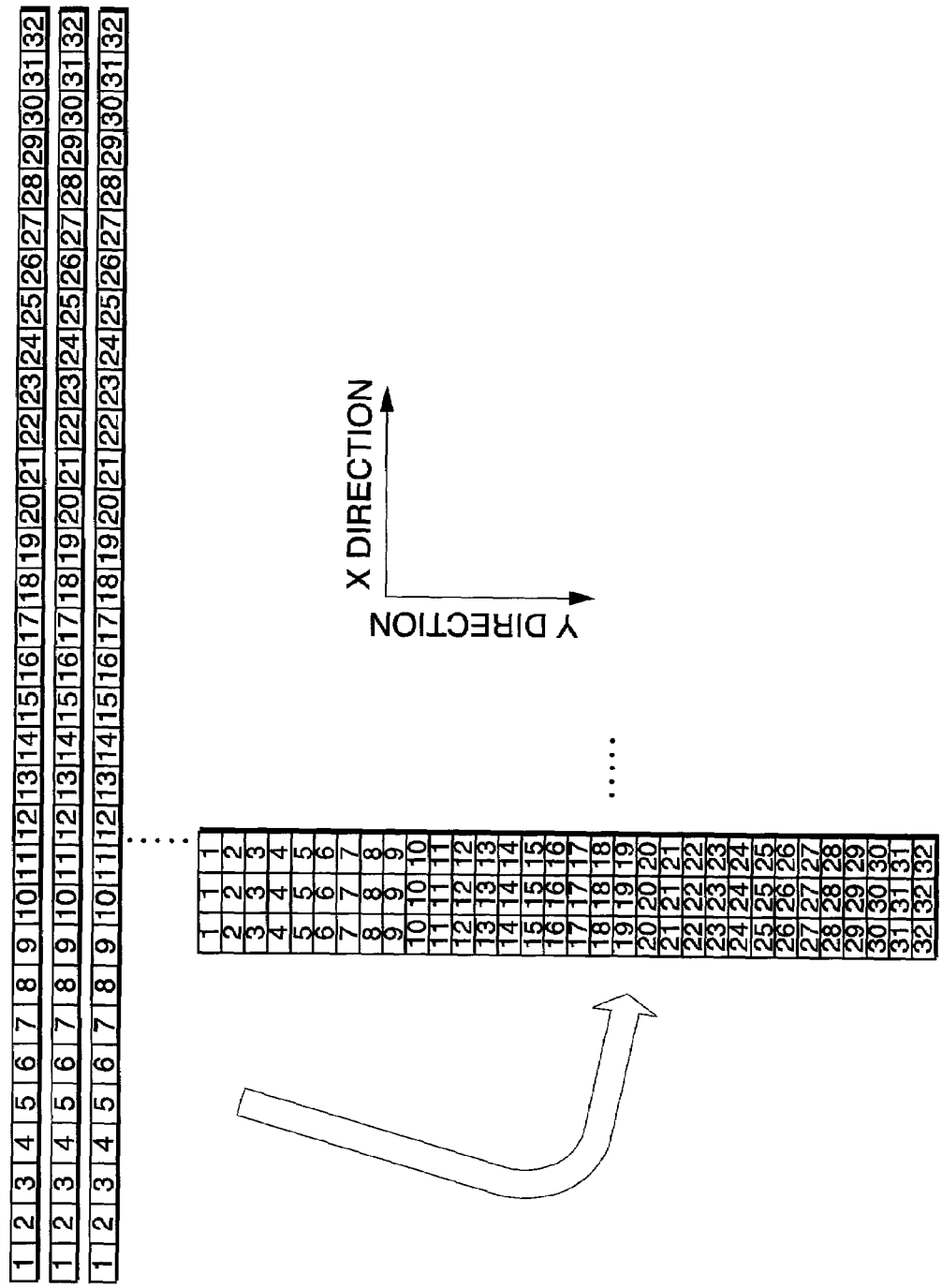
FIG. 9 is a diagram showing the procedure for rotating an image by the image rotating section 2030 in FIG. 7.
Figure 10:
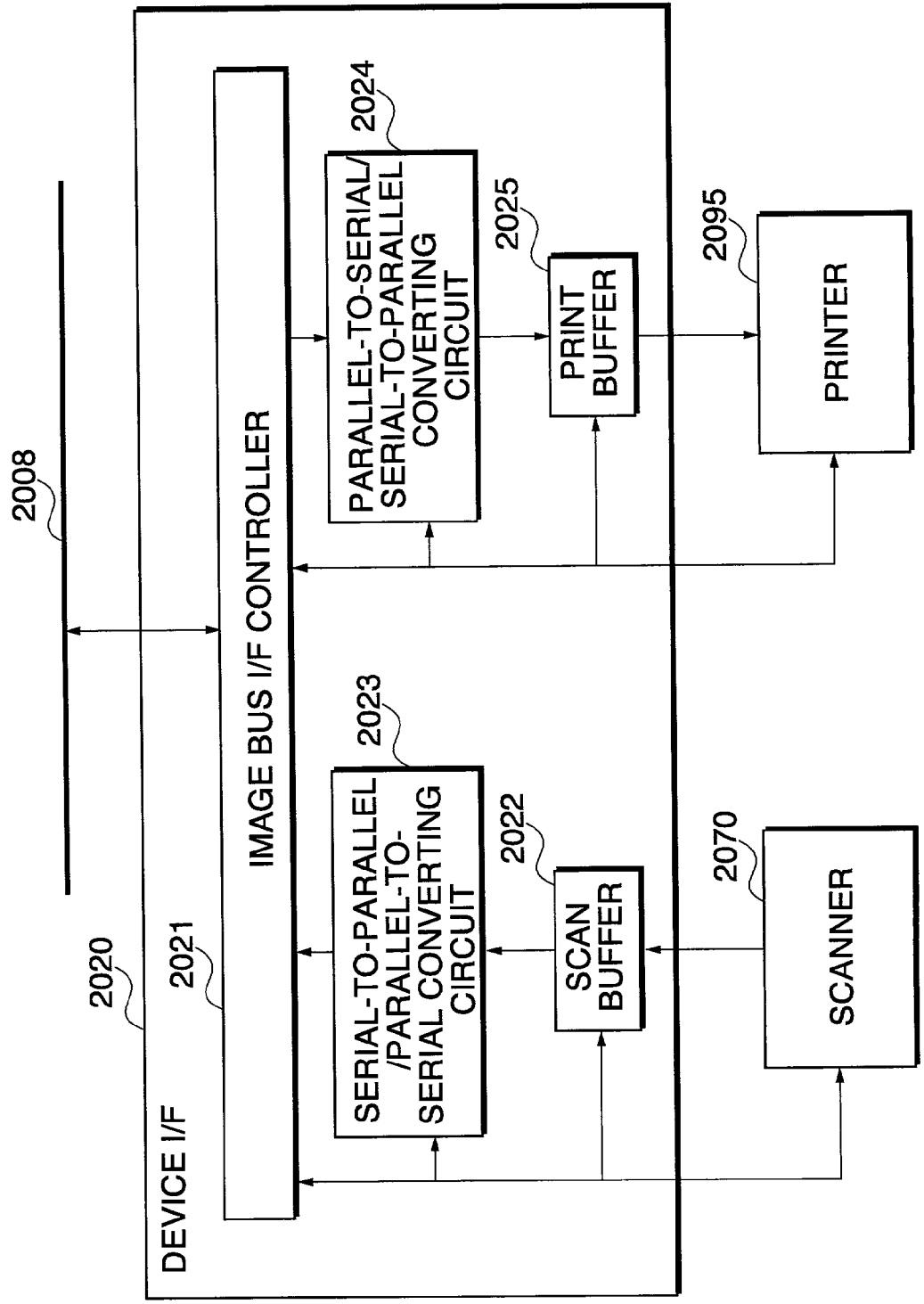
FIG. 10 is a block diagram showing the construction of a device I/F 2020 in FIG. 1.

Referring next to FIGS. 4-10, there will be described the constructions of the scanner image processing section 2080, the printer image processing section 2090, the image rotating section 2030, the image compressing section 2040 and the device I/F 2020. FIG. 4 is a block diagram showing the construction of the scanner image processing section 2080 in FIG. 1. FIG. 5 is a block diagram showing the construction of the printer image processing section 2090 in FIG. 1. FIG. 6 is a block diagram showing the construction of the image compressing section 2040 in FIG. 1. FIG. 7 is a block diagram showing the construction of the image rotating section 2030 in FIG. 1. FIG. 8 and 9 are flow charts showing the procedure for rotating an image by the image rotating section 2030. FIG. 10 is a block diagram showing the construction of the device I/F 2020 in FIG. 1.

As shown in FIG. 4, the scanner image processing section 2080 has an image bus I/F controller 2081, which is connected to the image bus 2008 to control a bus access sequence thereof. The image bus I/F controller 2081 controls devices in the scanner image processing section 2080 and generates timing signals. The devices, which are controlled by the image bus I/F controller 2081, include a filter 2082, an editing circuit 2083, a magnification/reduction circuit 2084, a table 2085 and a binary-coding circuit 2086.

The filter 2082 is comprised of a space filter and performs the convolution. The editing circuit 2083, for example, recognizes a closed area enclosed by a marker pen in the inputted image data, and carries out an image processing operation such as shading, meshing and negative/positive inversion for image data in the closed region. The magnification/reduction circuit 2084 performs expansion and contraction by interpolating the output from the image reading line sensor in the main scanning direction of the raster image, thus changing the resolution of a read image. The magnification of the image in the sub-scanning direction is varied by changing the speed at which the image reading line sensor (not shown) is moved for scanning. The table 2085 is a conversion table for converting image data as read luminance data into density data. The binary-coding circuit 2086 binary-codes multivalued gray scale image data per pixel based on an error diffusing process and a screening process. The resulting image data is transferred again to the image bus 2008 via the image bus I/F controller 2081.

As shown in FIG. 5, the printer image processing section 2090 has an image bus I/F controller 2091 that is connected to the image bus 2008 to control a bus access sequence thereof. The image bus I/F controller 2091 controls devices in the printer image processing section 2090 and generates timing signals. The devices that are controlled by the image bus I/F controller 2091 include a resolution converting circuit 2092 and a smoothing circuit 2093. The resolution converting circuit 2092 converts the resolution of the image data captured via the LAN 201 or the public communication line 2051 into the resolution of the printer 2095. The smoothing circuit 2093 smoothes a jaggy area (a rough area such as diagonal lines in a black-and-white boundary of an image). The resulting image data is transferred again to the image bus 2008 via the image bus I/F controller 2091.

The image compressing section 2040 has a function of compressing raw image data (bit map image data) into coded image data such as MMR (Modified Modified Read), MR (Modified Read), MH (Modified Huffman), JBIG (Joint Bi-level Image Experts Group) and JPEG (Joint Photographic Experts Group); a function of expanding the coded image data such as MMR, MR, MH, JBIG and JPEG; and a pixel density converting function of converting raw image data into image data of low pixel density. Further, the image compressing section 2040 is capable of arbitrarily setting a quantization table to enable the adjustment of the compression rate when JPEG image data is compressed. Moreover, the image compressing section 2040 is capable of converting a color image into a gray scale image, and converting a multivalued image (a color image or a gray scale image) into a binary black-and-white image. The image compressing section 2040 has a color space converting function. The above-mentioned pixel density converting function comprises an image size converting function of converting an image of A3 size into an image of A4 size, and a resolution converting function of converting a resolution (pixel density) of 400 DPI (Dots Per Inch) ×400 LPI (Lines Per Inch) into a resolution of 200 DPI×200 LPI.

More specifically, the image compressing section 2040 has an image bus I/F controller 2041, an input buffer 2042, an image compression/expansion/pixel density conversion circuit 2043, a RAM 2044, and an output buffer 2045. The image I/F controller 2041 is connected to the image bus 2008 to control a bus access sequence thereof. The image I/F controller 2041 also controls a timing for transmitting data to and from the input buffer 2042 and the output buffer 2045, and sets a mode for the image compression/expansion/pixel density conversion circuit 2043.

A description will now be given of the procedure for carrying out the image compression process. First, the CPU 2001 sets up the image bus I/F controller 2041 via the image bus 2008 so as to control the image compression, the image expansion or the pixel density conversion. Accordingly, the image bus I/F controller 2041 sets up the image compression/expansion/pixel conversion circuit 2043 to control the image compression, the image expansion or the pixel density conversion. After the setup, the CPU 2001 permits the transfer of the raw image data or the coded image data to the image bus I/F controller 2041, and accordingly, the image data is transferred to the image bus I/F controller 2041 from a RAM 2022 or devices on the image bus 2008. The image data transferred to the image bus I/F controller 2041 is temporarily stored in the input buffer 2042, and is then transferred to the image compression/expansion/pixel density conversion circuit 2043 at a predetermined transfer speed. In this case, the input buffer 2042 determines whether it is possible to transfer the image data between the image bus I/F controller 2041 and the image compression/expansion/pixel density conversion circuit 2043. The input buffer 2042 carries out a controlling operation to prohibit the transfer of the data when it is impossible to capture the image data from the image bus 2008 and write the image data to the image compression/expansion/pixel density conversion circuit 2043. This controlling operation is a so-called handshaking operation.

The image compression/expansion/pixel density conversion circuit 2043 temporarily stores the inputted image data in the RAM 2044, and then reads out the image data from the RAM 2044 to perform the image compression, the image expansion or the pixel density conversion. The resulting image data is transmitted to the output buffer 2045. The output buffer 2045 handshakes with the image bus I/F controller 2041 and the image compression/expansion/pixel density conversion circuit 2043 so as to transfer the data to the image bus I/F controller 2041. The image bus I/F controller 2041 transfers the image data to the RAM 2002 or the devices on the image bus 2008.

The above sequence of operations is repeated until the CPU 2001 stops outputting requests (i.e. until the processing for the necessary number of pages is completed) or until the image compressing section 2040 outputs a request to terminate the operations (e.g. when an error occurs during image compression or expansion).

As shown in FIG. 7, the image rotating section 2030 has an image bus I/F controller 2031, which is connected to the image bus 2008 to control a bus access sequence thereof. The image bus I/F controller 2031 carries out a controlling operation for setting a mode, etc. for the image rotating circuit 2032 and a timing controlling operation for transmitting image data to the image rotating circuit 2032.

There will now be described the procedure for carrying the image rotating process. First, the CPU 2001 sets up the image bus I/F controller 2031 through the image bus 2008 so as to control image rotation. Accordingly, the image bus I/F controller 2031 carries out settings such as the image size, the rotating direction, and the angle, required for image rotation, for the image rotating circuit 2032. After the setup, the CPU 2001 permits the transfer of raw image data or coded image data to the image bus I/F controller 2031. Accordingly, image data is transferred to the image bus I/F controller 2031 from the RAM 2022 or the devices on the image bus 2008. On this occasion, the image data is transferred 32 bits by 32 bits to rotate an image of 32×32 bits. A binary image is supposed as an image to be handled.

To obtain an image of 32×32 bits, the image data of 32 bits must be transferred from discrete addresses thirty-two times. The image data transferred by discrete addressing is written to the RAM 2033 in such a manner as to rotate an image at a desired angle when it is read. For example, as shown in FIG. 9, if the image is to be rotated counterclockwise by 90 degrees, the image data of 32 bits transferred first is written in a direction Y indicated in the figure. When the rotation of the image of 32×32 bits (the writing of data in the RAM 2033) is completed, the image rotating circuit 2032 reads the image data in a direction X from the RAM 2033. This causes the image to rotate counterclockwise by 90 degrees. The read image data is transferred to the image bus I/F controller 2031.

The image bus I/F controller 2031 receives the image data and transfers it to the RAM 2022 or the devices on the image bus 2008 by continuous addressing.

The above sequence of operations is repeated until the CPU 2001 stops outputting requests (until the processing for the required number of pages is completed).

Consequently, an image read by the scanner 2070 is rotated and attached to an electronic mail, and image data attached to a received electronic mail is rotated and printed by the printer 2095.

As shown in FIG. 10, the device I/F section 2020 has an image bus I/F controller 2021, which is connected to the image bus 2008 to control a bus access sequence thereof. The image bus I/F controller 2021 controls devices in the device I/F section 2020 and generates timing signals. The device I/F section 2020 also generates control signals to the scanner 2070 and the printer 2095. The devices controlled by the image bus I/F controller 2021 include a serial-to-parallel/ parallel-to-serial conversion circuit 2023, a scan buffer 2022, a parallel-to-serial/serial-to-parallel conversion circuit 2024, and a print buffer 2025.

The scan buffer 2022 temporarily holds image data transferred from the scanner 2070, and outputs it to the image bus 2008 in synchronism therewith. The serial-to-parallel/parallel-to-serial conversion circuit 2023 sequences or decomposes the image data held in the scan buffer 2022 to make the width of the image data suitable for transfer to the image bus 2008. The parallel-to-serial/serial-to-parallel conversion circuit 2024 decomposes or sequences the image data transferred from the image bus 2008 to make the width of image data suitable for storage in the print buffer 2025. The print buffer 2025 temporarily holds the image data inputted from the image bus 2008 via the parallel-to-serial/serial-to-parallel conversion circuit 2024, and outputs it to the printer 2095 in synchronism therewith.

There will now be described the procedure for reading an image by the scanner 2070. Image data outputted from the scanner 2070 is held in the scan buffer 2022 in synchronism with a timing signal outputted from the scanner 2070. If image data of 32 bits or more are stored in the scan buffer 2022 in the case where the image bus is a PCI bus, the image data of 32 bits is transmitted first-in first-out from the scan buffer 2022 to the serial-to-parallel/parallel-to-serial conversion circuit 2023 and is converted into serial image data. The serial image data is transferred onto the image bus 2008 via the image I/F controller 2021.

There will now be described the procedure for printing by the printer 2095. If the image bus 2008 is a PCI bus, image data of 32 bits is transferred from the image bus 2008 to the image I/F controller 2021. The image I/F controller 2021 transmits the transferred image data to the parallel-to-serial/ serial-to-parallel conversion circuit 2024. The parallel-to-serial/serial-to-parallel conversion circuit 2024 decomposes the image data into image data of the number of bits that can be inputted to the printer 2095, and outputs the decomposed image data to the print buffer 2025. If the image bus 2008 conforms to the IEEE 1394 Standard, serial image data is transferred from the image bus 2008 to the image I/F controller 2021. The parallel-to-serial/serial-to-parallel conversion circuit 2024 then converts the serial image data into image data of the number of bits that can be inputted to the printer 2095, and transmits it to the print buffer 2025. The image data held in the print buffer 2025 is transmitted first-in first-out to the printer 2095 in synchronism with a timing signal outputted from the printer 2095.

Figure 11:
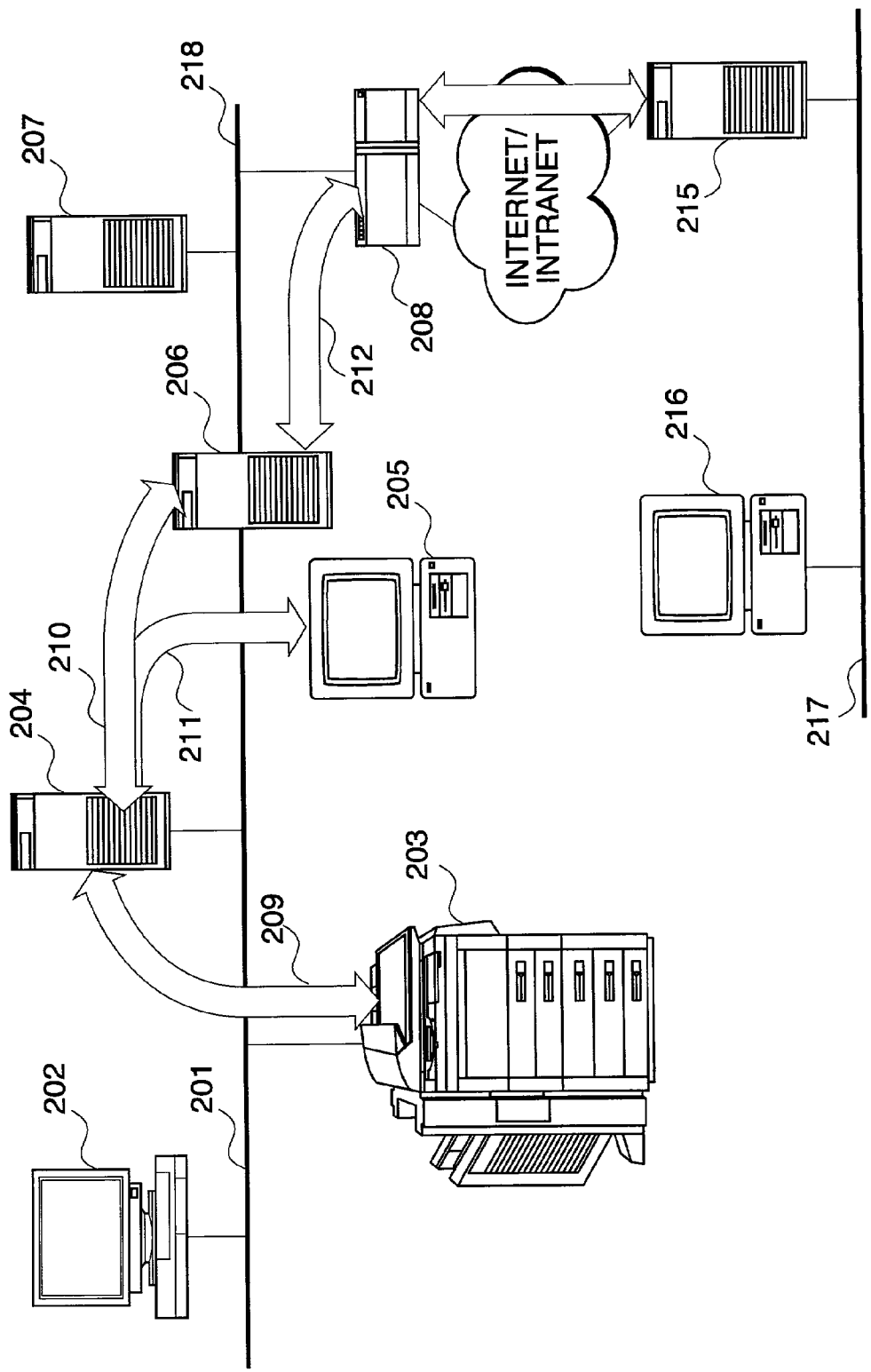
FIG. 11 is a diagram conceptually showing the connection between a digital copying machine and a LAN 201 in FIG. 1.
Figure 13:
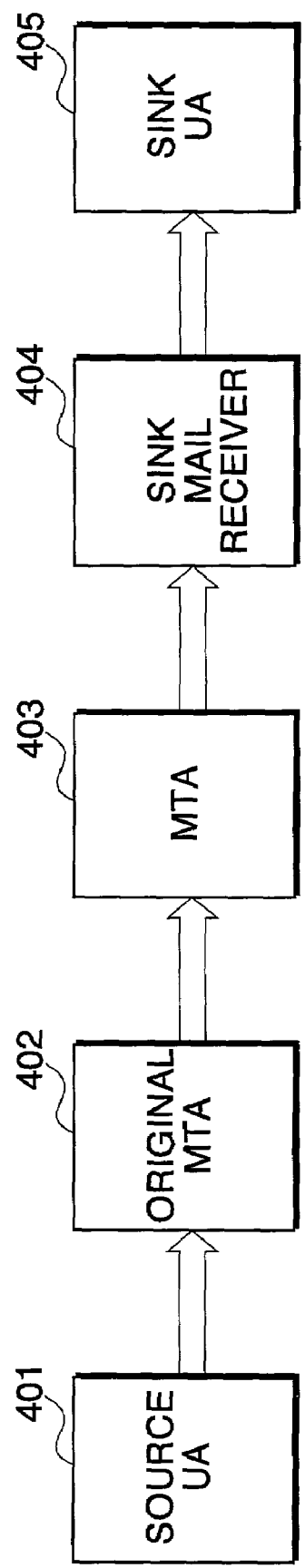
FIG. 13 is a view showing a route in an electronic mail store and forward system.
Figure 14:
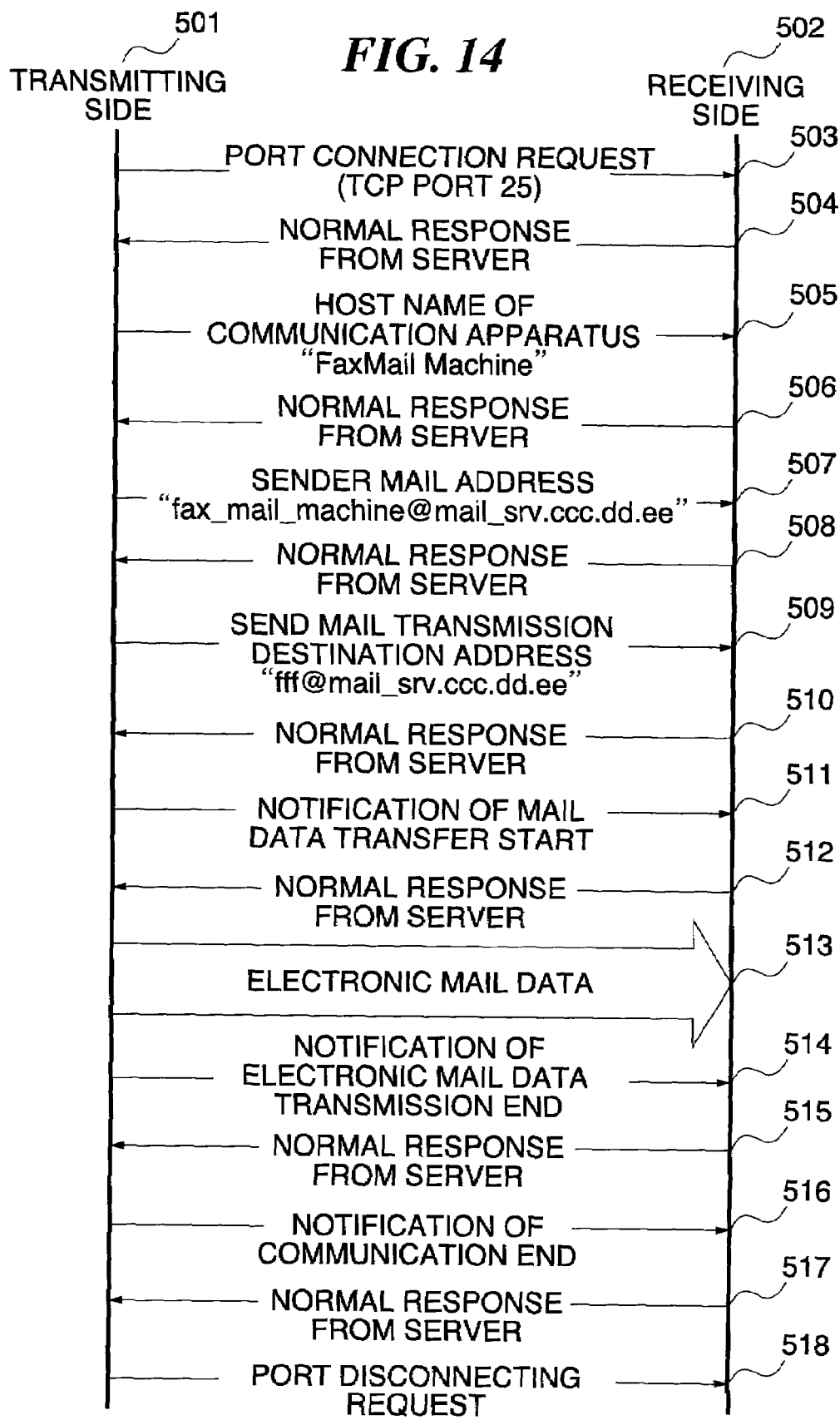
FIG. 14 is a view showing a command sequence when an SMTP protocol is normal.
Figure 15:
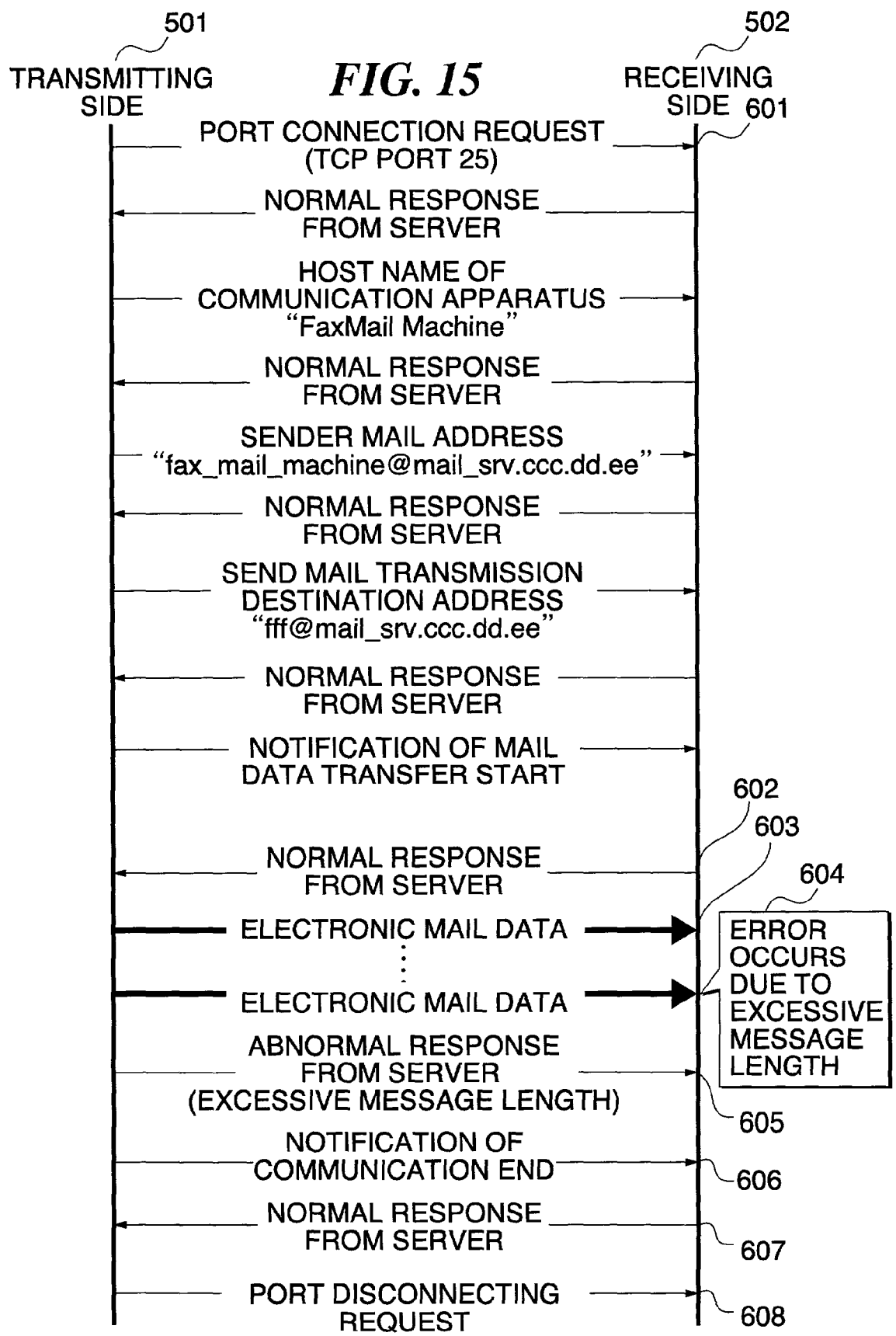
FIG. 15 is a view showing a command sequence when an SMTP protocol is abnormal.

Referring next to FIGS. 11-15, there will now be described the setup of the digital copying machine relating to the transmission of an electronic mail, and the connection between the LAN 201 and the digital copying machine. FIG. 11 is a conceptual view showing the connection between the digital copying machine in FIG. 1 and the LAN 201; FIG. 12 is a view showing an example of an operation screen for setting a variety of items relating to the transmission of an electronic mail in the digital copying machine in FIG. 1; FIG. 13 is a view of a route in an electronic mail store and forward system; FIG. 14 is a view showing a command sequence when an SMTP protocol is normal; and FIG. 15 is a view showing a command sequence when an SMTP protocol is abnormal. A digital copying machine 203 in FIG. 11 corresponds to the digital copying machine of the present embodiment that is constructed in the above-mentioned manner.

As shown in FIG. 11, the LAN 201 connected to the digital copying machine 203 contains electronic mail clients 202, 205; an electronic mail server 204; and a gateway 206. The LAN 201 is connected to a LAN 218 via the gateway 206, and the LAN 218 contains a DNS server 207, and a rooter 208. The LAN 218 is connected to an electronic mail server 215 via the rooter 208 and the Internet (or an intranet). The electronic mail server 215 and an electronic mail client 216 are provided in a LAN 217.

A TCP/IP or the like is used as a data link layer protocol, a network layer protocol and a transport layer protocol in the LANs 210, 218, 217. An SMTP (Simple Mail Transfer Protocol) or the like is used for transmitting electronic mails, and a POP (Post Office Protocol) or the like is used for retrieving electronic mails.

For example, a mail box of Mr. Sekiguchi (mail box name: sekiguchi) who uses the digital copying machine 203 is opened in the electronic mail server 204, and electronic mails addressed to Mr. Sekiguchi (mail account name: sekiguchi@dsnmail.dsn.gp2dp.co.jp) are stored in this mail box. A mail box (mail box name: suzuki) is opened in the electronic mail client 216 used by Mr. Suzuki, and electronic mails addressed to Mr. Suzuki (mail account name: suzuki@mailserv.ip.co.jp) are stored in this mail box.

There will now be described the procedure for transmitting an electronic mail addressed to Mr. Suzuki from the digital copying machine 203.

First, necessary information is inputted via an operation screen in FIG. 12 displayed on the LCD 2013 of the operating unit 2012. Specifically, in an Email Address column, Mr. Sekiguchi's mail account name (sekiguchi@dsnmail.dsn.gp2dp.co.jp) is inputted in a source mail address input section 302, and Mr. Suzuki's mail account name (suzuki@mailserv.ip.co.jp) is inputted in a destination mail address input section 303. To input the mail account name in the source mail address input section, the whole corresponding character string may be inputted, or alternatively, when a top character string corresponding to a user name is inputted, a character string from a character @ downward (a host domain name "dsnmail.dsn.gp2dp.co.jp" of an electronic mail server with which the digital copying machine 203 directly communicates) may be added automatically. A character string such as a title of a transmitted document is inputted in a subject section 304. Further, comments on an image to be transmitted are inputted in a comment section 305. The comments are transmitted as the text of an electronic mail.

The resolution at which the scanner 2070 reads the document is set in a Scan Setup column 306. The resolution is set by putting a check mark on a desired resolution by means of one of displayed check buttons. Only one resolution is set. If a check mark is put on a COLOR (JPEG) section, an image is scanned in color when the document is read and the image data obtained by scanning is stored as JPEG images.

If a check mark is put on a Setting Available section 309 in a Resolution Conversion Setup column 307, when a DSN (Delivery Status Notification) mail indicating that an electronic mail cannot be transmitted due to its excessive data length, etc. is returned from an MTA (Mail Transfer Agent) of an electronic mail exchange system after the transmission of the electronic mail, the image compression/expansion/pixel density conversion circuit 2043 of the image compressing section 2040 converts the attached image data into image data of a lower resolution than the set resolution (a resolution set in the Scan Setting Column 306). The converted image data is retransmitted at a resolution that is set by putting a check mark on a desired resolution section in a resolution column 310.

If check marks are put on a plurality of resolutions, they are sequentially used starting with the highest one as conversion resolutions in retransmission. If an electronic mail with converted image data of the minimum resolution attached is unsuccessfully transmitted, the retransmission is stopped.

In the illustrated example, the document is read at a resolution of 600×600 DPI, and when a retransmission is carried out, the read image data is converted into image data of 400×400 DPI prior to retransmission. An electronic mail with the converted image data of 400×400 DPI attached is then retransmitted. If this retransmission fails to require a next retransmission, the resolution is converted into a lower resolution of 200×200 DPI. An electronic mail with the converted image data of 200×200 DPI attached is then retransmitted.

If a Setting Disable item 308 is checked, the retransmission is prohibited even when a DSN mal is received.

To reduce the length of the attached image data, the image compression/expansion/pixel density conversion circuit 2043 may convert the attached image data into image data in a smaller size than the reading size.

In this case, if a Setting Available item 313 is checked in a Document Size Conversion Setup column 311, when a DSN (Delivery Status Notification) mail indicating that an electronic mail cannot be transmitted due to its excessive data length is returned from an MTA (Mail Transfer Agent) of the electronic mail exchange system after the transmission of the electronic mail, the image compression/expansion/pixel density conversion circuit 2043 converts the attached image data into image data in a smaller size than the reading size (a set resolution). The converted image data is retransmitted in a size that is set by putting a check mark on a corresponding size item in a size column 314.

If check marks are put on a plurality of sizes, they are sequentially used starting with the greatest size as conversion sizes in retransmission. If an electronic mail with converted image data of the minimum size attached is unsuccessfully transmitted, the retransmission is stopped.

If a Setting Disable item 312 is checked, the retransmission is prohibited even when a DSN mal is received.

Further, a retransmission control mode is set in a Mode Setting column 315. In the Mode Setting column 315, whether a mail is retransmitted or not is set by checking a Retransmit Inf. Store item 316. A set value of the item 316 is used when it is determined whether an "electronic mail retransmission information storage mode" is effective or not (a step S806 in FIG. 17), described later.

Whether an other terminal document retransmission is effective or not is set by using a check box of a Message ID Check item 317. If the item 317 is not checked, when the digital copying machine 203 receives, in behalf of another terminal, a DSN mail relating to an electronic mail with an attached mail transmitted by the other terminal, the electronic mail is retransmitted. On the other hand, if the item 317 is checked, only an electronic mail with an attached mail that is transmitted by the digital copying machine 203 itself is retransmitted in response to an DSN mail for the electronic mail.

Figure 33:
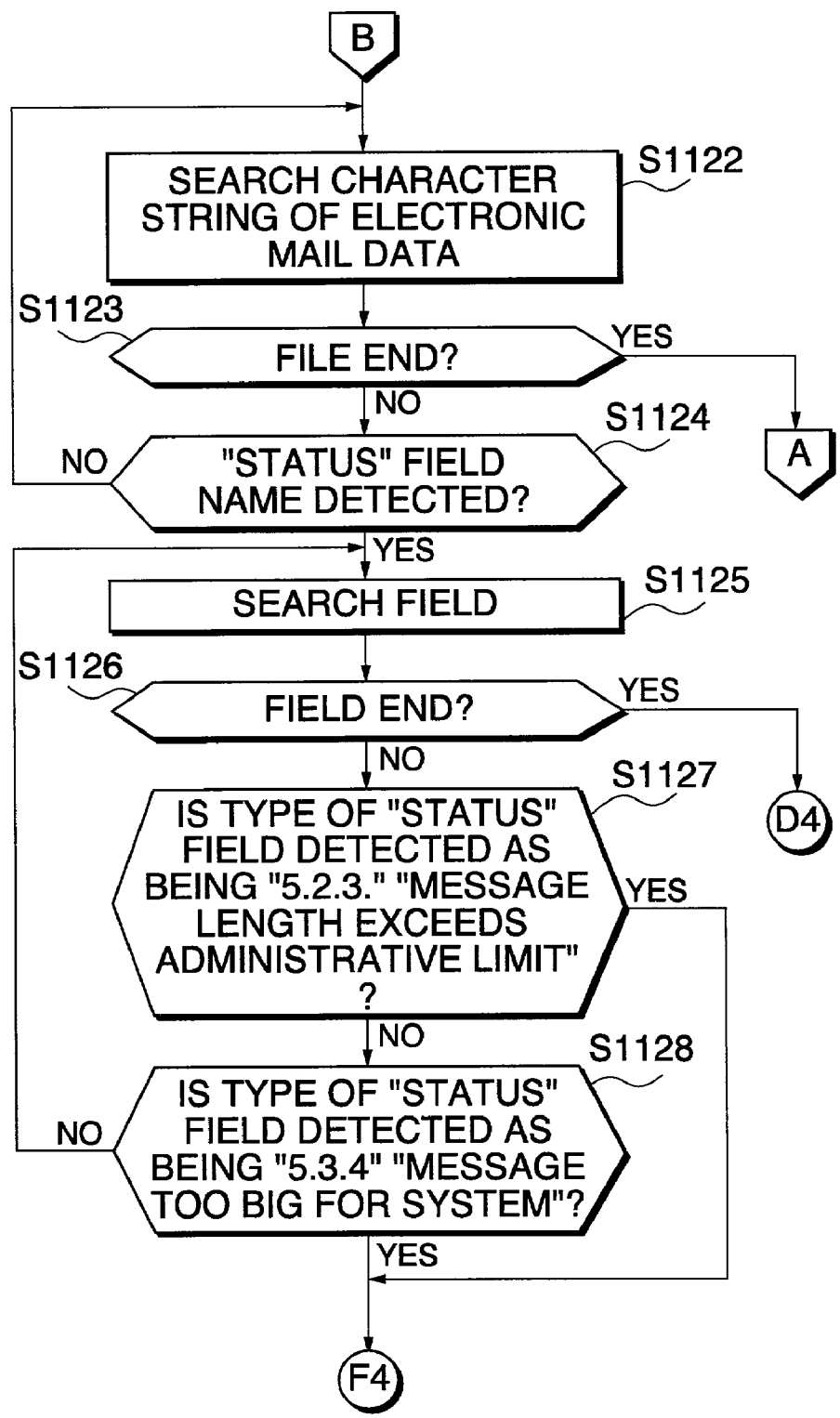
Figure 34:
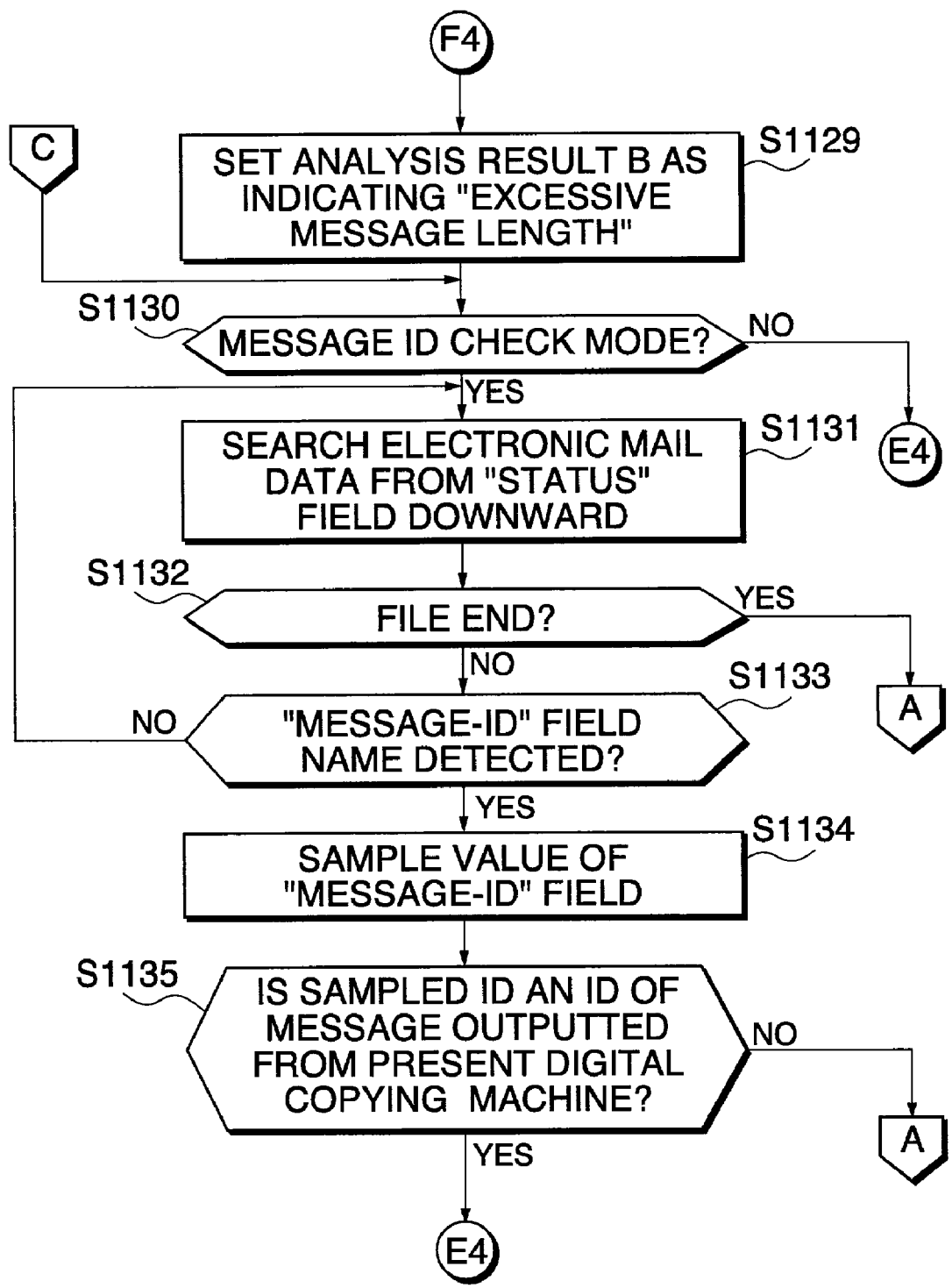

A set value of the Message ID Check item 315 is stored in a later-described "message ID check mode", and is used to determine whether the "message ID check mode" (step S1130 in FIG. 33) is effective or not. The value is not set every document reservation, and the set value affects the reception of all the subsequent mails. It should be noted that a check mark is displayed (not displayed) in the Message ID Check item 317 if the value in the "message ID check mode" is effective (ineffective). This is intended to enable a user to confirm whether the Message ID Check item 317 is checked or not and enable a change to be made when the document transmission is reserved.

Further, if a check mark is (not) put in a Document Delete After Tx. section 318, the transmitted electronic mail is erased (not erased).

A Retransmit proc. Priority section has three alternatives for determining which data size reduction method takes priority among a plurality of data size reduction methods for use in retransmission. A Quality-of-Image item 319 indicates the quality of an image, a Document Size item 320 indicates the document size, and a Page Binding item 321 indicates that a transmission document is transmitted in one communication (e-mail message) in preference to a plurality of communications (e-mail messages). The operations relating to these setting items will be detailed in a later description of the data size reduction with reference to FIG. 43.

A Page Boundary Division Setup column 322 is used to decide whether to permit the transmission of a document in a plurality of communications (e-mail messages). For this divided transmission, images of the document are divided into a plurality of pages for reducing the data size, or images of the document are grouped into units of pages within a transmissible data size 328 in one communication (e-mail message). If a Disable item 323 is checked, the images are not divided for divided transmission. On the other hand, If an Available item 324 is checked, a transmission document is divided into plural pieces for transmission and retransmission so that they are transmitted in a plurality of Email messages.

A Maximum TxSize Setup column 325 is used to set the maximum transmissible data in a communication (email message) of one session. The maximum transmission data size is inputted in an Up to section 328. In the example of FIG. 12, the maximum transmission data size is set to 4 MB (megabytes). A Decrement Data Size At ReTx section 329 indicates the size of data to be subtracted for retransmission. In every retransmission, this size of data is subtracted from the maximum transmissible data size. The resulting value is regarded as the maximum transmission data size for transmission. The maximum threshold is lowered in every retransmission so as to surely transmit the data to a destination address. In the example of FIG. 12, the Decrement Data Size At ReTX is set to 1 MB (megabyte). For example, the maximum transmission data size is 4 MB in the first transmission, 3 MB in the first retransmission, 2 MB in the second retransmission, and 1 MB in the third retransmission. A check mark is put in an Available item 327 (Disable 326) in order to make effective (ineffective) the setting relating to the maximum transmission data size.

Figure 40:
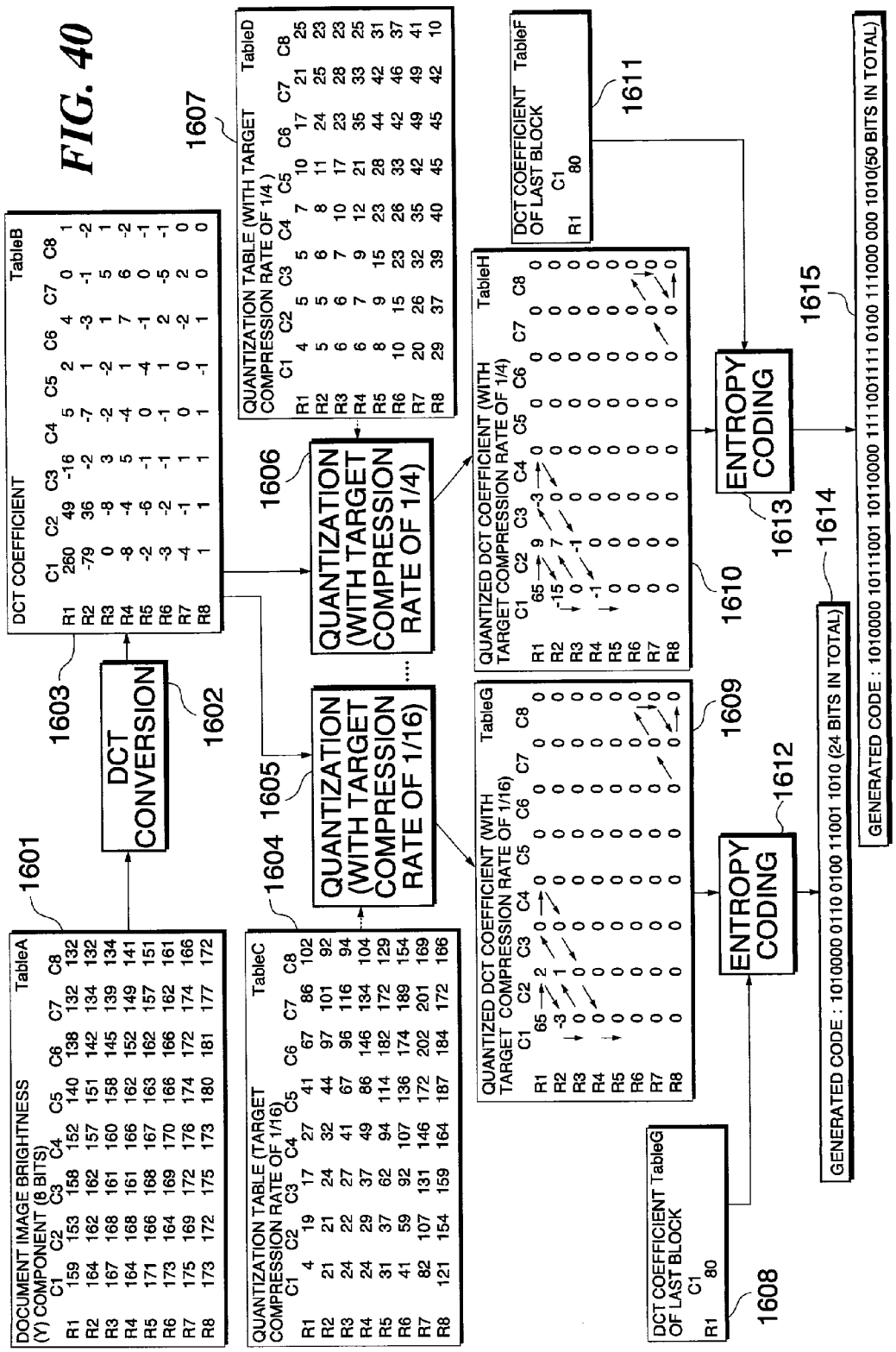
FIG. 40 is a view useful in explaining a manner of switching between a JPEG compression flow, an image conversion flow and a quantization table, that is controlled by an image compressing section of the digital copying machine in FIG. 1 and a compression rate raising process in FIG. 50.
Figure 43A:
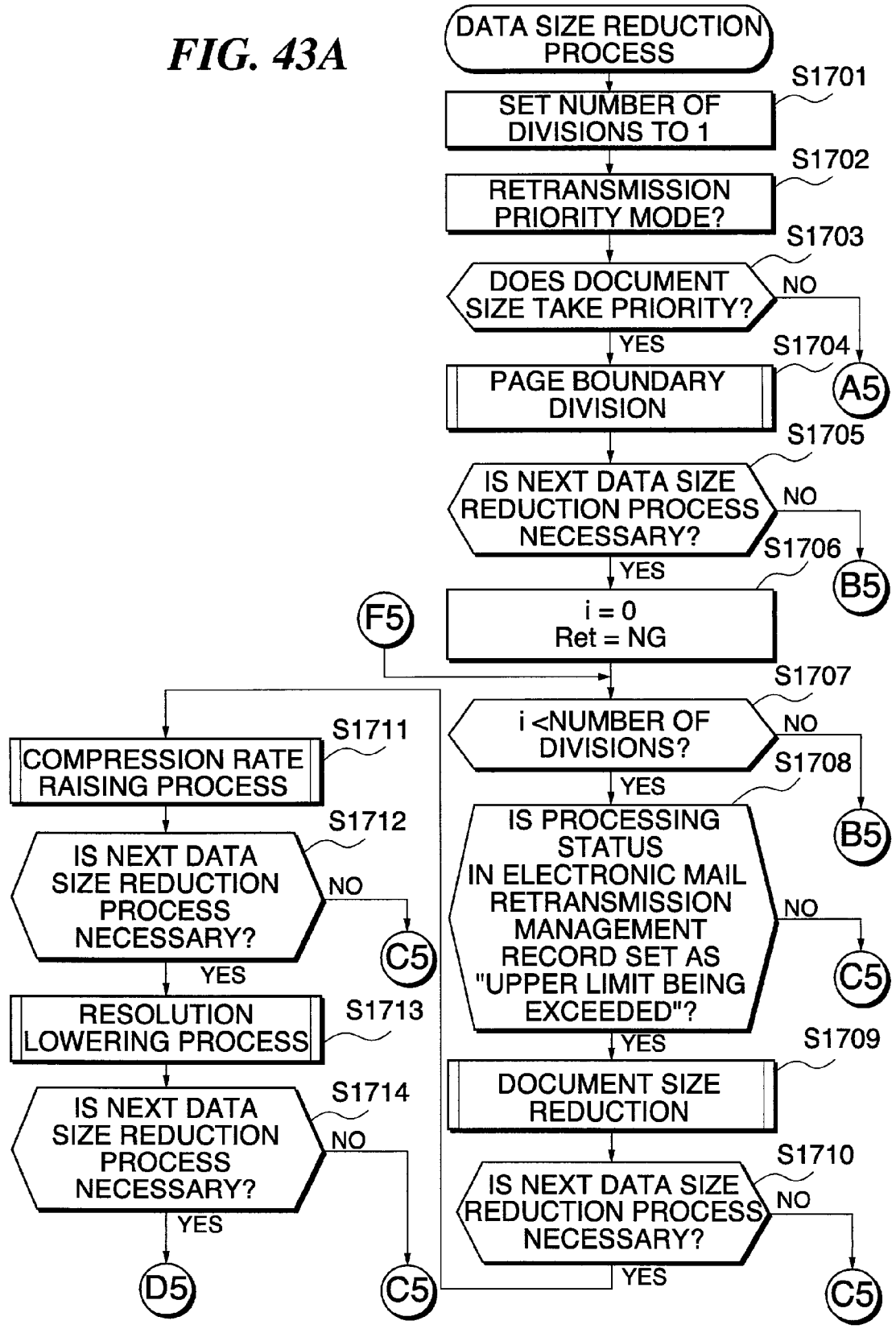
FIGS. 43-45 are flow charts showing the procedure for reducing the data size by the digital copying machine in FIG. 1.
Figure 43B:
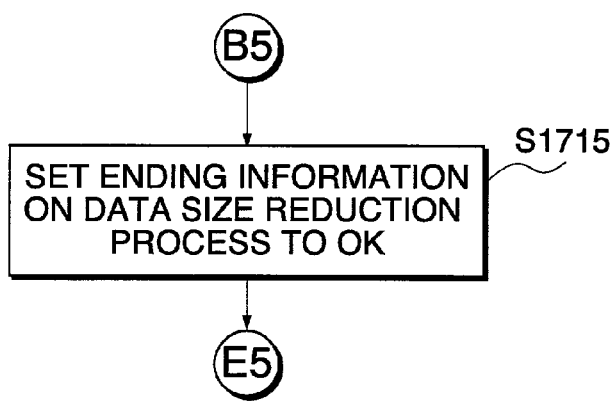
Figure 43C:
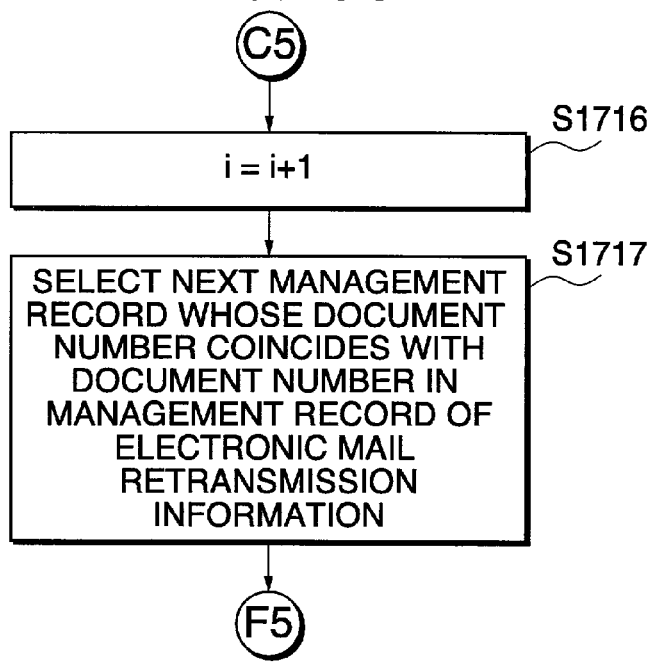
Figure 43D:
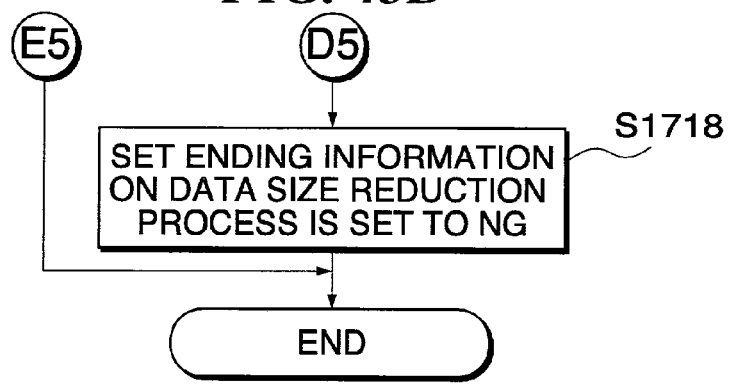

A Color Data Rate Conversion Setup column 330 is used to decide whether to carry out the operations for reducing the transmission data size by raising the compression rate every time data is retransmitted by changing a JPEG compression quantization table (1605, 1606 in FIG. 40) of a multivalued image (e.g. YcrCb in a color space of three colors and a color space Y of gray scale). In the example of FIG. 40, the quantization table 1606 is used to achieve a target compression rate of ¼ in the first transmission, and the quantization table 1605 is used to achieve a target compression rate ¹/₁₆ in the Nth retransmission. It should be noted that a check mark is put in an Available item 332 (Disable 331) in order to carry out the above operations.

A Color→BW Conversion Setup column 333 is used to decide whether to retransmit data by reducing the data to a black-and-white binary image or a gray scale image in the case where an error notification indicating the shortage of memory is returned from a destination address after the data size of a color image is reduced by the above-mentioned procedures. It should be noted that a check mark is put in an Available item 335 (Disable 334) in order to carry out the above operations.

Upon completion of various settings for transmission of an electronic mail, a document attached to the electronic mail that is transmitted by Mr. Sekiguchi is set on a document feeder 2073 of the digital copying machine 203. When a start button 2018 is pressed, the document is fed by the document feeder 2073 and is read by the scanner 2070. Image data obtained by reading is converted into electronic mail data to be attached to an electronic mail, which is transmitted to the electronic mail server 204 (a route 209 in FIG. 11).

The electronic mail is then transferred from the electronic mail server 204 to the gateway 206 (a route 210 in FIG. 11), and the gateway 206 instructs the DSN server 207 to solve the name from the domain name of Mr. Suzuki's mail account "mailserv.ip.co.jp" to an IP (Internet Protocol) address. The gateway 206 then transmits the electronic mail by the STMP protocol to the electronic mail server 213 having the solved IP address via the rooter 208 (a route 212 in FIG. 11). Mr. Suzuki's mail box "suzuki" is opened in the electronic mail server 213, and electronic mails addressed to his mail account name "suzuki@mailserv.ip.co.jp" are stored in this mail box. The electronic mail client 216 for Mr. Suzuki retrieves and receives the electronic mails from the mail box of the electronic mail server 213 by a protocol POP3 (Post Office Protocol version 3).

The electronic mail is usually transferred as shown in FIG. 13. First, the electronic mail from a Source UA (User Agent) 401 as a source of transmission (corresponding to the digital copying machine 203) to a document MTA (Mail Transfer Agent) 402 (corresponding to the electronic mail server 204). The electronic mail is then transmitted to a Sink Mail Receiver 404 (corresponding to the electronic mail server 213) having a domain name indicated by the electronic mail via an MTA (Mail Transfer Agent 403 (corresponding to the gateway 206), and is stored in the mail box. The electronic mail stored in the Sink Mail Receiver 404 (corresponding to the electronic mail server 213) is retrieved from a Sink UA 405 (corresponding to the electronic mail client 216).

As mentioned above, the digital copying machine 203 is able to retransmit a document transmitted from other terminals. For example, if the digital copying machine 203 receives, in behalf of the electronic mail client 205, a DSN mail relating to an electronic mail with an image attached (an electronic mail transmitted via a route 211 in FIG. 11) transmitted by the electronic mail client 205 and if the DSN mail includes the electronic mail and the attached image, the digital copying machine 203 reduces the data size of the attached image to retransmit the electronic mail.

Referring next to FIGS. 14 and 15, there will now be described the procedure for transmitting an electronic mail from the digital copying machine 203 to the electronic mail server 204. In FIGS. 14 and 15, a transmitting side 501 is the digital copying machine 203, and a receiving side 502 is the electronic mail server 204.

First, a description will be given of the procedure in the case where the transmission of an electronic mail ends normally. In this case, the transmitting side 501 outputs a port connection request (TCP port 25) to the receiving side 502 by the procedure based on TCP/IP (503). In response to the port connection request, the receiving side 502 returns a normal response to the transmitting side 501 (504).

The transmitting side 501 then sends its own host name "Fax Mail Machine" to the receiving side 502 (505). The receiving side 502 confirms that the transmitting side 501 is a host of service by referring to the received host name, and returns a normal response to the transmitting side 501 (506). The transmitting side 501 then transmits a sender mail address of an electronic mail "fax_machine@mail_srv.ccc.dd.ee" to the receiving side 502 (507), and the receiving side 502 returns a normal response (508). The transmitting side 501 then transmits a destination address of the electronic mail "fff@mail_srv.ccc.dd.ee" to the receiving side 502 (509), and the receiving side 502 returns a normal response (510).

The transmitting side 501 sends a mail data transfer start notification to the receiving side 502 (511), and the receiving side 502 returns a normal response (512). Electronic mail data is then transmitted from the transmitting side 501 to the receiving side 501 (513). If the transmission of the electronic mail data is completed, the transmitting side 501 sends an electronic mail data transmission ending notification to the receiving side 502 (514), and the receiving side 502 returns a normal response. The transmitting side 501 then outputs a communication ending notification to the receiving side 502 (517), and the receiving side 502 returns a normal response. When the normal response is returned in response to the communication ending notification, the transmitting side 501 outputs a port-disconnecting request (518) to end the communication normally.

If the electronic mail data length exceeds the maximum receivable data length of the receiving side, a communication error occurs and an error notification is sent to the transmitting side. A description will now be given of the procedure for correcting an error that occurs when the electronic mail data length exceeds the maximum receivable data.

As shown in FIG. 15, the above described procedures are carried out after the transmitting side 501 outputs a port connection request (601) to the receiving side 502 and until the receiving side 502 returns a normal response to the mail data transfer notification from the transmitting side 501 (602).

If the transmitting side 501 starts transmitting electronic mail data to the receiving side 502 (603) and the received data length exceeds its upper limit at the receiving side 502 during the transmission of the electronic mail data, an error occurs (604). Upon occurrence of the error, the receiving side 502 returns a DSN (Delivery Status Notification) mail indicating a server abnormal response (excessive message length) to the transmitting side 501 (605). In response to the server abnormal response, the transmitting side 501 outputs a communication ending notification to the receiving side 502 (606), and the receiving side 502 returns an over normal response (607). When the over normal response is returned in response to the communication ending notification, the transmitting side 501 outputs a port disconnecting request (608).

The DSN mail returned from the receiving side 502 to the transmitting side 501 is described in RFC (Request For Comments) 1894. The DSN mail gives notice of the following statuses by an "Action:" header: "failed"/"delayed"/"delivered"/"relayed"/"expanded". If a notice of "failed" transmission is given by the "Action:" header, the following message is written: "Diagnostic-Code:SMTP; 534 Mail cannot be delivered, Message too big for system". This message indicates that the length of data received by the receiving side 502 exceeds the upper limit.

The digital copying machine 203 has the above-mentioned electronic mail transmitting function and an electronic mail receiving function equivalent to that of the receiving side 502. Thus, the digital copying machine 203 is able to retrieve the electronic mail from the mailbox that is opened in the electronic mail server 204.

Referring next to FIGS. 17-20, there will be described the procedure for carrying out a document reading and transmitting process in which a document is read and an electronic mail with image data of the document attached is transmitted. FIGS. 17-20 are flow charts showing the procedure for carrying out the document reading and transmitting process by the digital copying machine in FIG. 1.

Figure 17:
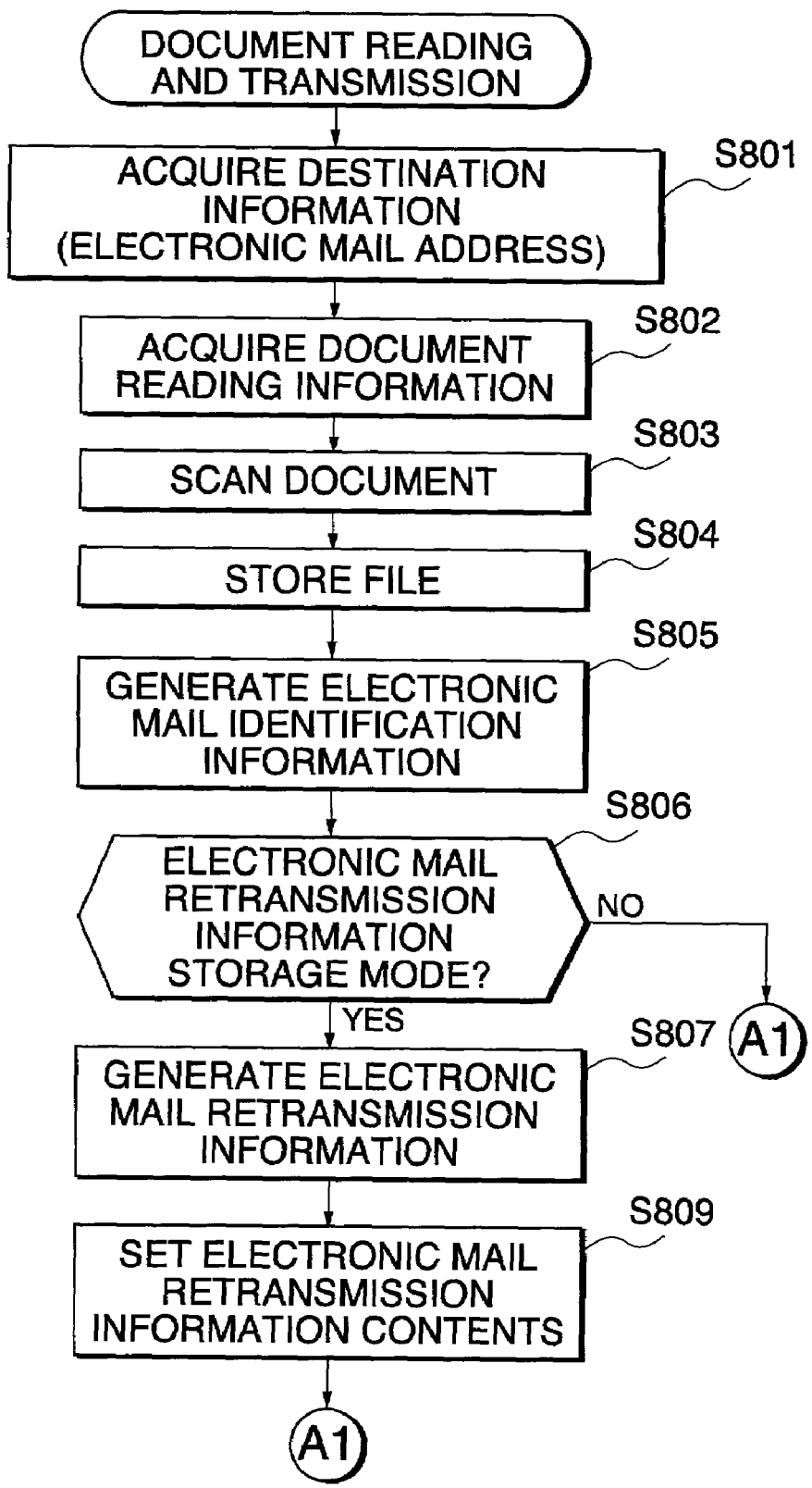
FIGS. 17-20 are flow charts showing the procedures for reading and transmitting a document by the digital copying machine in FIG. 1.
Figure 18:
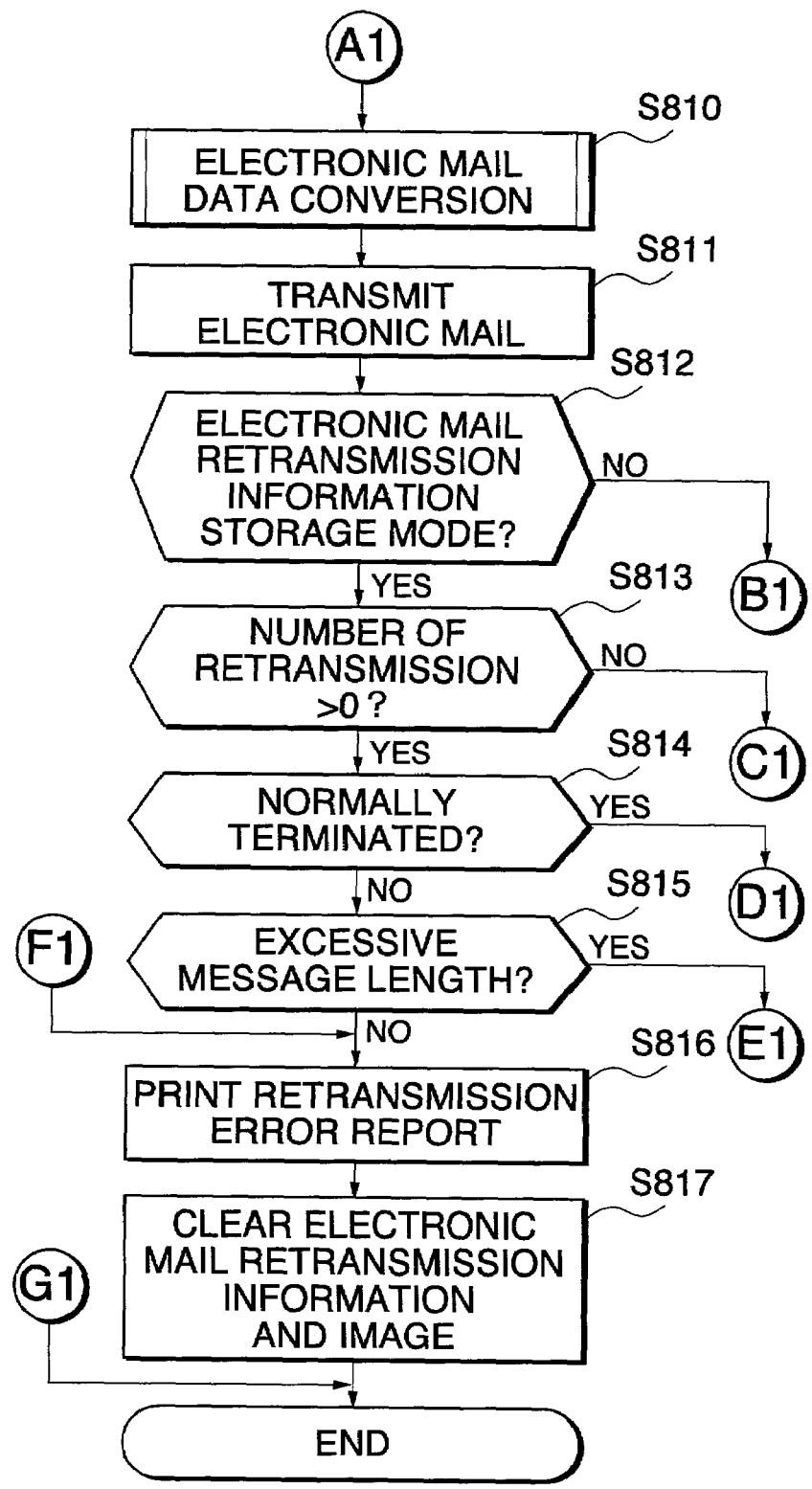
Figure 19:
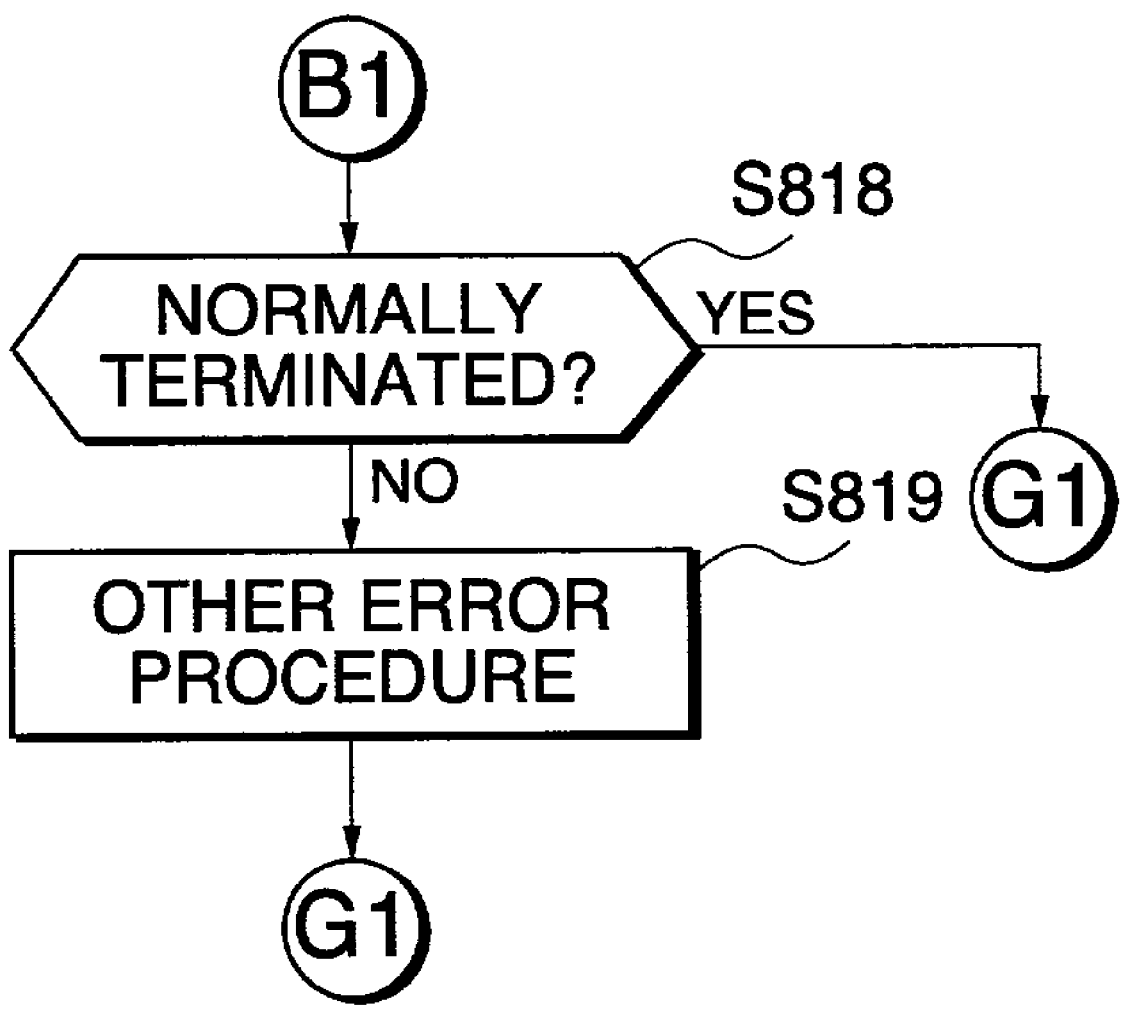

As shown in FIG. 17, first, destination information inputted on the operation screen in FIG. 12 is acquired in a step S801. In the next step S802, document reading information indicative of the resolution, the reading document size, whether it is possible to read a color image, and the like is acquired and stored in the RAM 2002.

A document set on the document feeder 2072 is read in the next step S803, and image data acquired by reading is coded into MMR image data (or into JPEG image data if COLOR is designated in the column 306 of the operation screen in FIG. 12) by the image compressing section 2040. The coded image data is stored in a TIFF file (JPEG) format in the RAM 2002 or the HDD 2004.

In the next step S805, electronic mail identification information ("Message-ID") is generated. The program then proceeds to a step S806 to determine whether an electronic mail retransmission information storage mode is set or not. In this embodiment, whether the electronic mail retransmission information storage mode is set or not is determined according to whether or not a check mark is put in the abovementioned Retransmit Inf.Store item 316 on the operation screen in FIG. 12. If the check mark is put on the Retransmit Inf.Store item 316, it is determined that the electronicmail retransmission information storage mode is not set and the program proceeds to a step S810. If the check mark is not put in the Retransmit Inf.Store item 316, the program proceeds to a step S807 to acquire a blank record [i] of electronicmail retransmission administration data (in FIG. 38), increment the number of registered management records 1502 in retransmission administration information in FIG. 38, and set 1 to an in-process record 1504.

In a step S809, the management record is initialized. The procedure for initializing the management record comprises setting the previously generated electronic mail identification information to a message ID 1506; setting the number of retransmissions 1507 to zero; setting a document number generated from the date and time as a document number 1509, setting the number of image pages of the read document and list information indicating pairs of page numbers and names of image files stored in the HDD 2004 for each image page (file) as transmission image file information 1510 in the number of image pages; setting the resolution designated in the column 306 of the control section in FIG. 12 as the last transmission resolution 1513, setting a document size fixed in a step S803 as the last transmitted document size 1518, and setting retransmission-related information in FIG. 12 as retransmission mode information 1518.

The program then proceeds to the step S810 to convert electronic mail data (this will be described later in detail). After the data conversion, a processing status 1511 of an electronic mail retransmission management table in FIG. 38 is set as being "waiting for transmission".

The reason whey management data on the processing status 1511 is required is that the digital copying machine of the present invention can handle a plurality of transmission job reservations and electronic mail transmissions asynchronously. Even during the transmission of an electronic mail, the digital copying machine of the present invention is capable of accepting a transmission job request after the reading of a document, so that a plurality of transmission job requests can be stored in the digital copying machine. This also applies to the retransmission jobs, and thus a plurality of retransmission job requests are stored in the digital copying machine. For example, when an electronic mail transmission section selects a possible retransmission job among a plurality of retransmission job reservations, the processing status 1511 is referred to and a retransmission job (management record) under the condition of "waiting for transmission" is selected to carry out a transmission. Because a plurality of transmission job reservations and electronic mail transmissions can be handled asynchronously, the transmission job reservation as well as the electronic mail transmission is actually performed in the electronic mail transmitting section, though a step S811, hereinafter described, handles an electronic mail transmission. If the transmission job reservation takes highest priority, or if there is no other transmission job reservations, the electronic mail is immediately transmitted.

Figure 38:
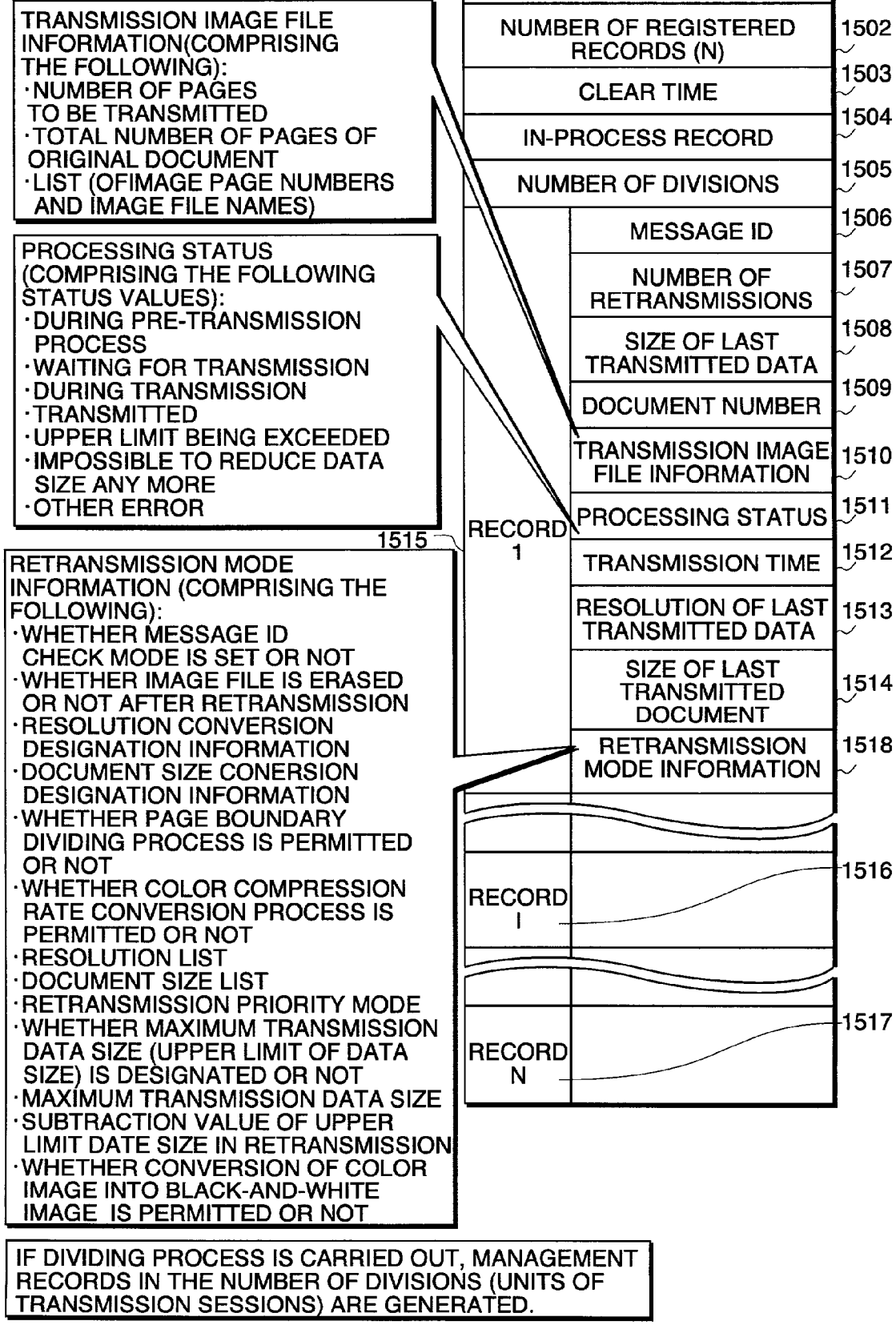
FIG. 38 is a view showing a retransmission management data construction stored in a RAM 2002 of the digital copying machine in FIG. 1.

In the next step S811, the processing status 1511 of the electronic mail retransmission management table in FIG. 38 is set as being "during transmission" before the transmission of an electronic mail with attached read image data is started. It is then determined in a step S812 whether the electronic mail retransmission information storage mode is set or not. If no, the program proceeds to a step S818. If yes, the program proceeds to a step S813 to check whether the number of retransmissions 1507 in the management record corresponding to the in-process record 1504 exceeds zero or not. If no, the program proceeds to a step S820. If yes, the program proceeds to a step S814 to check whether or not the transmission of the electronic mail has ended normally in the step S811. If yes, the program proceeds to a step S825. If no, the program proceeds to a step S815 to determine whether the excessive length of the transmitted electronic mail causes the abnormal transmission end. If yes, the program proceeds to a step S822. If no, the program proceeds to a step S816 wherein the printer 2095 prints a retransmission error report. The program then proceeds to a step S817 to clear the electronic mail retransmission information and the attached image data in the RAM 2004 and the HDD 2004 to terminate the document reading and transmitting process.

In the step S818, it is determined whether the electronic mail transmission has ended normally or not in the step S811. If yes, the processing status 1511 is set as being "transmitted" to terminate the document reading and transmitting process. If no, an operation other than the retransmission is carried out and the processing status 1511 is set as being "other error" to terminate the document reading and transmitting process.

In the step S820, it is determined whether the transmission of the electronic mail has ended normally in the step S811. If yes, the program proceeds to a step S827. If no, it is determined whether the length of the transmitted message exceeds its upper limit. If no, the program proceeds to the step S816. If yes, the program proceeds to the step S822 to carry out a data size reduction process. The data size reduction process will be described later in detail.

In the next step S823, it is determined whether the transmission data size has been reduced to a smaller one than the current size in the step S822. If no, the processing status 1511 is set as being "impossible to reduce data size any more". If yes, the number of retransmissions 1507 in FIG. 38 is incremented and the program proceeds to the step S810 to carry out the electronic mail data conversion process.

In a step S825, since an electronic mail is retransmitted at least once for reducing the data size, and thus a retransmission report must be outputted, the processing status 1511 in FIG. 38 is set to "transmitted", and the transmission completion date and time are set as a transmission time 1512.

The program then proceeds to a step S826 in which the printer 2095 prints a document retransmission report (FIG. 36) to terminate the document reading and transmitting process.

In the step S827, since the electronic mail was transmitted for the first time, and it is therefore unnecessary to output a document retransmission report, the processing status 1511 is set as being "transmitted", and the transmission completion date and time are set as the transmission time 1512 to terminate the document reading and transmitting process.

Figure 20A:
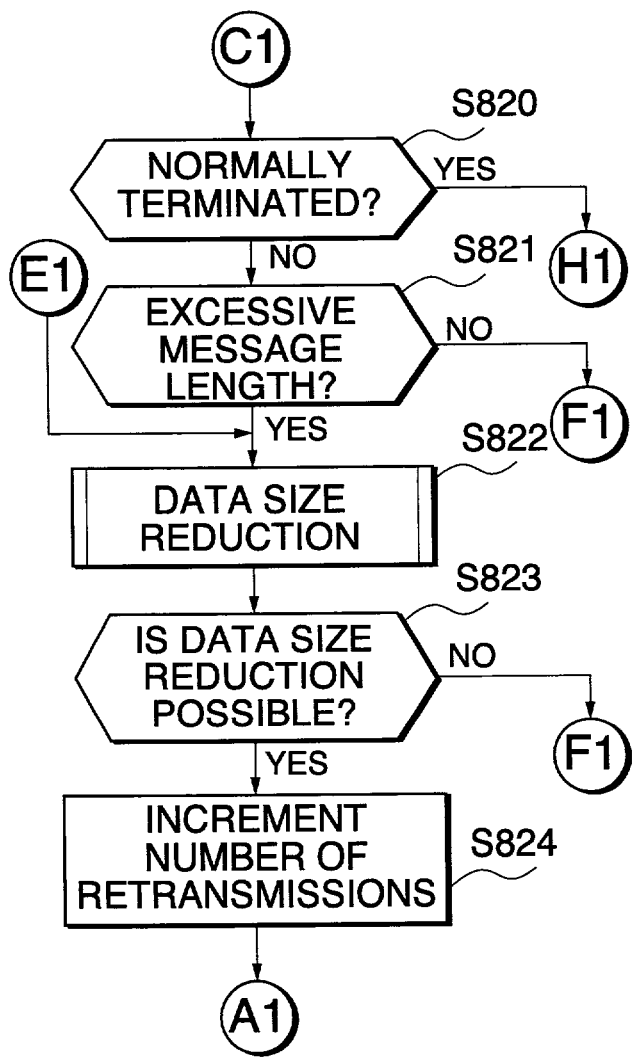
Figure 20B:
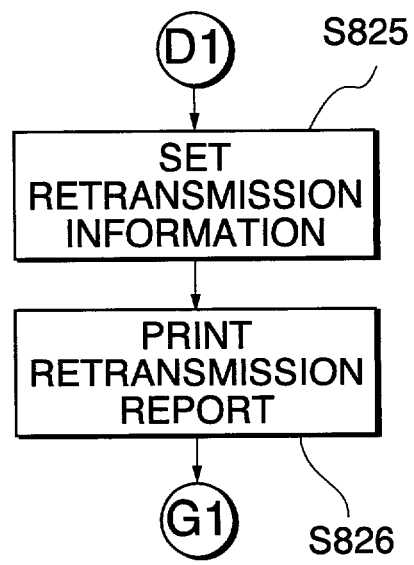
Figure 20C:
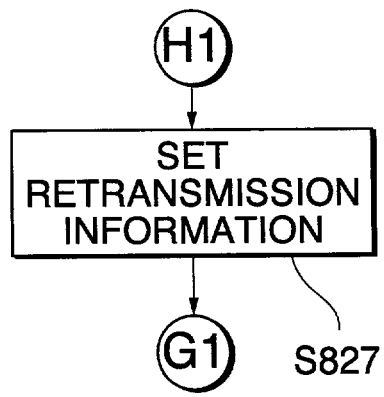
Figure 22:
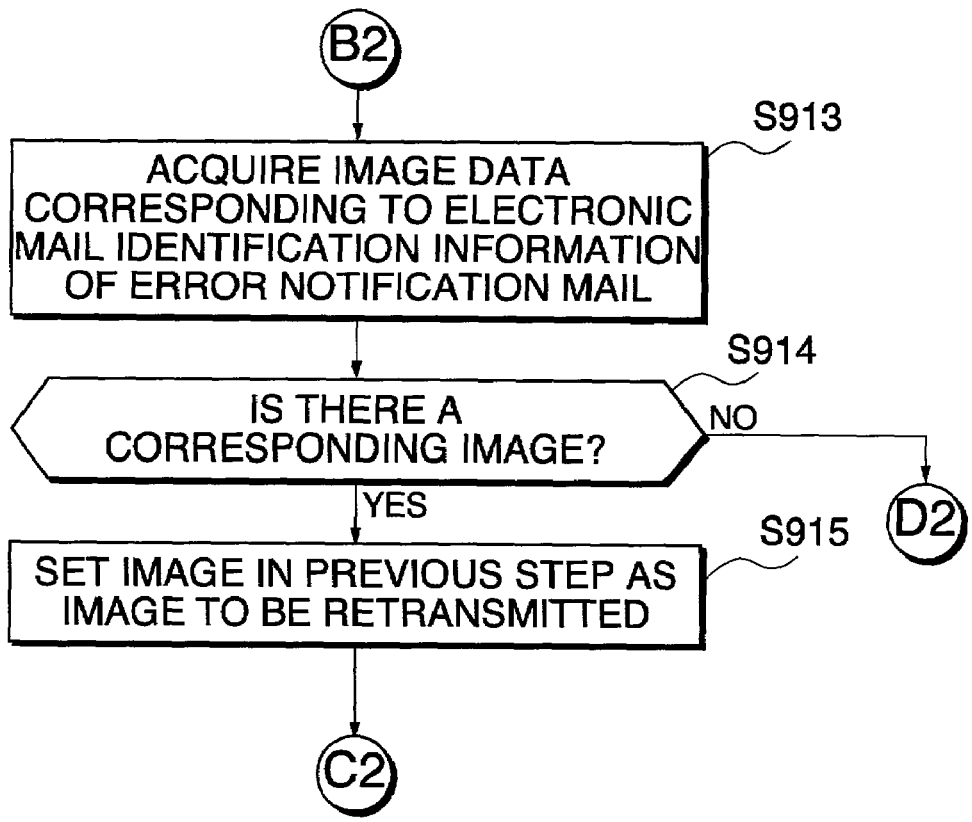
Figure 23:
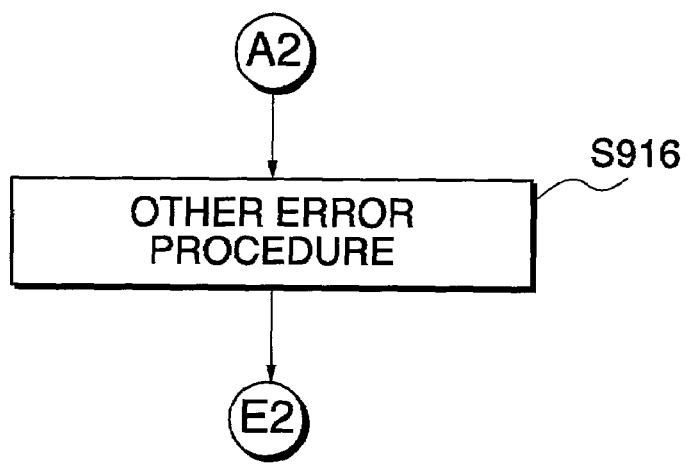

Referring next to FIGS. 43-50 and FIGS. 40-42, a detailed description will be given of the data size reduction in the step S822 in FIG. 20 and the step S910 in FIG. 21.

An outline of the data size reduction will be given first. The data size reduction is carried out by a combination of five processes described below.

Figure 46A:
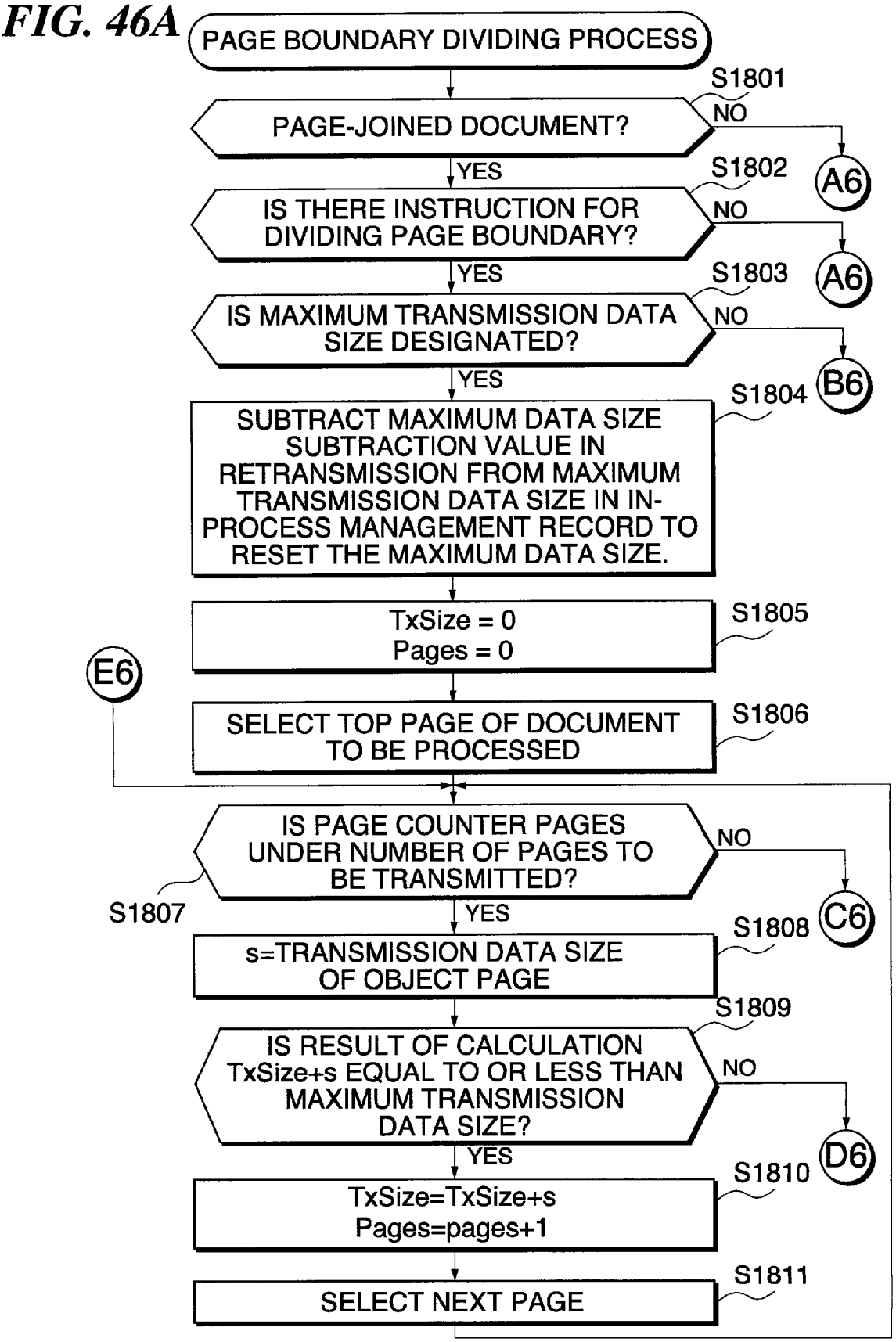
FIGS. 46 and 47 are flow charts showing the procedure for carrying out a capacity reduction process in FIGS. 43-45 by the digital copying machine in FIG. 1.
Figure 46B:
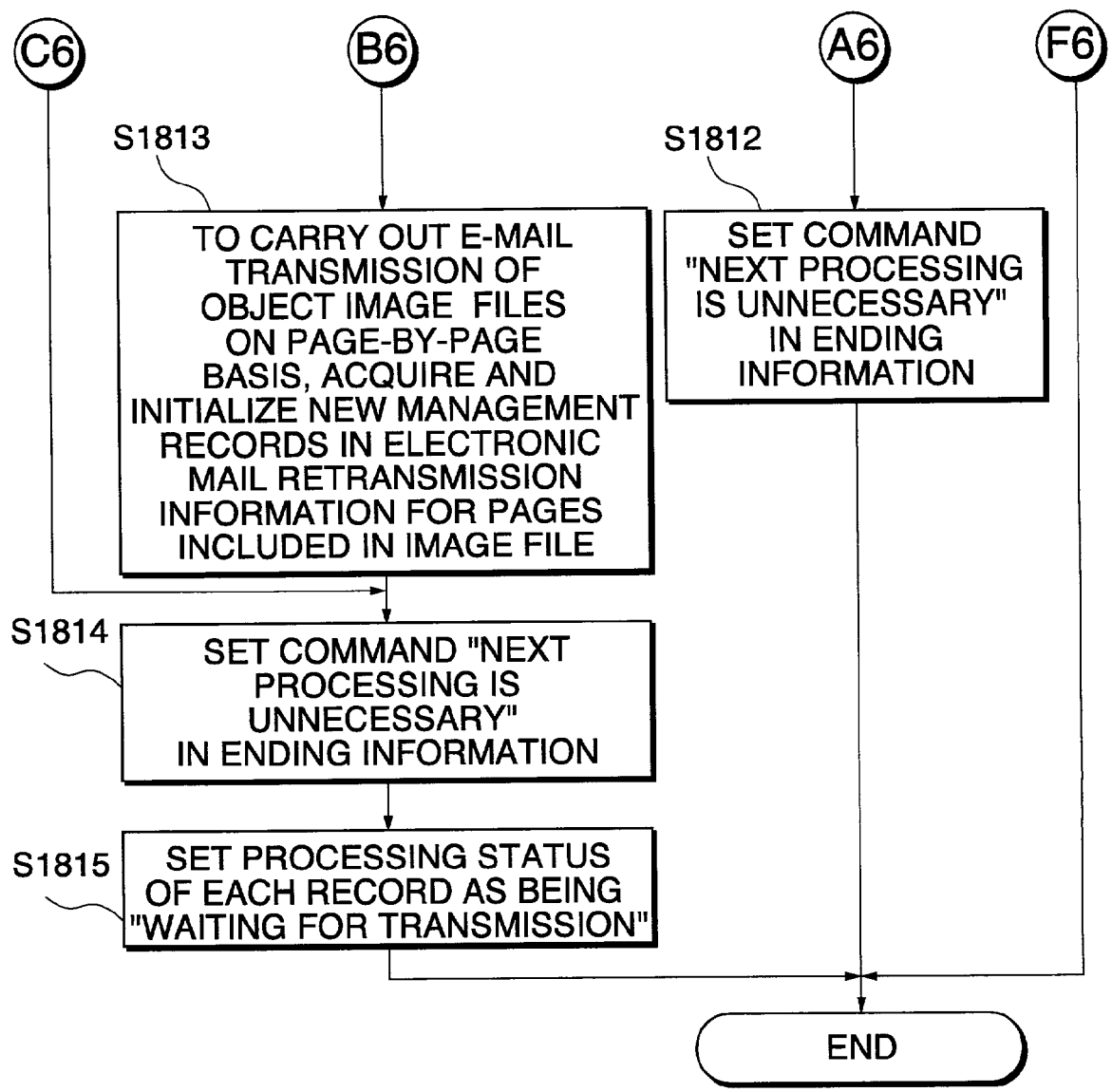
Figure 47:
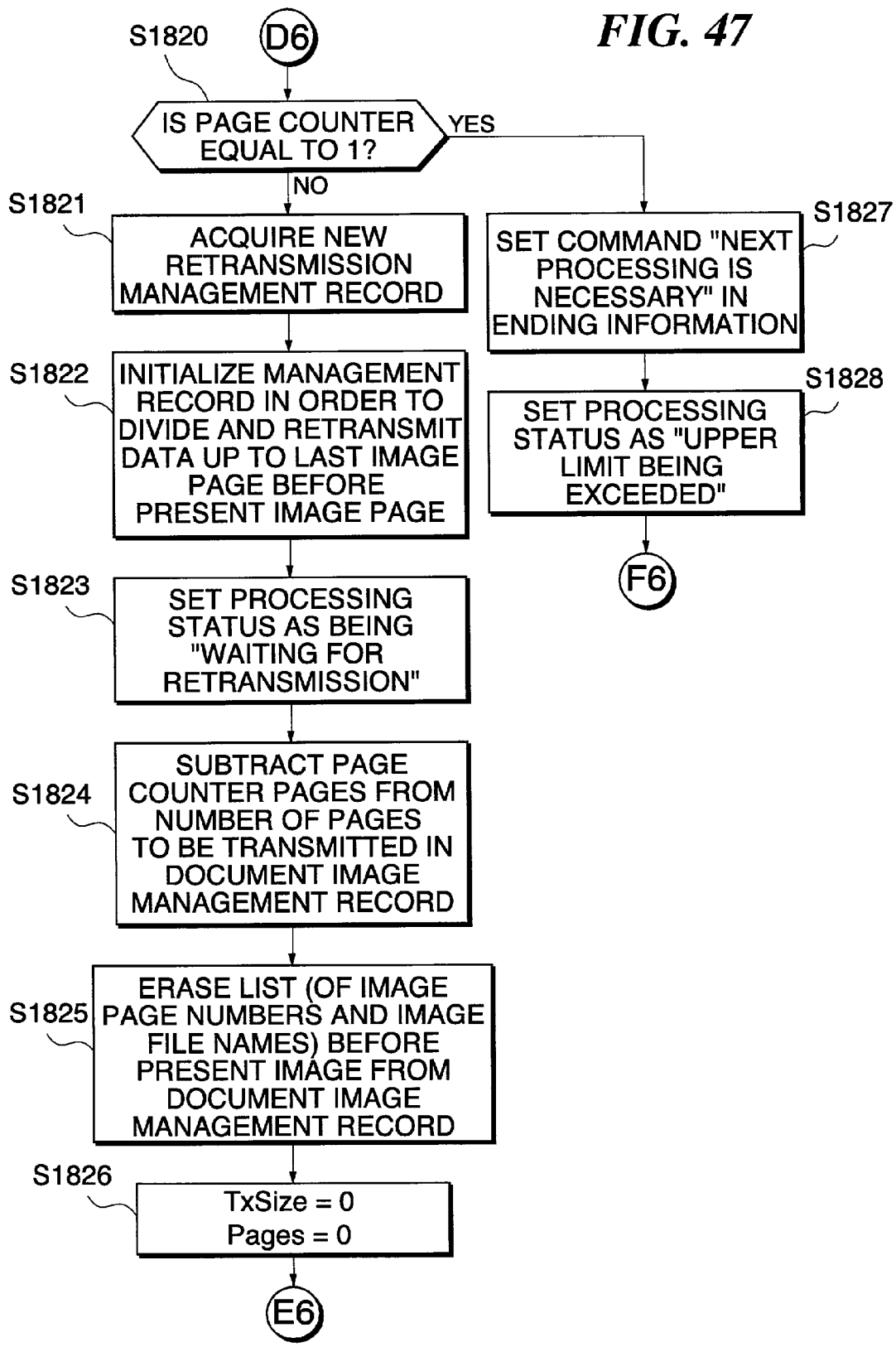

The first data size reduction process is a page boundary dividing process in FIG. 46 in which an image file, which is to be transmitted in one electronic mail transmission session, is divided at page boundaries of a transmitted image. This reduces the data size of one electronic mail.

In the page boundary dividing process, it is determined which image pages will be transmitted together as one transmission data. First, the data size of each image page is sequentially added to the data sizes of previous image pages, starting with the first page. If the resulting data size exceeds the transmissible data size for one transmission session, the image pages prior to the image page whose data size has been added last are transmitted together as one image file in one transmission session. The image page whose data size caused the determination that the sum data size exceeds the transmissible data size is set as the top image page of an image file to be transmitted in a next transmission session, followed by carrying out the above page boundary division determination.

Figure 48A:
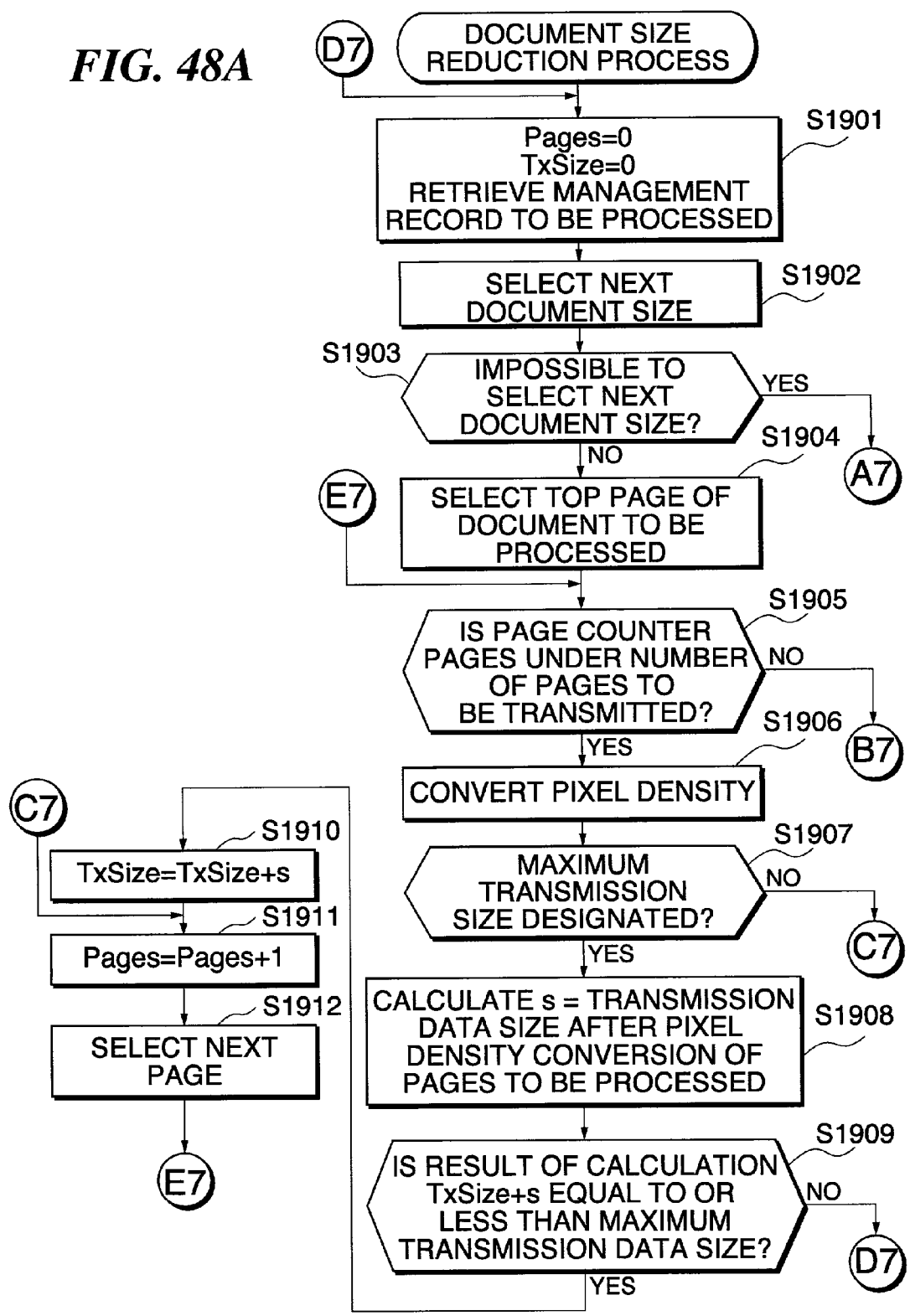
FIG. 48 is a flow chart showing the procedure for reducing the document size in the capacity reduction process in FIGS. 43-45 by the digital copying machine in FIG. 1.
Figure 48B:
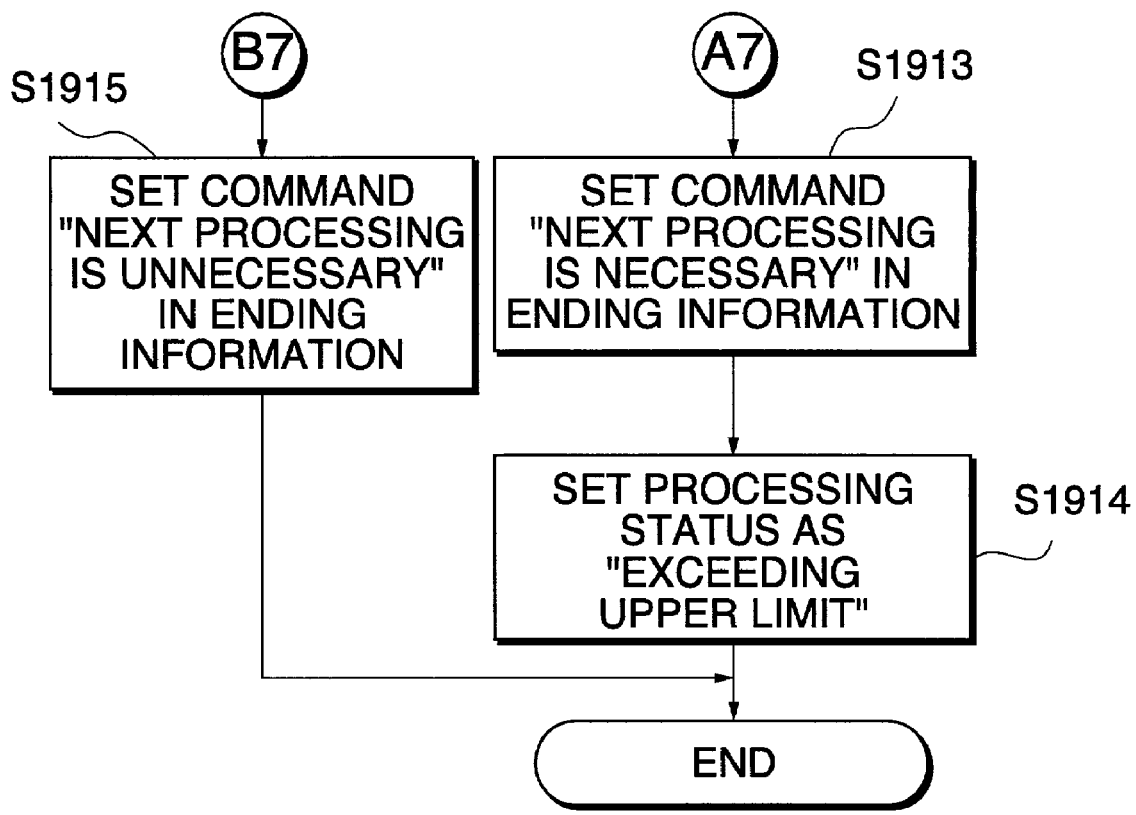

The second data size reduction process is a document size reduction process in FIG. 48 in which the document size of the document image is reduced by one size by pixel density conversion. For example, an image of A4 size is reduced to an image of B4 size.

Figure 49A:
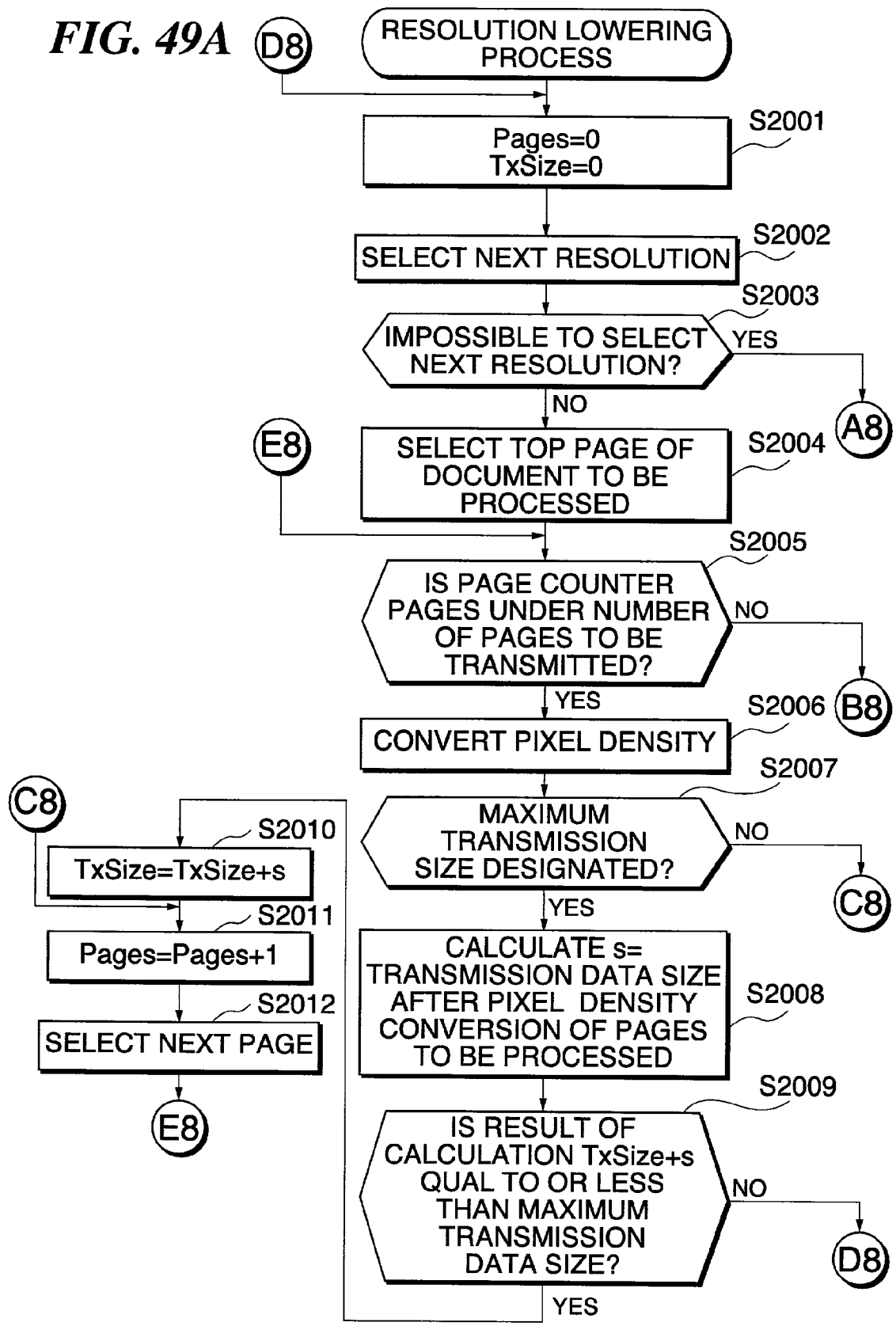
FIG. 49 is a flow chart showing the procedure for lowering the resolution in the data size reduction process in FIGS. 43-45 by the digital copying machine in FIG. 1.
Figure 49B:
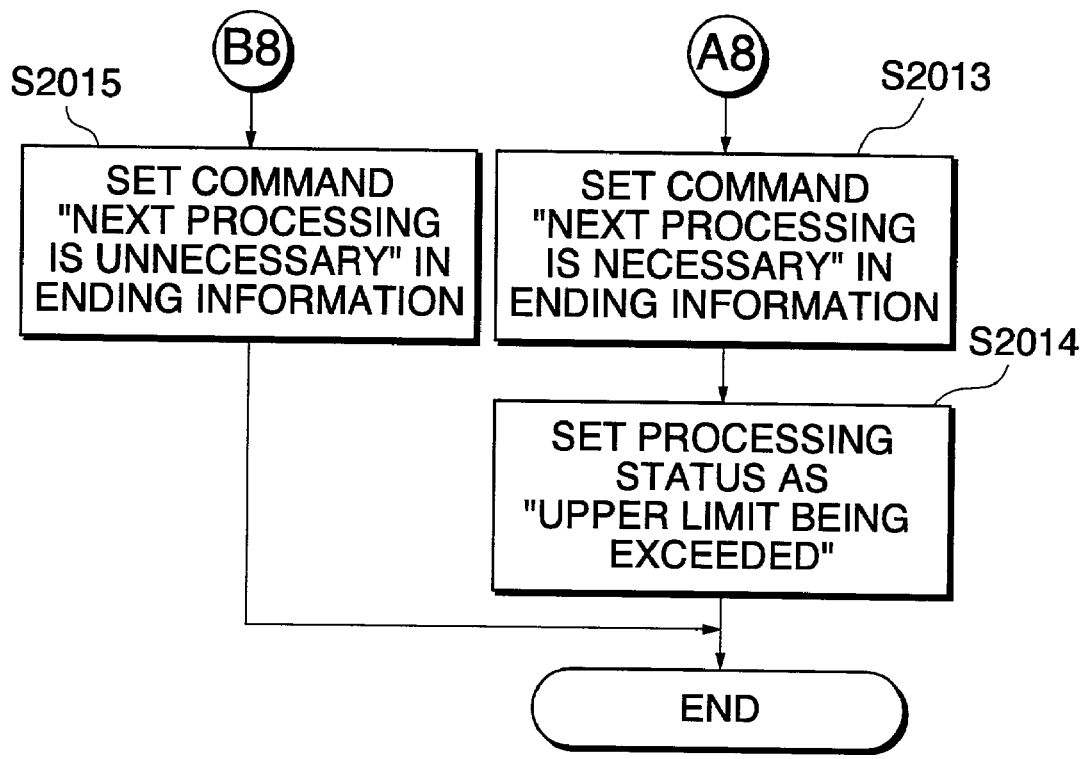

The third data size reduction process is a resolution lowering process in FIG. 49 in which the resolution of the document image is lowered by pixel density conversion. For example, an image with a resolution of 600×600 DPI is converted into an image with a resolution of 400×400 DPI.

Figure 50A:
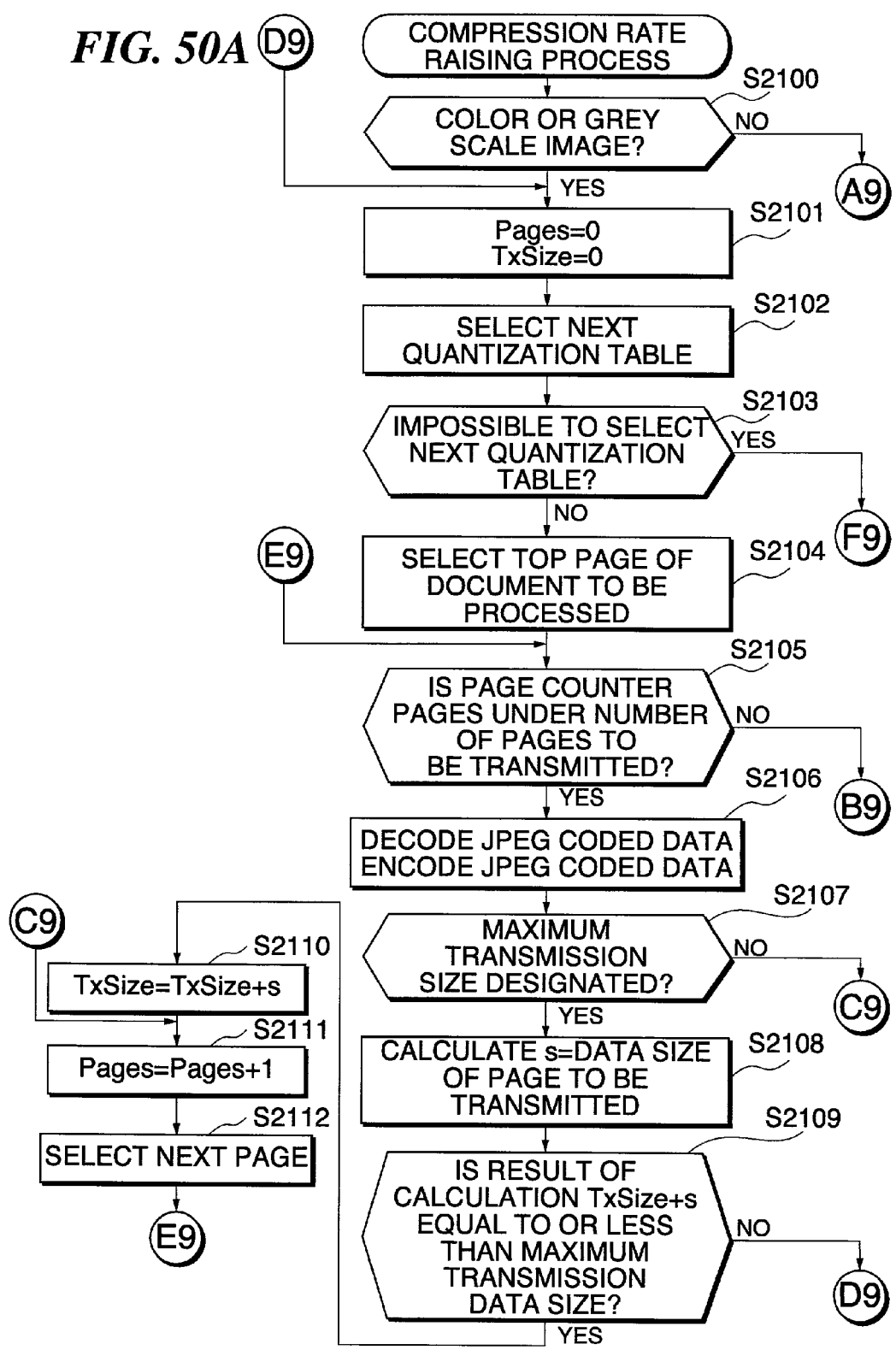
FIG. 50 is a flow chart showing the procedure for raising the compression rate in the data size reduction process in FIGS. 43-45 and the procedure for conversing a color image into a BW (black-and-white) image by the digital copying machine in FIG. 1.
Figure 50B:
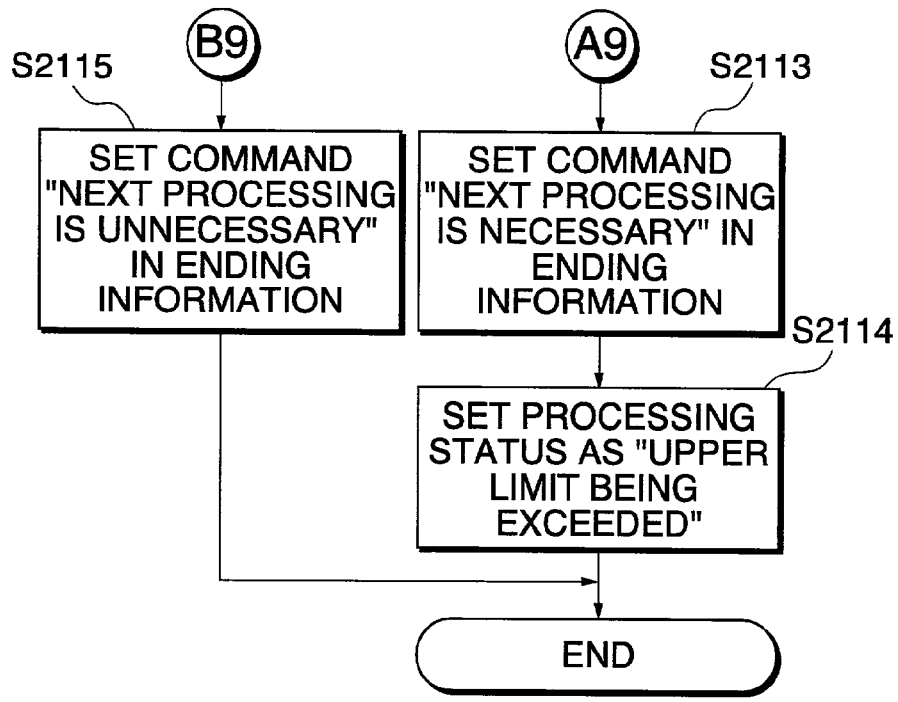
Figure 50C:
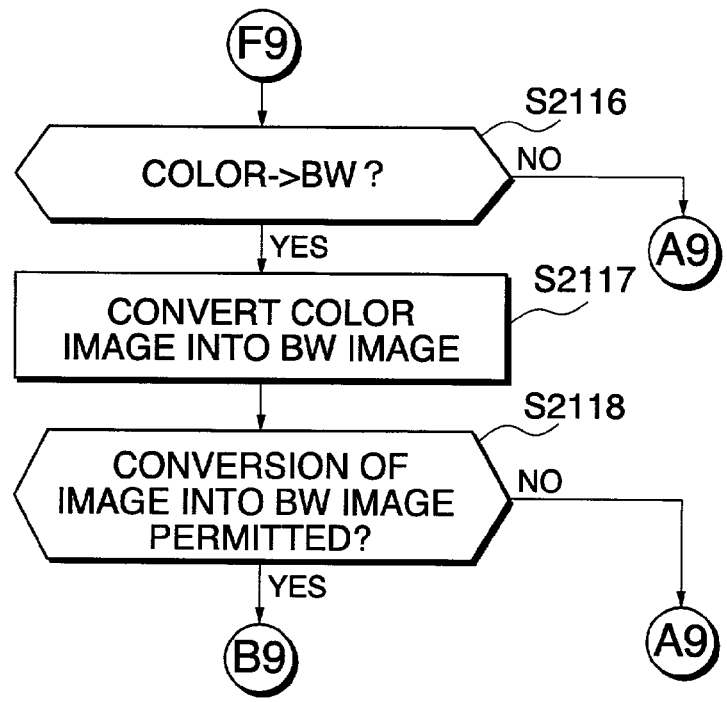

The fourth data size reduction process is a compression rate raising process in FIG. 50, which presupposes that the document image is an irreversibly convertible multivalued JPEG image. According to this process, when a color image of three color components or irreversibly convertible gray scale JPEG data of one component is expanded and recompressed, a quantization table of the document image is switched to a compression-raising quantization table to compress the image to a JPEG image. For example, if a quantization table (with a target compression rate of ¼) 1606 is used to compress a document image 1601 of 8×8 Y (brightness) in FIG. 40, the final JPEG coded data is composed of 50 bits. If a quantization table (with a target compression rate of ¹⁄₁₆) 1605 is used, the finally JPEG coded data is composed of 24 bits. That is, the size of image data is reduced by about 50%.

The fifth data size reduction process is a BW (black-and-white) converting process in a step S2117 in FIG. 50 in which a color image of three components is converted into a gray scale image, a color image of three components is converted into a binary black-and-white image, or a gray scale image is converted into a binary black-and-white image. Although the image conversion manner is not described in detail here, the image is converted by the scanner image processing section 2080 and the image compressing section 2040 in FIG. 1. The scanner image processing section 2080 may generate a plurality of BW images as well as a color image from images scanned on the same surface of a read document and store them as a plurality of image files in the HDD 2004. Thereafter, in transmission, the image file is switched to an image file of BW images for transmission. Alternatively, the image compressing section 2040 may convert a color image or a gray scale image into a gray scale image or a binary black-and-white image as a BW image to reduce the data size prior to the transmission.

The data size reduction process will hereunder be described in further detail with reference to FIGS. 43-50, FIGS. 40-42, etc.

First, the number of divisions 1505 in FIG. 38 is set to 1 in a step S1701 of the data size reduction process in FIG. 43. In the next step S1702, a selected item in the Retransmit Proc. Priority section in the Retransmit Mode Setup column 315 on the control panel in FIG. 12 in a retransmission priority mode is confirmed by a value of the retransmission priority mode in the retransmission mode information 1518 in FIG. 38. From the result, it is determined in a step S703 whether the image quality takes priority or not. If no, the program proceeds to a step S720 in FIG. 44. If yes, the program proceeds to a step S1704 to carry out the page boundary dividing process (FIG. 46).

In the next step S1705, it is determined whether or not the next data size reduction process must be carried out since the page boundary dividing process in the step S1704 cannot reduce the data size. If no, the program proceeds to a step S1715. If yes, the program proceeds to a step S1706 to initialize a loop counter i, which is a program variable for managing a processing loop for carrying out the next data size reduction process (e.g. the document size reduction process) on the divided file (a batch of image page files) obtained in the step S1704, to zero, and to set a return variable Ret, which is used in returning a message indicating whether the data size reduction in FIG. 43 have finally been carried out or not to a side which called the subroutine of the data size reduction process, to NG.

The program then proceeds to a step S1707 to determine whether a loop of the next data reduction has been completed or not. If no, the program proceeds to the step S1715. If yes, the program proceeds to a step S1708 to determine whether the processing status 1511 in the electronic mail retransmission management record is being "upper limit being exceeded" in order to retrieve and sample the data that needs to be further reduced among the divided image files (a unit to be transmitted in one session). If no (the data size does not exceed the upper limit), the program proceeds to a step S1716. If yes, the program proceeds to a step S1709 to carry out the document size reduction process in FIG. 48.

In the next step S1710, it is determined whether a next data size reduction process must be carried out since the data size of a transmitted image cannot be reduced to a target value by the document size reduction process. If no, the program proceeds to the step S1716. If yes, the program proceeds to a step S1711 to carry out the compression rate raising process in FIG. 50.

The program then proceeds to a step S1712 to determine whether the next data size reduction process must be carried out since the data size of a transmitted image cannot be reduced to a target value by the compression rate raising process. If no, the program proceeds to the step S1716. If yes, the program proceeds to a step S1713 to carry out the resolution lowering process in FIG. 49.

In a step S1714, it is determined whether the next data size reduction process must be carried out since the data size of a transmitted image cannot be reduced to a target value by the resolution lowering process. If no, the program proceeds to the step S1716, and if yes, the program proceeds to a step S1718.

In the step S1715, in order to retransmit an image file whose data size has been successfully reduced, the processing status 1511 in the electronic mail retransmission information in FIG. 38 is set as being "waiting for transmission", and the ending information Ret for the data size reduction is set as indicating OK to terminate the data size reduction process.

In the step S1716, the loop counter i is incremented and the program then proceeds to a step S1717. In the step S1717, a next management record whose document number coincides with a document number (e.g. 1509) in the management record of the electronic mail retransmission information in FIG. 38 is selected in order to retrieve a next retransmission record for retransmission data divided by the page boundary dividing process. The program then proceeds to the step S1707.

It should be noted that if a certain document image file is divided by the page boundary dividing process, a document number of a management record for managing the document image file is set as document numbers of all the management records for managing the divided image files.

In the step S1718, the ending information Ret on the data size reduction process is set to NG in order to inform the calling side that it is unnecessary to retransmit an image file whose data size has been unsuccessfully reduced. The data size reduction process is then terminated.

Figure 44A:
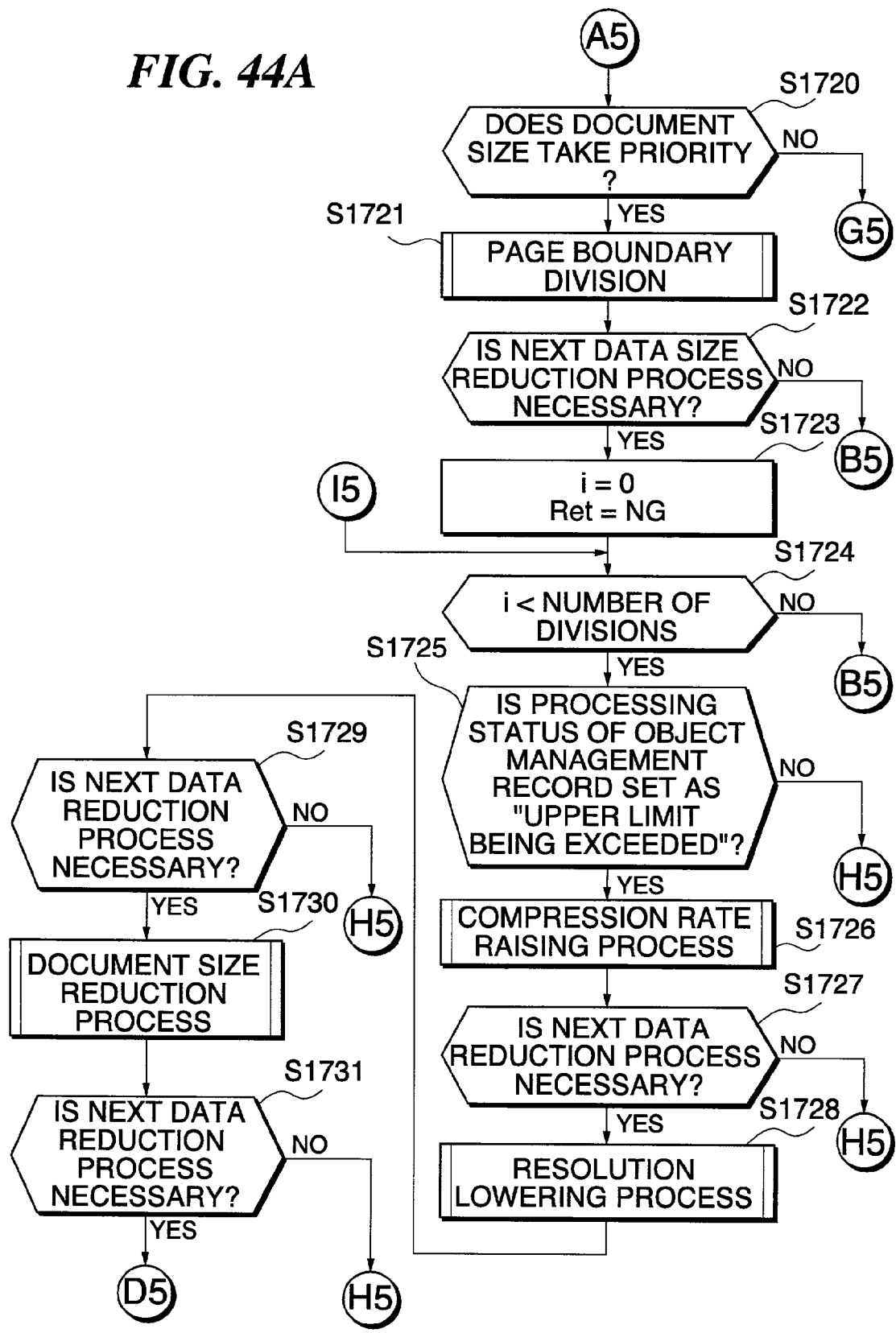
Figure 44B:
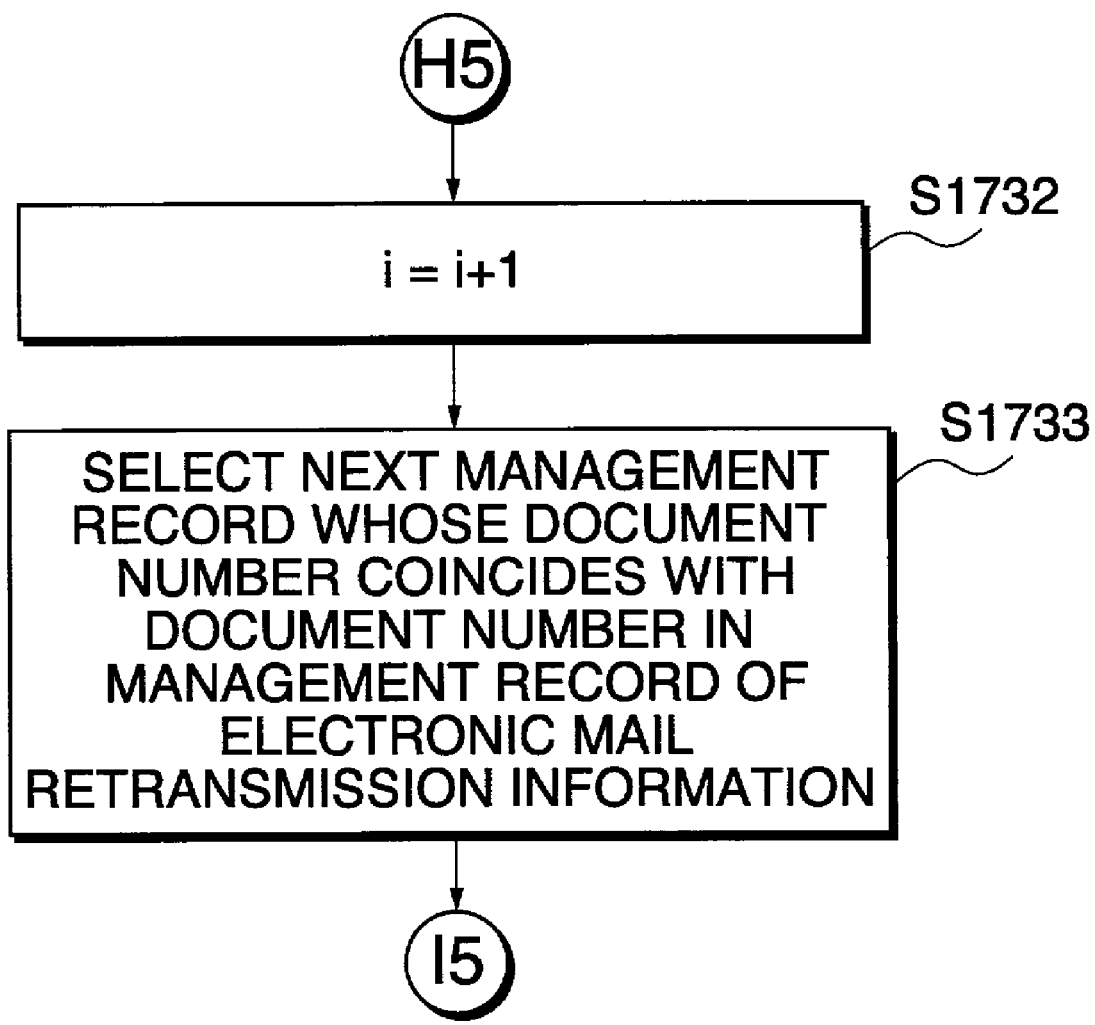

In a step S1720 in FIG. 44, it is determined whether the document size takes priority (Document Size 320 in FIG. 12) in the retransmission priority mode. If no, the program proceeds to a step S1740 in FIG. 45. If yes, the program proceeds to a step S1712 to carry out the page boundary dividing process in FIG. 46.

The program then proceeds to a step S1722 to determine whether the next capacity reduction process must be carried out after the page boundary dividing process. If no, the program proceeds to the step S1715 in FIG. 43. If yes, the program proceeds to a step S1723 to initialize the loop counter i to zero and set the return variable Ret, which is used in returning a message indicating whether the data size reduction in FIG. 43 has been carried out or not to the side which called the data size reduction process sub routine, to NG.

The program then proceeds to a step S1724 to determine whether the processing loop should be continued or not. If no, the program proceeds to the step S1715 in FIG. 43. If yes, it is determined whether a next data size reduction process other than the page boundary dividing process must be carried out since the processing status of the management record is set as "the upper limit being exceeded". If no, the program proceeds to a step S1732. If yes, the program proceeds to a step S1726 to carry out the compression rate raising process.

The program then proceeds to a step S1727 to determine whether it is necessary to carry out a next data size reduction process other than the compression rate raising process. If no, the program proceeds to the step S1732. If yes, the program proceeds to a step S1728 to carry out the resolution lowering process.

The program then proceeds to a step S1729 to determine whether it is necessary to carry out a next data size reduction process other than the resolution lowering process. If no, the program proceeds to the step S1732. If yes, the program proceeds to a step S1730 to carry out the document size reduction process.

The program then proceeds to a step S1731 to determine whether it is necessary to carry out a next data reduction process other than the document size reduction process. If no, the program proceeds to the step S1718 in FIG. 43.

Figure 45:
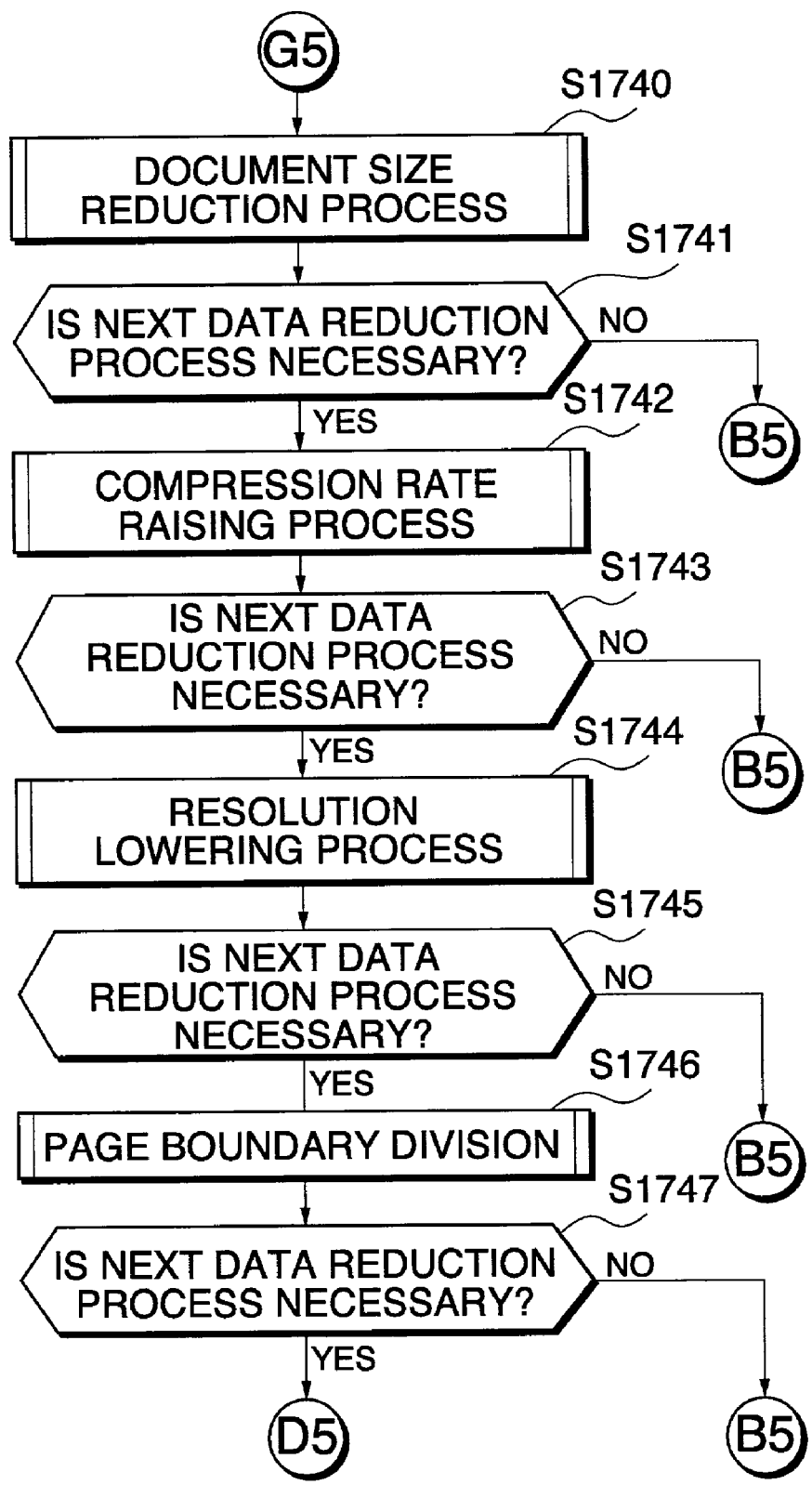

In a step S1740 in FIG. 45, the document size reduction process is carried out as shown in FIG. 48. The program then proceeds to a step S1741 to determine whether it is necessary to carry out a next data size reduction process other than the document size reduction process. If no, the program proceeds to the step S1715 in FIG. 43.

If yes, the program proceeds to a step S1742 to carry out the compression rate raising process.

The program then proceeds to a step S1743 to determined whether it is necessary to carry out a next data size reduction process other than the compression rate raising process. If no, the program proceeds to the step S1715 in FIG. 43. If yes, the program proceeds to a step S1744 to carry out the resolution lowering process.

The program then proceeds to a step S1745 to determine whether it is necessary to carry out a next data size reduction process other than the resolution lowering process. If no, the program proceeds to the step S1715 in FIG. 43. If yes, the program proceeds to a step S1746 to carry out the page boundary dividing process.

The program then proceeds to a step S1747 to determine whether it is necessary to carry out a next data size reduction process other than the page boundary dividing process. If no, the program proceeds to the step S1715 in FIG. 43. If yes, the program proceeds to the step S1718 in FIG. 43.

FIG. 46 is a flow chart showing the procedure for carrying out the page boundary dividing process.

First, in a step S1801, whether an image file to be processed is a page-joined document whose plural image pages are transmitted in one communication is determined by referring to the number of transmitted pages in the transmission image file information 1510 in FIG. 38. If the number of transmitted pages is one, the program proceeds to a step S1812 based on a determination that the image file is not the page-joined document. If the number of pages to be transmitted is two or more, the program proceeds to a step S1802 based on a determination that the image file is the page-joined document. In the step S1802, it is determined whether there is an instruction for dividing the page boundaries in the retransmission mode information 1518 in FIG. 38. If no, the program proceeds to a step S1812. If yes, the program proceeds to a step S1803 to determine whether the maximum transmission size is designated in the retransmission mode information 1518 in FIG. 38. If no, the program proceeds to a step S1813. If yes, the program proceeds to a step S1804 wherein a maximum data size subtraction value in retransmission is subtracted from the maximum transmission data size in the in-process retransmission mode information 1518 to reset the maximum data size.

The program then proceeds to a step S1805 to set a variable TxSize, which represents the size of image data, to zero and to set a value of a page counter Pages to zero.

The program then proceeds to a step S1806 to select a top page of the in-process image file. The program then proceeds to a step S1807 to compare the value of the page counter Pages with the number of pages to be transmitted in the transmission image file information 1510 in FIG. 38 to determine whether the value of the page counter Pages is under the number of pages to be transmitted. If no, the program proceeds to a step S1814. If yes, the program proceeds to a step S1808 to store a value, which is obtained by multiplying the data size of an object image page by 1.5 (in the case where the image data is coded by a Base 64 coding process when an Email is transmitted), as a variable s.

The program proceeds to a step S1809 to determine whether the sum of the variable TxSize and the variable s is smaller than the maximum transmission data size in the in-process retransmission mode information 1518 in FIG. 38. If no, the program proceeds to a step S1820. If yes, the program proceeds to a step S1810 to carry out the flowing operations: TxSize=Txsize+s and Pages=Pages+1. After the execution of the step S1810, the program proceeds to a step S1811 to select a next image page. The program then proceeds to the step S1807.

In the step S1812, a command "next processing is unnecessary" is set in the ending information as a return value of the page boundary dividing process.

In the step S1813, in order to carry out e-mail transmission of object image files on image file-by-image file basis, new management records in the electronic mail retransmission information in FIG. 38 for the pages included in the image file are acquired and each management record is initialized, and the number of registered records 1502 is incremented by a value corresponding to the additional number of image pages.

The program then proceeds to the step S1814 to set the command "next processing is unnecessary" as the ending information and set the processing status (e.g. 1511) of each newly acquired management record as being "waiting for transmission". Then, the electronic mail transmitting section is informed that the retransmission will be carried out, and the processing is ended.

In the step S1820, it is determined whether the value of the page counter Pages is equal to 1 or not. If yes, the program proceeds to a step S1827. If no, the program proceeds to a step S1821 to acquire a new management record for the electronic mail retransmission information in FIG. 38 and increment the number of registered records 1502.

The program then proceeds to a step S1822 to perform calculation to find the contents of the transmission image file information in the management record in order to retransmit data up to the last image page before the present image page, and set the calculated contents. For example, the value of the page counter Pages is set as the number of pages to be transmitted. The processing status (e.g. 1511) of the management record is set as "waiting for transmission" to transmit the pages.

The program then proceeds to a step S1824 to subtract the value of the page counter Pages from the number of pages to be transmitted in the document image management record for the image file before division and set the resulting difference as the number of pages remaining for transmission. The value of the page counter Pages is set as the number of pages to be transmitted in the new management record.

The program then proceeds to a step S1825 to erase a list of image page numbers and image file names before the present image from the document image management record for the image file before division and set the erased list in the new management record. The program then proceeds to a step S1826 to initialize the variable TxSize and the page counter Pages to zero. The program then proceeds to the step S1807.

In the step S1827, the ending information is set as indicating "next processing is necessary and division is complete", and in a step S1828, the processing status (e.g. 1511) of the divided management records is set as "the upper limit is exceeded", followed by terminating the page boundary dividing process.

There will now be described the document size reduction process with reference to the flow chart of FIG. 48 showing the flow of the document size reduction process and FIG. 38 showing the structure of the electronic mail retransmission management data.

In a step S1901, the variable TxSize for adding a value representing the data size of an image is set to 0, and the page counter Pages is set to 0. The management record in which the processing status (e.g. 1511) is set as "the upper limit is exceeded" is retrieved and selected.

The program then proceeds to a step S1902 wherein the smallest document size (e.g. A4 size 314) but the document size 1514 (e.g. B4 size) of the last transmitted document in FIG. 38 is selected from a list of document sizes in the retransmission mode information 1518 (a list of document sizes specified in the Document Size Conversion Setup column 311 in FIG. 12).

The program proceeds to a step S1903 wherein it is determined whether the next document size can be selected or not. If no, the program proceeds to a step S1913. If yes, the top page of the processing object is selected in a step S1904.

The program then proceeds to a step S1905 wherein the value of the page counter Pages is compared with the number of pages to be transmitted in, e.g. the transmission image file information 1510 in FIG. 38 to determine whether or not the value of the page counter Pages is under the number of pages to be transmitted. If no, the program proceeds to a step S1915. If yes, the program proceeds to a step S1906 wherein the image compressing section 2040 to perform the document size reduction (e.g. conversion from the B4 size to the A4 size) and the image compression (e.g. the MMR coding compression for a binary image and the JPEG coding compression for a multivalued image) by its pixel density converting function, and the converted image data size is stored.

The program proceeds to a step S1907 to determine whether or not a large transmission data size (the maximum transmission size) is designated in the retransmission mode information 1518 in FIG. 38. If no, the program proceeds to a step S1911. If yes, the program proceeds to a step S1908 wherein the image data size stored in the pixel density conversion step S1906 is multiplied by a data increasing rate (e.g. 1.5 in the Base 64 conversion) in the conversion for the Email transmission, and the result of multiplication is then stored as the variable s.

The program then proceeds to a step S1909 wherein it is determined whether or not the result of the calculation TxSize+s is equal to or less than the maximum transmission data size in the retransmission mode information (e.g. 1518). If no, the program proceeds to the step S1901. If yes, the program proceeds to a step S1910 wherein the result of the calculation TxSize+s is stored as the variable TxSize.

The program then proceeds to the step S1911 wherein the value of the page counter Pages is incremented and stored. The program then proceeds to a step S1912 wherein an image to be processed next is selected from the list (of image page numbers and image file names) in the transmission image file information (e.g. 1510) in FIG. 38. The program then proceeds to the step S1905.

In the step S1913, the ending information is set as indicating that "next processing is necessary", and in a step S1914 the processing status (e.g. 1511) in the management record is set as "the upper limit is exceeded", followed by terminating the document size reduction process.

In the step S1915, the ending information is set as indicating that "next processing is unnecessary" followed by terminating the document size reduction process.

There will now be described the procedure for carrying out the resolution lowering process with reference to FIG. 49 showing the flow chart of the resolution lowering process and FIG. 38 showing the structure of the electronic mail retransmission management data.

In a step S2001, the variable TxSize for adding a value representing the image data size is set to 0, and the page counter Pages is set to 0. A management record in which the processing status (e.g. 1511) is set as "the upper limit is exceeded" is retrieved and selected.

The program then proceeds to a step S2002 wherein the lowest resolution (e.g. 400×400 DPI 310)but the resolution (e.g. 600×600 DPI) 1513 of the last transmitted document in FIG. 38 is selected from a list of resolutions in the retransmission mode information 1518 (a list of resolutions specified in the Resolution Conversion Setup column 307 in FIG. 12).

The program proceeds to a step S2003 wherein it is determined whether the next resolution can be selected or not. If no, the program proceeds to a step S2013. If yes, the top page of the processing object is selected in the step S2004.

The program then proceeds to a step S2005 wherein a value of the page counter Pages is compared with the number of pages to be transmitted in, e.g. the transmission image file information 1510 in FIG. 38 to determine whether or not the value of the page counter Pages is under the number of pages to be transmitted. If no, the program proceeds to a step S2015. If yes, the program proceeds to a step S2006 wherein the image compressing section 2040 is caused to perform the resolution reduction (e.g. conversion from 600×600 DPI to 400×400 DPI) and the image compression (e.g. MMR coding for a binary image and JPEG coding for a multivalued image) by its pixel density converting function, and the converted image data size is stored.

The program proceeds to a step S2007 to determine whether or not a large transmission data size (the maximum transmission size) is designated in the retransmission mode information 1518 in FIG. 38. If no, the program proceeds to a step S2011. If yes, the program proceeds to a step S2008 wherein the image size data size stored in the pixel density conversion step S2006 is multiplied by the data increasing rate (e.g. 1.5 in the Base 64 conversion) in the conversion for the Email transmission, and the result of multiplication is then stored as the variable s.

The program then proceeds to a step S2009 wherein it is determined whether or not the result of the calculation TxSize+s is equal to or less than the maximum transmission data size in the retransmission mode information (e.g. 1518). If no, the program proceeds to the step S2001. If yes, the program proceeds to a step S2010 wherein the result of the calculation TxSize+s is stored as the variable TxSize.

The program then proceeds to the step S2011 wherein the value of the page counter Pages is incremented and stored. The program then proceeds to a step S2012 wherein an image to be processed next is selected from the list (of image page numbers and image file names) in the transmission image file information (e.g. 1510) in FIG. 38. The program then proceeds to a step S2005.

In the step S2013, the ending information is set as indicating that "next processing is necessary", and in a step S2014 the processing status (e.g. 1511) in the management record is set as "the upper limit is exceeded", and then the processing is terminated.

In the step S2015, the ending information is set as indicating that "next processing is unnecessary" and then the processing is terminated.

There will now be described the resolution lowering process with reference to FIG. 50 showing the compression raising process and FIGS. 40-42 showing the flow chart of the JPEG compression, and FIG. 38 showing the structure of the electronic mail retransmission management data.

In a step S2100, it is determined whether an image page to be processed is comprised of a color image or a gray scale image. If the image page is comprised of a black-and-white binary image (NO), the program proceeds to a step S2113. If the image page is comprised of the color or gray scale image (YES), in a step S2101 the variable TxSize for adding a value representing the image data size is set to zero, the page counter Pages is set to 0, and a management record in which the processing status (e.g. 1511) is set as "the upper limit is exceeded" is retrieved and selected in the step S2100.

The program proceeds to a step S2102 to select a quantization table corresponding to the number of retransmissions (e.g. 1507) in FIG. 38. More specifically, in the example of FIG. 40, the quantization table (the target compression rate is ¼) 1606 is used for the first transmission (not retransmission), and a quantization table (the target compression rate is ⅛), not shown in FIG. 40 is used for the second transmission (the first retransmission). Finally, a quantization table (the target compression rate is 1/16) is used for the fourth transmission (the third retransmission).

Thus, the quantization table is switched to another quantization table with a higher compression rate every time the retransmission is performed, to compress the image data into a JPEG-coded image data for transmission.

The program then proceeds to a step S2103 to determine whether the next quantization table can be selected or not. If no, the program proceeds to a step S2116. If yes, the program proceeds to a step S2104 to select the top page of the document to be processed.

The program then proceeds to a step 2015 wherein the value of the page counter Pages is compared with the number of pages to be transmitted in, e.g. the transmission image file information 1510 in FIG. 38 to determine whether or not the value of the page counter Pages is under the number of pages to be transmitted. If no, the program proceeds to a step S2115. If yes, the program proceeds to a step S2106 wherein the image compressing section 2040 is caused to decode the last transmitted JPEG code file to convert the image data into a RGB image and compress the image data into a JPEG coded image data with use of the quantization table selected in the step S2102, by its JPEG compressing/expanding function, and then the converted image data size is stored.

The program proceeds to a step S2107 to determine whether or not a large transmission data size (the maximum transmission size) is designated in the retransmission mode information 1518 in FIG. 38. If no, the program proceeds to a step S2111. If yes, the program proceeds to a step S2008 wherein the image size data size stored in the pixel density conversion step S2106 is multiplied by the data increasing rate (e.g. 1.5 in the Base 64 conversion) in the conversion for the Email transmission, and the result of multiplication is then stored as the variable s.

The program then proceeds to a step S2109 wherein it is determined whether or not the result of the calculation TxSize+s is equal to or less than the maximum transmission data size in the retransmission mode information (e.g. 1518). If no, the program proceeds to the step S2101. If yes, the program proceeds to a step S2110 wherein the result of the calculation TxSize+s is stored as the variable TxSize.

The program then proceeds to the step S2111 wherein the value of the page counter Pages is incremented and stored. The program then proceeds to a step S2112 wherein an image to be processed next is selected from the list (of image page numbers and image file names) in the transmission image file information (e.g. 1510) in FIG. 38. The program then proceeds to the step S2105.

In the step S2113, the ending information is set as indicating that "next processing is necessary", and in a step S2114 the processing status (e.g. 1511) in the management record is set as "the upper limit is exceeded", and then the resolution lowering process is terminated.

In the step S2115, the ending information is set as indicating that "next processing is unnecessary", and then the resolution lowering process is terminated.

In the step S2116, whether the conversion from a color image to a black-and-white image is permitted in the Color→BW Conversion Setup column 333 in FIG. 12 is determined according to whether or not a colors→black-and-white image conversion is designated in the retransmission mode information (e.g. 1518) in FIG. 38. If the conversion is not permitted (NO), the program proceeds to the step S2113. If the conversion is permitted (YES), the program proceeds to a step S2117 wherein the image compressing section 2040 is caused to convert the color image into a black-and-white image by its multivalued image→black-and-white image converting function (a gray scale image converting function for a RGB image or a binary image converting function for a RGB image/gray scale image). Further, the image compressing function 2040 is caused to code the image data (MMR coding for a binary black-and-white image and JPEG coding for a multivalued image), and the transmission data size of the coded image data is calculated as in the step S2108.

The program proceeds to a step S2118 wherein the result of the transmission data size calculation is reviewed by the same procedures as in the steps S2108 and S2109. If the transmission data size exceeds the maximum data size (NO), the program proceeds to the step S2113. If the transmission data size is not greater than the maximum data size (YES), the program proceeds to the step S2115.

Referring next to FIG. 38, there will now be described the retransmission management data stored in the RAM 2002. FIG. 38 shows the structure of the retransmission management data stored in the RAM 2002 of the digital copying machine in FIG. 1.

As shown in FIG. 38, the RAM 2002 has a storage area that contains the retransmission management data for managing a plurality of pieces of electronic mail retransmission information. The retransmission management data is comprised of a message ID base 1501 containing a host domain name (e.g. dsnmail.dsn.gp2dp.co.jp), the number of registered records 1502, a clear time 1503, the in-process record 1504, a message ID check mode 1505, and a plurality of pieces of electronic mail retransmission information (1-N) 1515 to 1517. Each piece of electronic mail retransmission information includes the message ID 1506, a minimum resolution 1507, a minimum document size 1508, information 1510 indicating whether images are stored or not, an image file name 1511, the transmission time 1512, the resolution of the last transmission 1513, and the document size of the last transmission 1514.

The minimum resolution 1507 is the lowest resolution among the resolutions that are designated in the resolution column 310 on the operation screen in FIG. 12 for use in retransmission of image data whose resolution is converted into a lower one than the resolution for reading of attached image data. The minimum document size 1508 is the smallest size among the sizes that are designated by checking a corresponding size in the document size column 314 in FIG. 12. If a check mark is put in the Document Delete After Tx column 318, the information 1510 indicating whether images are stored or not is set as indicating that "no image is stored" so as to erase an image after the transmission. If no check mark is put in the Document Delete After Tx column 318, the information 1510 is set as indicating that "image is stored". The name of an image file stored as a TIFF file in the step S804 is set as the image file name 1511. Time cancel information for clearing image data is set as the transmission time 1512. The resolution of an image in the first transmission or retransmission is set as the resolution in the last transmission 1513. The document size in the first transmission or retransmission is set as the document size in the last transmission 1514.

Figure 16:
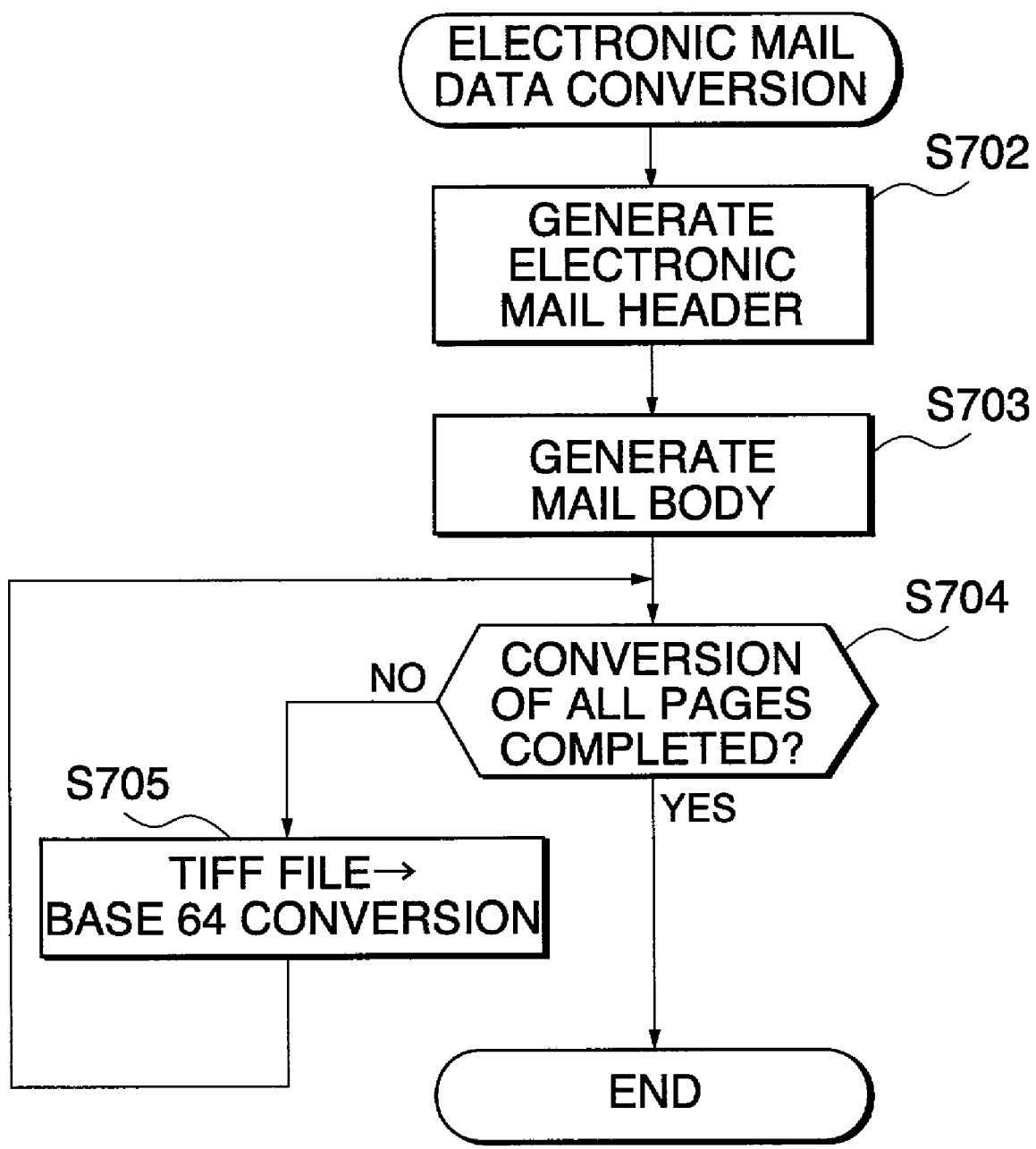
FIG. 16 is a flow chart showing the procedure for converting electronic mail data in a step S805 in FIG. 17.

Referring next to FIG. 16, there will be described the electronic mail data conversion process in the step S805. FIG. 16 is a flow chart showing the procedure for converting the electronic mail data in the step S805 of FIG. 17.

In the electronic mail data conversion process, first, an electronic mail header is generated in a step S702 as shown in FIG. 16. Identification information ("Message-Id") for specifying an electronic mail, a domain name, destination address information, source mail address information, subject information indicating that the electronic mail is an Internet FAX, data structure information, and the like are written in the electronic mail header. For example, the data structure information indicates that the data is comprised of mail body and a TIFF file containing image data read from a document.

The program proceeds to a step S703 to generate mail body. Here, a character string (SIFT_JIS character string) entered in the "Comments" section 305 in FIG. 12 is converted into an ISO 2022 code extended in Japanese, and the ISO 2022 code is inserted as electronic mail data. The program then proceeds to a step S704 to determine whether or not the conversion of all the pages has been completed. If all the pages have not been converted, the program proceeds to a step S705 to add a TIFF file, which has been generated for every image page attached, by performing binary/ASCII conversion based on the Base 64 conversion program. The program then returns to the step S704 to complete the conversion of all pages, and then the electronic mail data conversion process is terminated.

The Base 64 conversion program will not be described in detail here since it is well known.

Referring next to FIGS. 21-24, there will be described a retransmission control process. FIGS. 21-24 are flow charts showing the procedure for executing the retransmission controlling process by the digital copying machine in FIG. 1.

In the retransmission control process, first, an electronic mail receiving process is carried out in a step S901 as shown in FIG. 21. When the electronic mail is received in the next step S902, the program proceeds to a step S903 to carry out an error notification mail analyzing process. The error notification mail analyzing process will be detailed later.

The program then proceeds to a step S904 to determine whether or not an analysis result A of the error notification mail analyzing process indicates an "error notification mail". If no, the program proceeds to a step S920 in FIG. 24 to carry out a normal electronic mail reception process and terminate the error notification mail analyzing process. If yes, the program proceeds to a step S905 to determine whether or not an analysis result B indicates that "excessive message length". If no, the program proceeds to a step S916 in FIG. 23 to carry out another error process. In the next step S920 in FIG. 24, the normal electronic mail reception process is carried out, followed by terminating the error notification mail analyzing process.

If the analysis result B indicates that "excessive message length", the program proceeds to a step S906 to determine whether or not an analysis result C indicates that an image is attached to the error notification mail. If no, the program proceeds to a step S913 in FIG. 22 to acquire electronic mail retransmission information corresponding to the electronic mail identification information on the error notification mail. Here, a message ID of each electronic mail retransmission information in the retransmission management data (shown in FIG. 38) is retrieved. If there is electronic mail retransmission information with the same message ID as that of the received electronic mail, this electronic mail retransmission information is acquired. The program then proceeds to a step S914 to determine whether image data exists or not, by referring to the presence or absence of stored image data in the electronic mail retransmission information.

Figure 24:
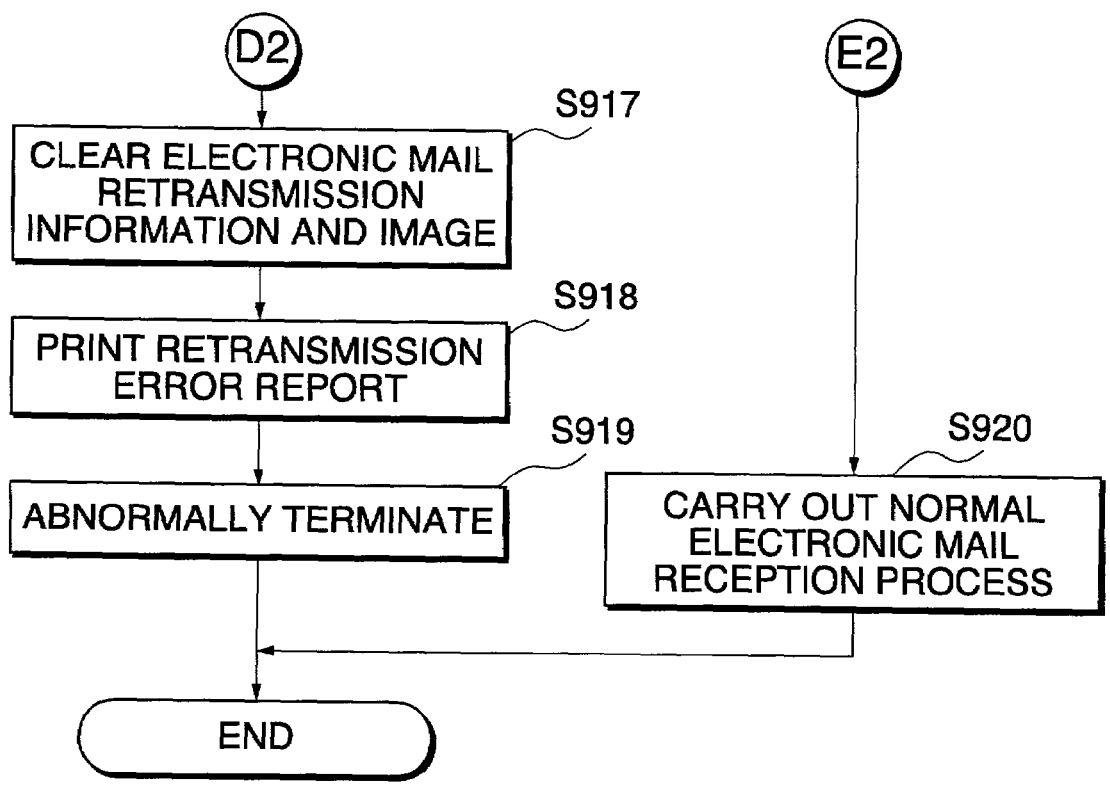

If there is no image data corresponding to the electronic mail identification information on the error notification mail, the program proceeds to a step S917 in FIG. 24 to clear the electronic mail retransmission information and the image and print out a retransmission error report in a step S918. In the next step S919, the retransmission control process is abnormally terminated. On the other hand, if there is image data corresponding to the electronic mail identification information on the error notification mail, the program proceeds to a step S915 to acquire the corresponding image data and set the acquired image data as an image to be retransmitted. The program then proceeds to a step S909 in FIG. 21.

In the step S909, it is determined whether the resolution of the retransmission image is equal to or less than the minimum resolution written in the electronic mail retransmission information of the retransmission management table or the minimum resolution of the system. If the resolution of the retransmission image is equal to or less than the minimum resolution written in the electronic mail retransmission information of the retransmission management table or the minimum resolution of the system, the program proceeds to the step S917 in FIG. 24 since it is judged that a further retransmission is impossible. In the step S917, the electronic mail retransmission information and the image are cleared, and in the step S918 a retransmission error report is printed out. In the next step S919, the retransmission control process is abnormally terminated.

If it is possible to reduce the data size (for example, if the resolution of the retransmission image is greater than the minimum resolution written in the electronic mail retransmission information of the retransmission management table or the minimum resolution of the system), the program proceeds to a step S910 to carry out the data size reduction process shown in FIG. 43-FIG. 50 (e.g. the conversion of the retransmission image into an image of a one-step lower resolution). In the next step S911, information required for carrying out the retransmission control process (e.g. the resolution of an image into which the image is converted in the case where the electronic mail retransmission information storage mode is effectively set) is stored as the electronic mail retransmission information. The program then proceeds to a step S912 to carry out the electronic mail data conversion process. The program then proceeds to a step S922 to increment the number of retransmissions 1507 in the electronic mail retransmission information in FIG. 38. Then, the same procedures as those executed from the step S808 in FIG. 7 are carried out to retransmit the electronic mail.

In the step S906, if the analysis result C indicates that an image is attached to the error notification mail, the program proceeds to a step S907 to carry out an electronic mail data inversion process. A detailed description of the electronic mail data inversion process will be given later. The program proceeds to a step S908 to set the image attached to the error notification mail as an image to be retransmitted.

The program then proceeds to the step S909 where it is determined whether it is possible to reduce the data size (for example, if the resolution of the retransmission image is greater than the minimum resolution written in the electronic mail retransmission information of the retransmission management table or the minimum resolution of the system). According to the result of the determination, the above described operations are carried out.

There will now be described the error notification mail analyzing process with reference to FIGS. 29-35. FIGS. 29-35 are flow charts showing the procedure for carrying out the error notification mail analyzing process in the step S903 in FIG. 21.

Figure 29:
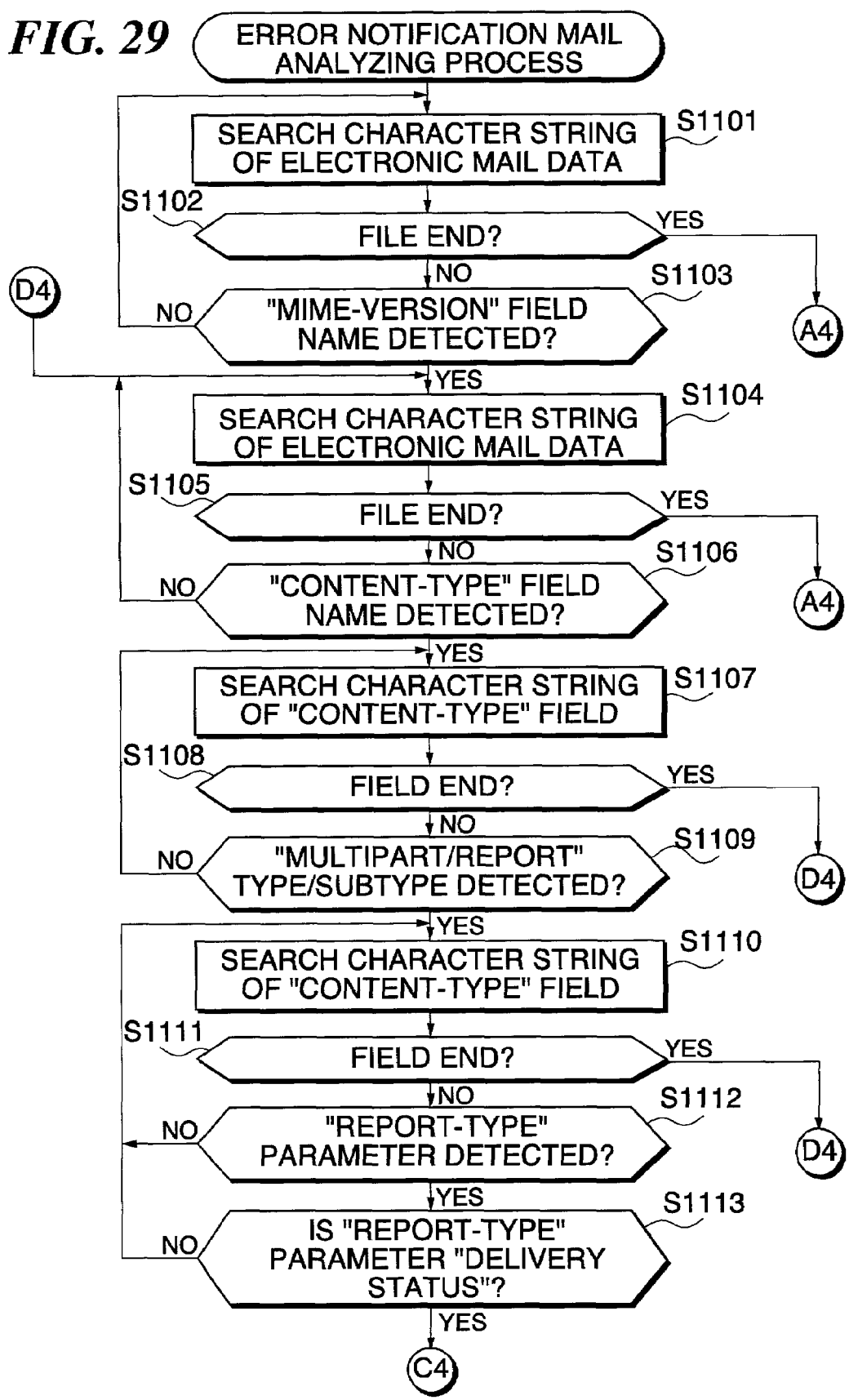
FIGS. 29-35 are flow charts showing the procedure for analyzing an error notification mail in a step S903 in FIG. 21.
Figure 30:
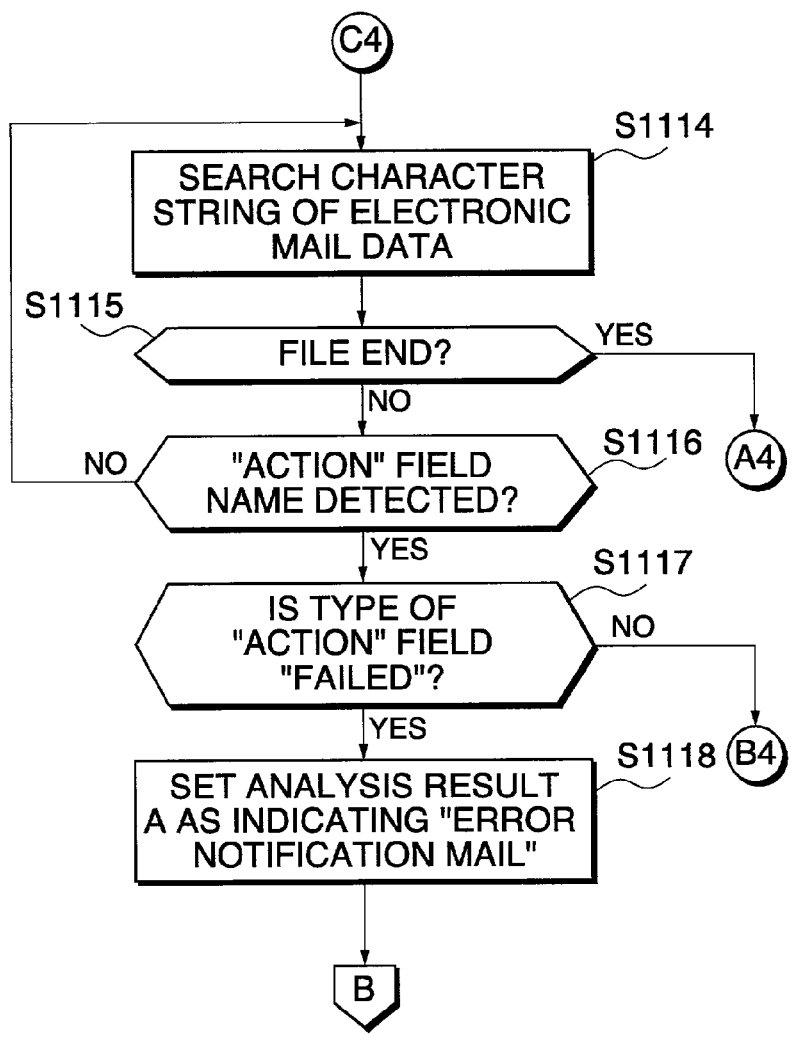

In the error notification mail analyzing process, first, a character string of received electronic mail data is searched in a step S1101 as shown in FIG. 29. If the end of the file is detected in the next step S1112, the program proceeds to a step S1119 in FIG. 31 to set the analysis result A as indicating "non error notification mail" and terminate the error notification mail analyzing process. If a "MIME_Version" field is detected without the end of the file being detected, the program proceeds to a step S1104.

In the step S1104, the search for a character string of the electronic mail data is continued. If the end of the file is detected in the next step S1105, the program proceeds to the step S1119 in FIG. 31 to set the analysis result A as indicating "non error notification mail" and terminate the error notification mail analyzing process. If a "Content_Type" field is detected in a step S1106 without the end of the file being detected, the program proceeds to a step S1107.

In the step S1107, a character string in the "Content_Type" field is searched. If the end of the field is detected in the next step S1108, the program proceeds to a step S1142 in FIG. 35 to set the analysis result B as being "other error". In the next step S1143, the analysis result C is set to indicate that "no image is attached" and the error notification mail analyzing process is terminated. If a "multipart/report" type and a subtype are detected in a step S1109 without the end of the file being detected, the program proceeds to a step S1110.

In the step S1110, the search for a character string in the "Content_Type" field is continued. If the end of the field is detected in the next step S1111, the program proceeds to the step S1142 in FIG. 35 to set the analysis result B as indicating "other error". In the next step S1143, the analysis result C is set as indicating "no image is attached" and the error notification mail analyzing process is terminated. If a "report_type" parameter is detected in a step S1112 without the end of the file being detected, the program proceeds to a step S1113 to determine whether the "report_type" parameter is "delivery_status" or not. If the "report_type" parameter is "delivery_status", the program proceeds to a step S1114 in FIG. 30.

Figure 31:
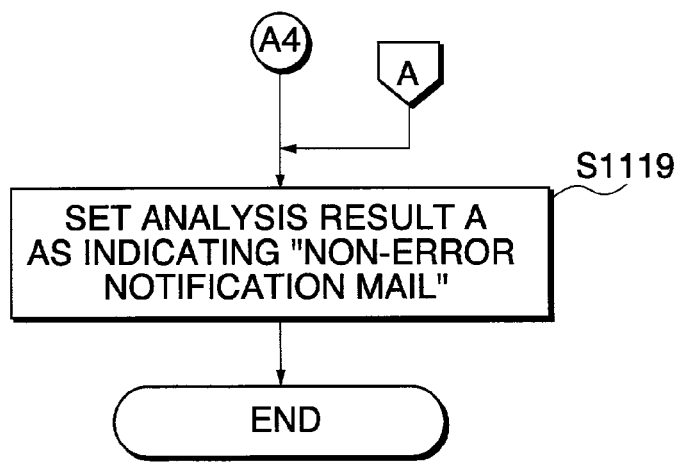
Figure 32:
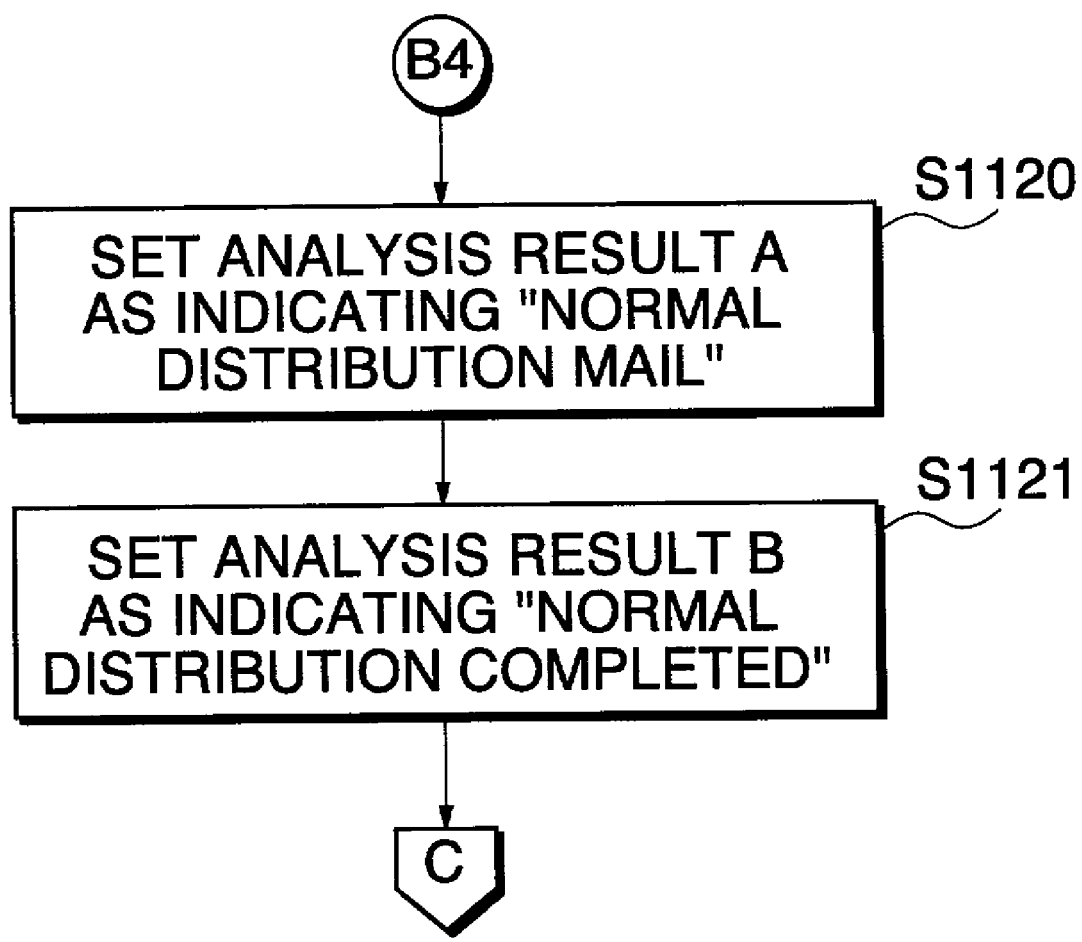

In the step S1114, the search for a character string of the electronic mail data is continued if the end of the file is detected in the next step S1115, the program proceeds to the step S1119 in FIG. 31 to set the analysis result A as indicating "non error notification mail" and terminate the error notification mail analyzing process. If an "Action" field is detected in a step S1116 without the end of the file being detected, the program proceeds to a step S1117 to determine whether the type of the "Action" field is "failed" or not. If the type of the "Action" filed is not "failed", the program proceeds to a step S1120 in FIG. 32 to set the analysis result B as indicating "normal distribution mail". In the next step S1121, the analysis result C is set as indicate "normal distribution completed", and the program then proceeds to a step S1130 in FIG. 34.

In the step S1130, it is determined whether a message ID check mode is set or not. The message ID check mode is a mode for determining whether only an electronic mail transmitted from the digital copying machine 203 should be retransmitted after reduction of the data size of its attached image according to a received error notification mail (DSN message)related to the electronic mail. If the message ID check mode is not set, even an electronic mail transmitted from another electronic mail client can be retransmitted after reducing the data size of its attached image according to an error notification mail related to the electronic mail.

Figure 35:
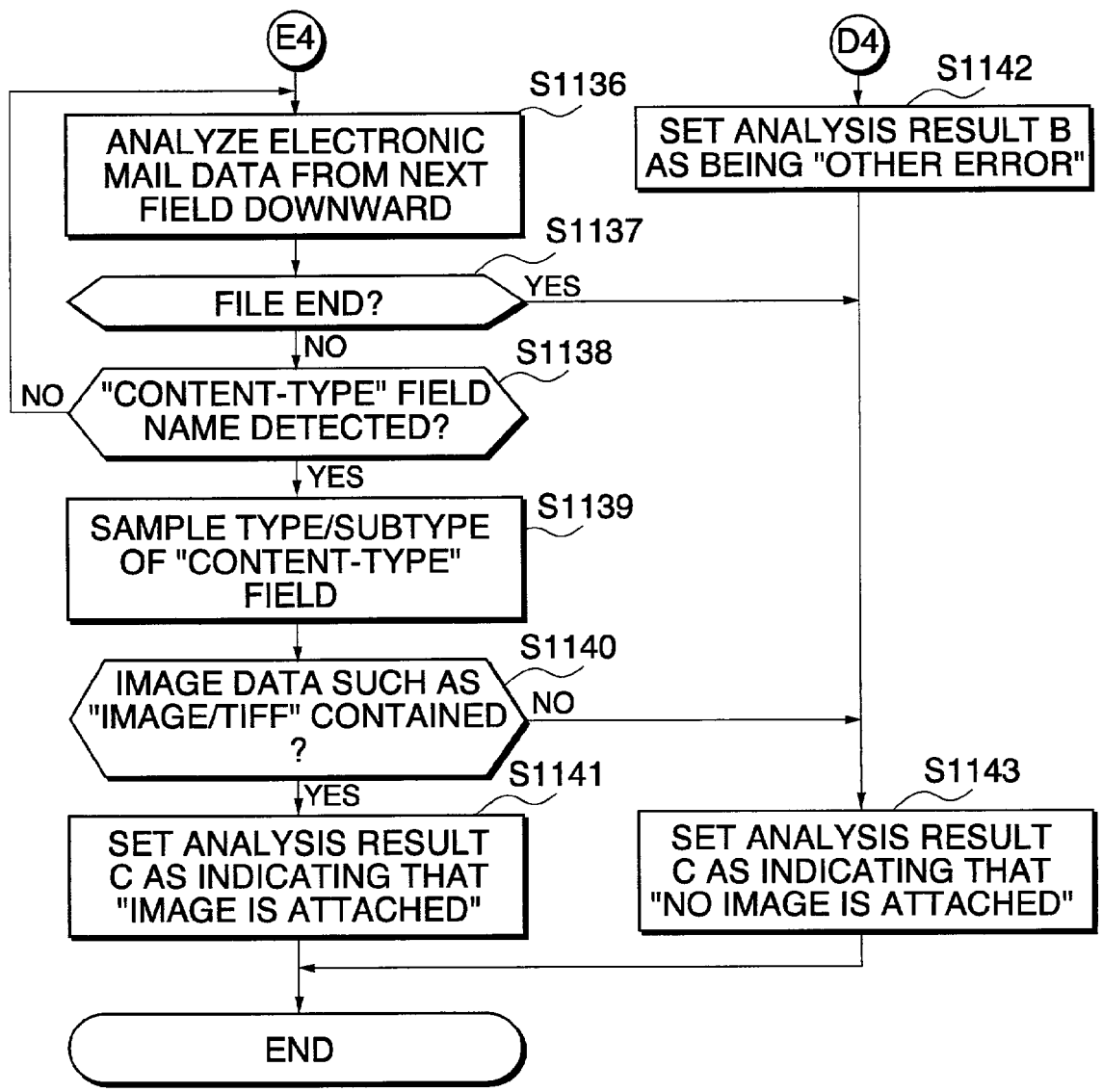

If the message ID check mode is not set, the program proceeds to a step S1136 in FIG. 35 to analyze electronic mail data from the next field downward. If the end of the file is detected in the next step S1137, the program proceeds to a step S1143 to set the analysis result C as indicating that "no image is attached" and terminate the error notification mail analyzing process. If the "Content_Type" field is detected in a step S1138 without the end of the file being detected, the program proceeds to a step S1139.

In the step S1139, a type/subtype of the "Content_Field" is sampled. In the next step S1140, it is determined whether or not image data such as "image/tiff" is contained. If no, the program proceeds to a step S1143 to set the analysis result C as indicating that "no image is attached" and terminate the error notification analyzing process.

If image data such as "image/tiff" is contained, the program proceeds to a step S1141 to set the analysis result C as indicating that "an image is attached" and terminate the error notification mail analyzing process.

If it is determined in the step S1130 that the message ID check mode is set, the program proceeds to a step S1131 to search electronic mail data from a "Status" field downward. If the end of the file is detected in the next step S1132, the program proceeds to a step S1119 in FIG. 31 to set the analysis result A as indicating "non error notification mail" and terminate the error notification analyzing process. If a "Masage_ID" field is detected in a step S1133 without the end of the file being detected, the program proceeds to a step S1134 to sample a value of the "Masage_ID" field. It is determined in the next step S1135 whether or not the sampled ID is an ID of a message outputted from the present digital-copying machine. If no, the program proceeds to the step S1119 to set the analysis result A as indicating "non error notification mail" and terminate the error notification mail analyzing process. If yes, the program proceeds to a step S1136 in FIG. 35. The procedures from the step S1136 downward are carried out in the same manner as described above, and thus, a description thereof will be omitted.

If the type of the "Action" field is "failed" in the step S1117, the program proceeds to a step S1118 to set the analysis result A as indicating "error notification mail". The program then proceeds to a step S1122 in FIG. 33 to continue searching a character string of the electronic mail data. If the end of the file is detected in the next step S1123, the program proceeds to the step S1119 in FIG. 31 to set the analysis result A as indicating "non error notification mail" and terminate the error notification mail analyzing process. If the "Status" field is detected in the step S1124 without the end of the file being detected, the program proceeds to a step S1125.

In the step S1125, the contents of the "Status" field is searched. If the end of the field is detected in the next step S1126, the program proceeds to the step S1142 to set the analysis result B as indicating "other error". In the next step S1143, the analysis result C is set as indicating "no image is attached" and the error notification mail analyzing process is terminated. If the type of the "Status" field is detected as being "5.2.3" "Message length exceeds administrative limit" in a step S1127 without the end of the field being detected, the program proceeds to a step S1129 in FIG. 34. On the other hand, if the type of the "Status" field is detected as being "5.3.4" "Message too big for system" in a step S1128, the program proceeds to the step S1129.

In the step S1129, the analysis result B is set to indicate "excessive message length", and the program proceeds to a step S1130. The procedures from the step S1130 downward are carried out in the same manner as described above, and thus, a description thereof will be omitted.

There will now be described the electronic mail data inversion process with reference to FIGS. 25-28. FIGS. 25-28 are flow charts showing the procedure for carrying out the electronic mail data inversion process in the step S907 in FIG. 21.

The electronic mail data inversion process is carried out in order to sample an attached image from an error notification mail (DSN mail) returned in response to an electronic mail transmitted from the digital copying machine 203.

Figure 25:
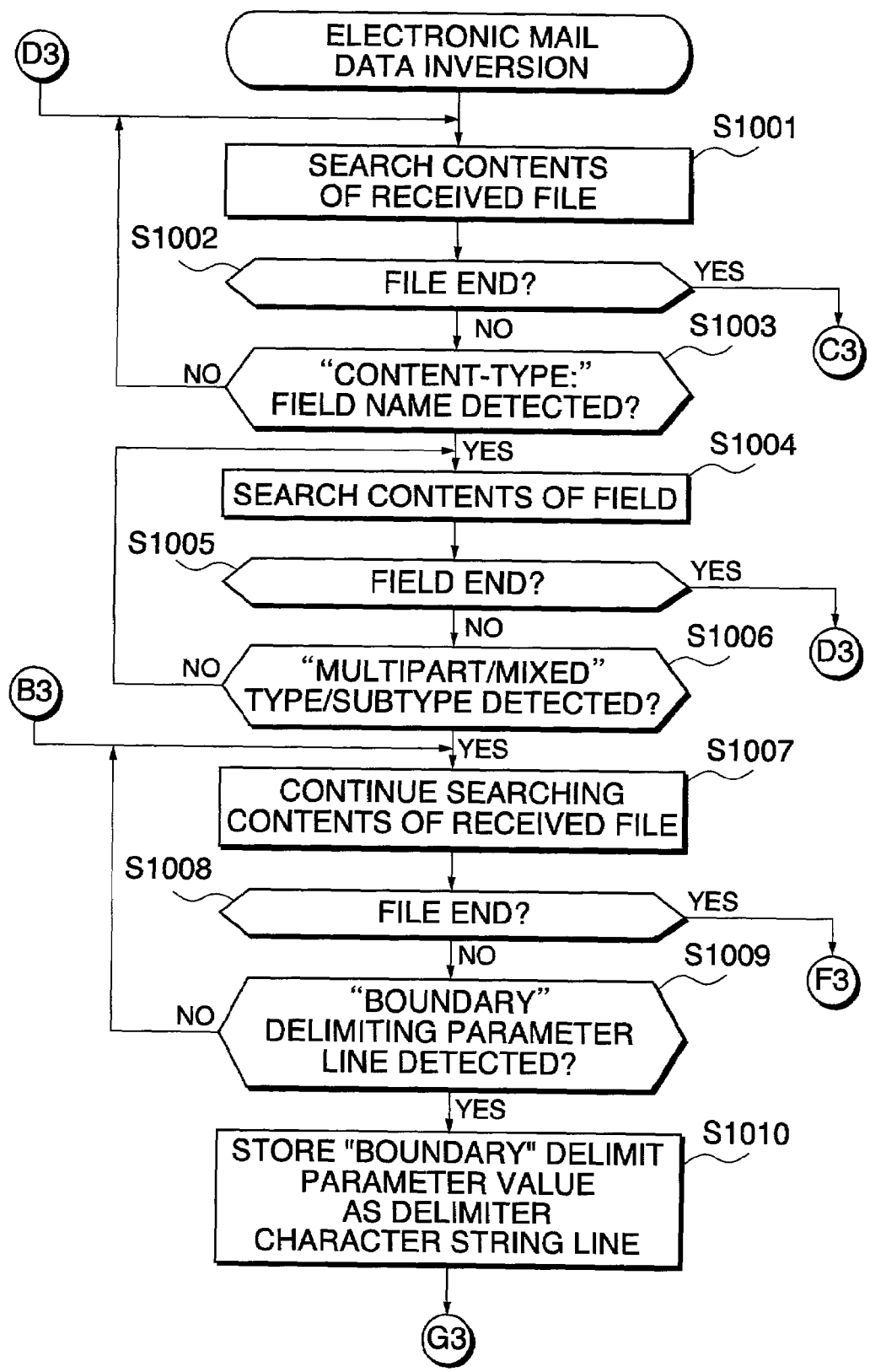

In the electronic mail data inversion process, first, the contents of a file of a received error notification mail is searched in a step S1001 as shown in FIG. 25. If the end of the file is detected in the next step S1002, the program proceeds to a step S1017 in FIG. 26 to determine that no image data is attached to the present page and terminate the electronic mail data inversion process. If the "Content_Type" field is detected in a step S1003 without the end of the file being detected, the program proceeds to a step S1004.

In the step S1004, the contents of "Content_Type" field is searched. If the end of the field is detected in the next step S1005, the program returns to the step S001 to continue searching the received file. If the "multipart/mixed" type/subtype is detected in the step S1006 without the end of the field being detected, the program proceeds to a step S1007.

In the step S1007, the search for the contents of the received file is continued. If the end of the file is detected in the next step S1008, the program proceeds to a step S1034 in FIG. 26 to determine whether or not a page image data storage termination flag is ON. If the page image data storage termination flag is ON, the program proceeds to a step S1035 to determine that the sampling of the attached image has been normally terminated, and then terminate the electronic mail data inversion process. If the page image data storage termination flag is not ON, the program proceeds to a step S1017 to determine that the present page contains no attached image data, and then terminate the electronic mail data inversion process. If a "boundary" delimit parameter line is detected in a step S1009 without the end of the file being detected, the program proceeds to a step S1010 to store the "boundary" delimit parameter value as a delimiter character string in the RAM 2002.

Figure 26:
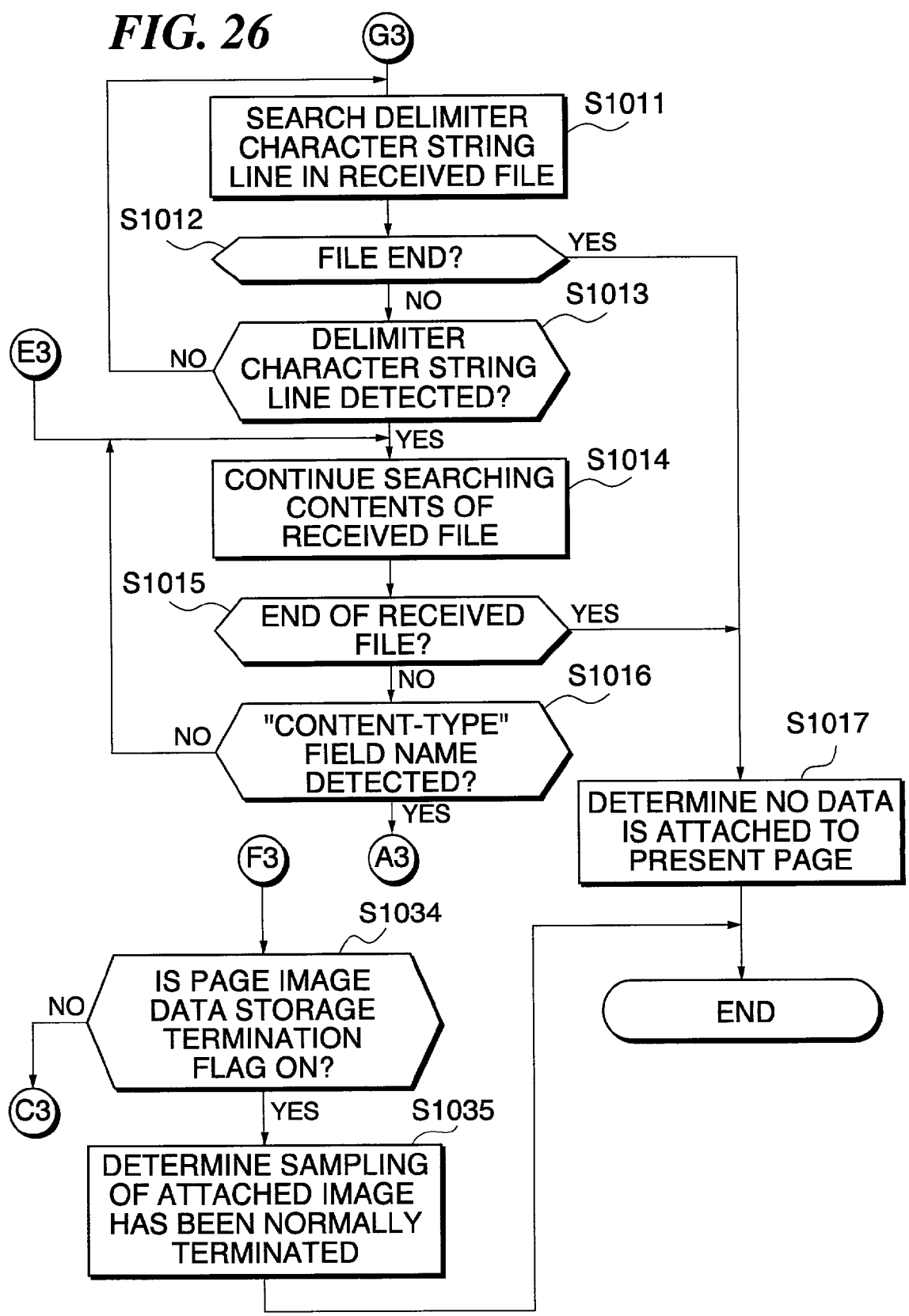
Figure 27:
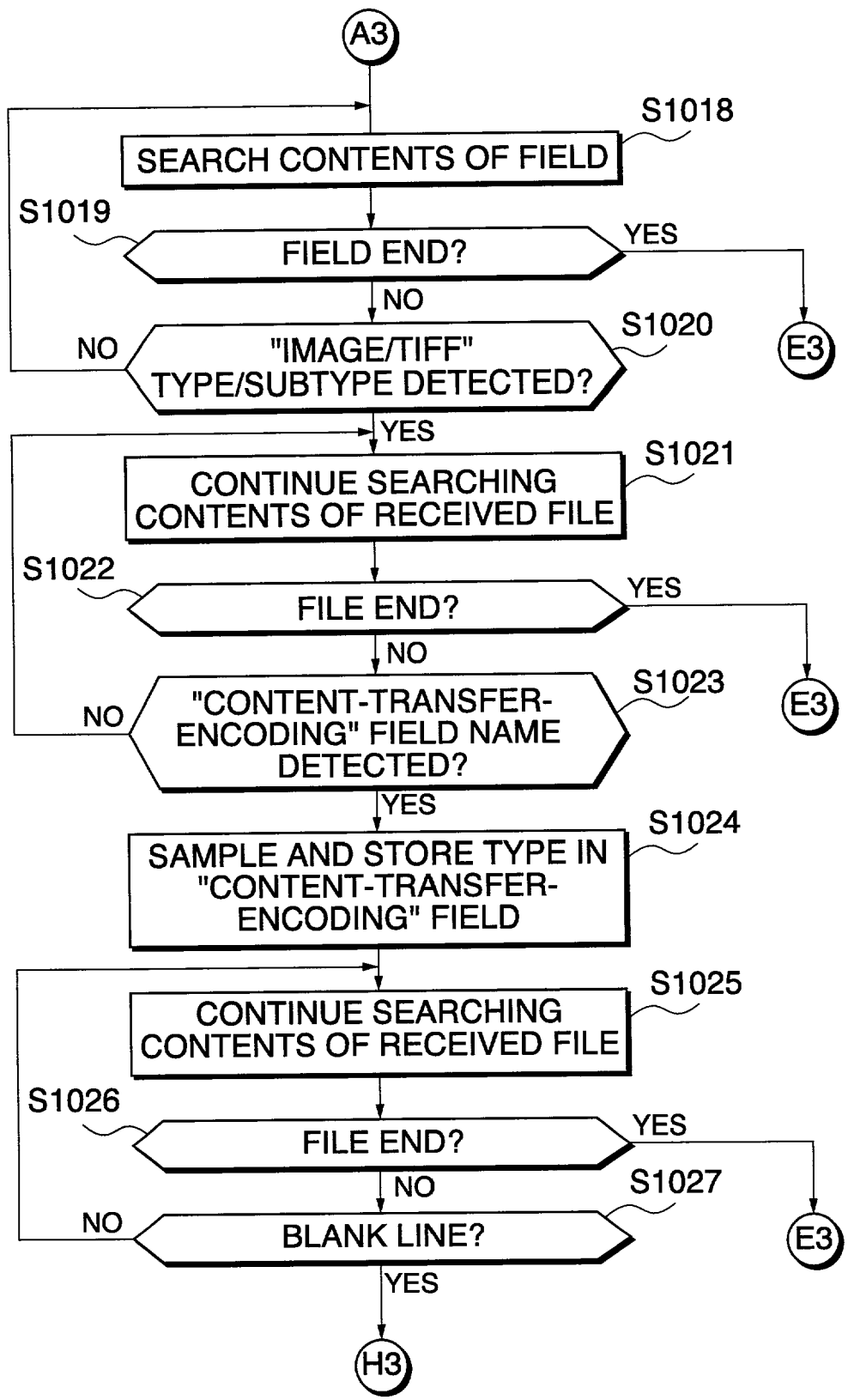
Figure 28:
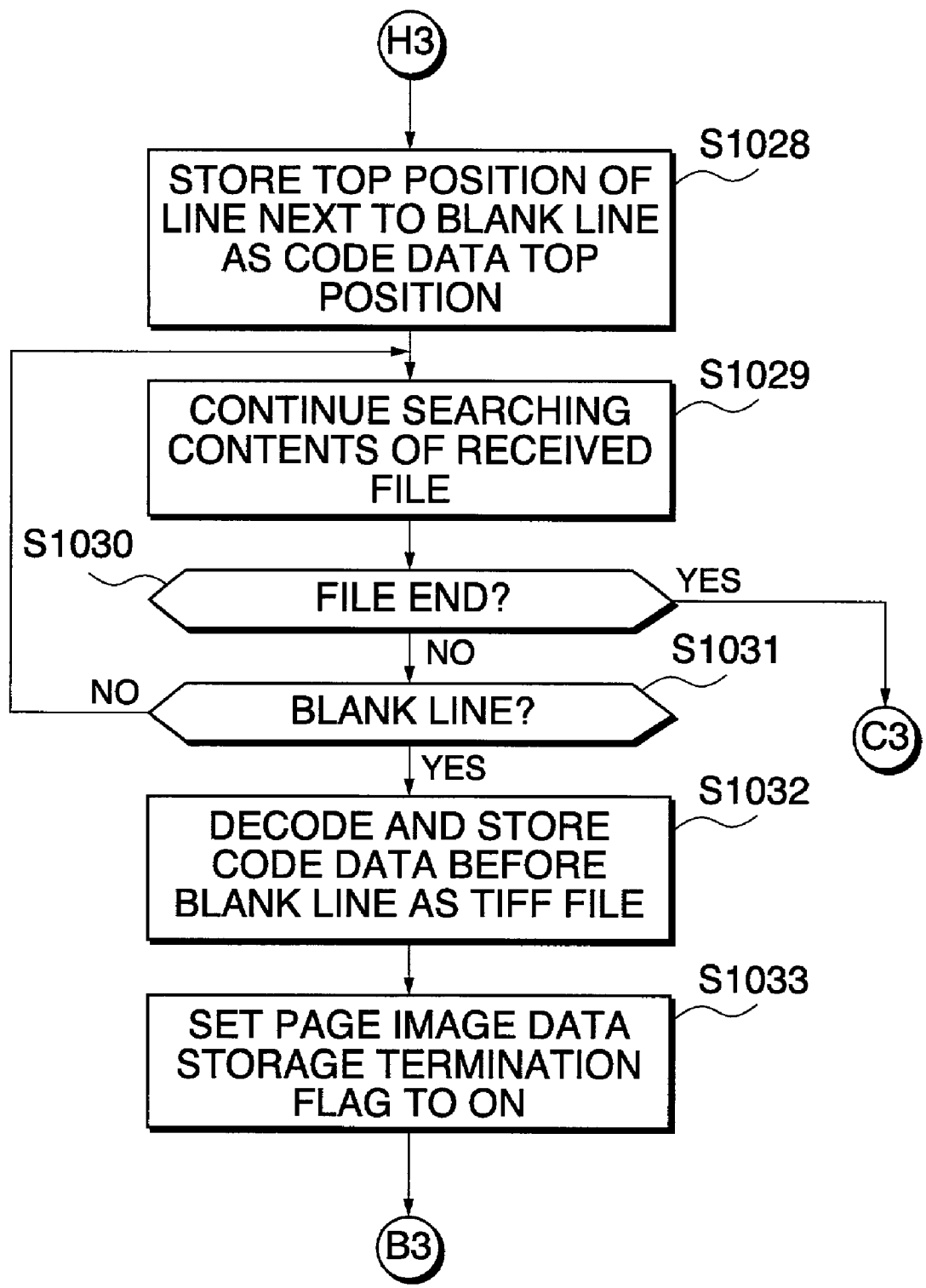

The program then proceeds to a step S1011 in FIG. 26 to search a delimiter string in the received file. If the end of the file is detected in the next step S1012, the program proceeds to the step S1017 to determine that the present page contains no attached image data, and then terminate the electronic mail data inversion process. If a delimiter string is detected without the end of the file being detected, the program proceeds to a step S1014 to continue searching the contents of the received file. If the end of the received file is detected in the next step S1015, the program proceeds to the step S1017 to determine that the present page contains no attached image data, and then terminate the electronic mail data inversion process. If the "Content_Type" field is detected in a step S1016 without the end of the received file being detected, the program proceeds to a step S1018 in FIG. 27.

In the step S1018, the contents of the "Content_Type" field is searched. If the end of the field is detected in the next step S1019, the program returns to the step S1014 to continue searching the contents of the received file. On the other hand, if a type/subtype of the "image/tiff" data is detected in a step S1020 without the end of the field being detected, the program proceeds to a step S1021 to continue searching the contents of the received file. If the end of the file is detected in the next step S1022, the program proceeds to the step S1017 to determine that the present page contains no attached image data, and then terminate the electronic mail data inversion process. If a "Content-Transfer-Encoding" field is detected in a step S1023 without the end of the file being detected, the program proceeds to a step S1024 to sample a type in "Content-Transfer-Encoding" field and store it in the RAM 2002.

The program then proceeds to a step S1025 to continue searching the contents of the received file. If the end of the file is detected in the next step S1026, the program proceeds to the step S1017 in FIG. 26 to determine that the present page contains no attached image data, and then terminate the electronic mail data inversion process. If a blank line (only for carriage return or line feed) is detected in a step S1027 without the end of the file being detected, the program proceeds to a step S1028 in FIG. 28 to store the top position of a line next to the blank line as a code data top position in the RAM 2002.

The program then proceeds to a step S1029 to continue searching the contents of the received file. If the end of the file is detected in the next step S1030, the program proceeds to the step S1017 to determine that the present page contains no attached image data, and then terminate the electronic mail data inversion process. If a blank line (only for carriage return or line feed) is detected in a step S1031 without the end of the file being detected, the program proceeds to a step S1032 to decode code data before the blank line and store the decoded data as a TIFF file in the HDD 2004. The page image data storage termination flag is set to ON in the next step S1033, and the program then proceeds to the step S1007 in FIG. 25 to continue searching the contents of the received file.

Referring next to FIGS. 36 and 37, there will be described a document retransmission report outputted upon successful retransmission of an electronic mail, and a document retransmission report outputted upon unsuccessful retransmission of an electronic mail. FIG. 36 shows an example of a document retransmission report, and FIG. 37 shows a document retransmission error report.

For example, if an error notification mail indicating the excessive message length is returned in response to a transmitted electronic mail (the step S905 in FIG. 21) to which image data read from a document at a resolution of 600×600 DPI is attached, the image data attached to the electronic mail is converted into image data of, e.g. a one-step lower resolution (the step S910 in FIG. 21). The electronic mail with the resolution converted image data attached thereto is retransmitted (the step S808 in FIG. 17). If the electronic mail is successfully retransmitted (the step S809 in FIG. 19), a retransmission report as shown in FIG. 35 is outputted (the step S815 in FIG. 19). Information indicating that the electronic mail has been transmitted, information on the original document, and information on the retransmission are written in the retransmission report. The information on the retransmission contains the resolution of the retransmission, the number of retransmissions, and the like. If the electronic mail is successfully retransmitted with the data size reduced, it is possible to know the details of the successful retransmission, which can be referred to in determining the conditions for transmitting an electronic mail to the same address next time.

If an error notification mail indicating the excessive mail length is returned in response to a transmitted electronic mail to which image data read from a document at a resolution of 600×600 DPI is attached, the retransmission is repeated while the resolution is sequentially lowered to the minimum resolution, and the electronic mail with the image data of the minimum resolution attached is unsuccessfully retransmitted, a retransmission error report as shown in FIG. 37 is outputted (the step S918 in FIG. 24). Information indicating that the electronic mail has not been transmitted due to the shortage of storage capacity of the destination address, information on the original document, and information on the retransmission are written in the retransmission error report. The information on the retransmission contains the resolution in the final retransmission, the number of retransmissions, and the like. Thus, even if the electronic mail is unsuccessfully retransmitted with the resolution changed, it is possible to know the details of the retransmission.

Figure 39:
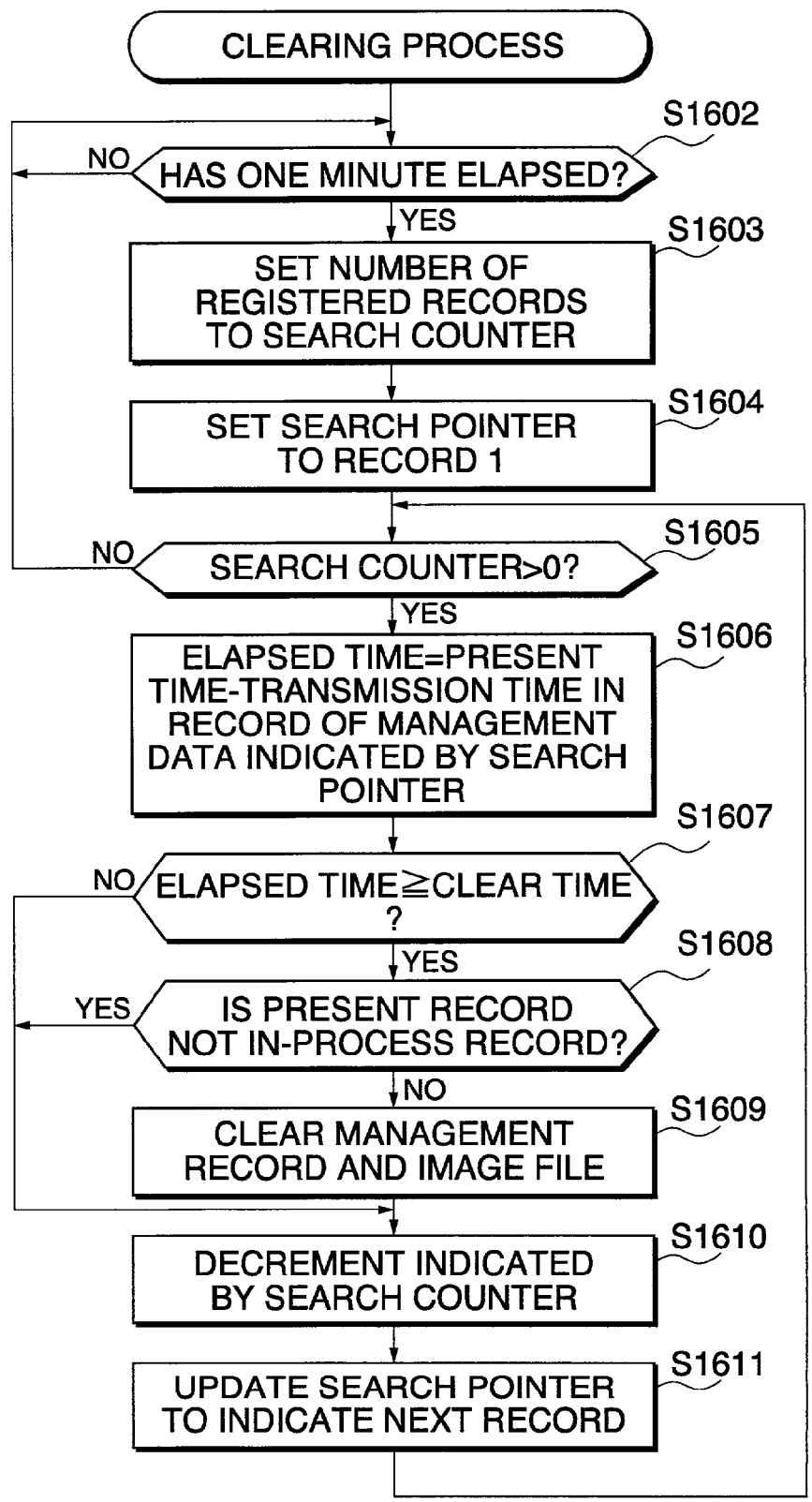
FIG. 39 is a flow chart showing the procedure for clearing data by the digital copying machine in FIG. 1.

Referring next to FIG. 39, there will be described a data clearing process for clearing the retransmission management data (FIG. 38). FIG. 39 is a flow chart showing the procedure for carrying out the data clearing process by the digital copying machine in FIG. 1.

As shown in FIG. 39, first, the lapse of one minute is waited for in a step S1602. The number of registered records is set in a search counter in the next step S1603, and a search pointer is then set to a record [1] in a step S1604.

The program then proceeds to a step S1605 to determine whether the search counter indicates a number in excess of 0. If the search counter does not indicates a value in excess of 0, the program returns to the step S1602. If the search counter indicates a value in excess of 0, the program proceeds to a step S1606.

In the step S1606, elapsed time is calculated by subtracting the "transmission time" in the record of the management data indicated by the search pointer from the present time. In the next step S1607, it is determined whether or not a relationship of elapsed time≧clear time (1503 in FIG. 38) holds. If this relationship holds, the program proceeds to a step S1608 to determine whether the present record is an in-process record. If the present record is not an in-process record, the program proceeds to a step S1609 to erase an image file represented by the "image file name" (1511 in FIG. 38) in the record indicated by the search pointer and blank the record, then decrementing the number of registered records by one. The program then proceeds to a step S1610.

If it is determined in the step S1607 that the relationship of elapsed time≧clear time (1503 in FIG. 38) holds, or if it is determined in the step S1608 that the present record is an in-process record, the program proceeds to a step S1610 while skipping the step S1609.

In the step S1610, a value indicated by the search counter is decremented. In the next step S1611, the search pointer is updated to indicate the next record, and the program then returns to the step S1605.

According to the present embodiment described above, upon reception of an error notification mail returned in response to a transmitted electronic mail with an attached image, the error notification mail is analyzed. If the result of the analysis indicates that the error is attributed to the excessive data size of the electronic mail, the image data attached to the electronic mail is acquired and reduced in data size by lowering the resolution or the like, and then the electronic mail is retransmitted with the thus size reduced image data attached. Thus, if a transmission error of an electronic mail occurs due to the excessive data size of the electronic mail, it is possible to quickly retransmit the electronic mail after reducing the data size per mail without taking time and labor.

Further, the data size can be reduced in various methods, and it is therefore possible to select a suitable data size reduction method to meet user's wishes.

Further, even if a received error notification mail is related to an electronic mail transmitted from another electronic mail client, the electronic mail can be retransmitted by lowering the resolution of an attached image, depending upon whether the message ID check mode is set or not. Therefore, the digital copying machine 203 can easily be constructed as a retransmission server that is capable of retransmitting not only electronic mails transmitted from itself but also electronic mails transmitted from other machines to satisfy a wide variety of user's needs.

The attached image data should not necessarily be read by the scanner, but it may be inputted from a variety of sources such as a digital camera, and an image editing software, or may be image data received by another machine.

According to the embodiment described above, the digital copying machine is used as the communication apparatus, but the communication apparatus of the present invention may be implemented by a system that is comprised of a personal computer and peripheral devices. In this case, it goes without saying that the functions of the above described embodiment can be realized in the form of a program as software, whereby the object of the present invention can be attained. In an example of actual implementation, the functions of the above described embodiment may be realized by supplying a system or an apparatus with a storage medium storing a program code of software for executing the functions of the above described embodiment (shown in the flow charts of FIGS. 16-35 and 39), and a computer (or CPU or MPU) and causing the system or the apparatus to read and execute the program code stored in the storage medium.

In this case, the program code read out from the storage medium realizes the functions of the above described embodiment, so that the storage medium storing the program code also constitutes the present invention.

The storage medium for providing the program code may be, for example, a floppy disk, a hard disk, an optical disk, a magneto-optical disk, a CD-ROM, CD-R, a magnetic tape, a non-volatile memory card, or a ROM.

It goes without saying that the functions of the above described embodiment may be accomplished not only by executing a program code read out by a computer but also by causing an OS (Operating System) or the like which operates on the computer to perform a part or the whole of the actual operations based on instructions of the program code.

It goes without saying that the functions in the above described embodiment may be accomplished by writing a program code read out from a storage medium in an expansion board inserted into a computer or a memory provided in an expansion unit connected to a computer, and then causing a CPU, etc. provided in the expansion board or the expansion unit to perform a part or the whole of the actual operations based on instructions of the program code.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A communication apparatus comprising:
connecting means for connecting the communication apparatus to a communication network containing an electronic mail exchange device;
input means for inputting image data representing an image;
transmitting means for transmitting an electronic mail, to which the image data inputted by said input means is attached, via said connecting means;
receiving means for receiving an electronic mail as notification of an error, via said connecting means;
analyzing means for analyzing the electronic mail as notification of the error received by said receiving means;
converting means for converting a size of the image data, inputted by said input means, into a smaller size according to an analysis result obtained by said analyzing means;
control means for automatically carrying out a controlling operation so as to retransmit the electronic mail, to which the image data with the size thereof converted by said converting means is attached, by said transmitting means, in response to said receiving means receiving the electronic mail for notifying the error which indicates that the size of the electronic mail transmitted by said transmitting means is too large; and
output means for outputting a report including at least a transmitting date, a destination, original information for specifying a parameter of the image data input by said input means, and retransmission information for specifying a parameter of the image data which has been converted by said converting means, in a case where a retransmitting of the electronic mail by said transmitting means has been carried out.

2. A communication apparatus according to claim 1, wherein said converting means converts the size of the image data specified by the electronic mail analyzed by said analyzing means.

3. A communication apparatus according to claim 1, wherein said converting means reduces the size of the image data by lowering a resolution of an image represented by the image data inputted by said input means.

4. A communication apparatus according to claim 1, wherein said converting means reduces the size of the image data by reducing a size of an image represented by the image data inputted by said input means.

5. A communication apparatus according to claim 1, wherein said converting means reduces a size per electronic mail by dividing the image data inputted by said input means into a plurality of pieces.

6. A communication apparatus according to claim 1, wherein said converting means reduces the size of the image data by raising a compression rate of the image data inputted by said input means.

7. A communication apparatus according to claim 1, wherein said converting means reduces the size of the image data by converting the image data which is color image data, inputted by said input means, into black-and-white image data.

8. A communication apparatus according to claim 1, wherein said converting means reduces the size of the image data by converting the image data which is multivalued image data, inputted by said input means, into binary image data.

9. A communication apparatus according to claim 1, further comprising setting means for setting, for said converting means, one of a plurality of conversion methods to be used, and wherein said converting means converts the size of the image data by the conversion method set by said setting means.

10. A communication apparatus according to claim 1, wherein said converting means converts the size of the image data by using a combination of a plurality of converting methods.

11. A communication apparatus according to claim 1, wherein said control means repeats a conversion by said converting means and a retransmission by said transmitting means every time said receiving means receives an electronic mail as notification of an error.

12. A communication method used in a communication apparatus connected via connecting means to a communication network containing an electronic mail exchange device, the communication method comprising:
an inputting step, of inputting image data representing an image;
a transmitting step, of transmitting an electronic mail to which the image data inputted in said inputting step is attached, via the connecting means;
a receiving step, of receiving an electronic mail as notification of an error, via the connecting means;
an analyzing step, of analyzing the electronic mail as notification of the error, received in said receiving step;
a converting step, of converting a size of the image data inputted in said inputting step into a smaller size according to an analysis result obtained in said analyzing step;
a controlling step, of automatically carrying out a controlling operation so as to retransmit the electronic mail, to which the image data with the size thereof converted in said converting step is attached, by performance of said transmitting step, in response to reception in said receiving step of the electronic mail as notification of the error which indicates that the size of the electronic mail transmitted in said transmitting step is too large; and
an outputting step, of outputting a report including at least a transmitting date, a destination, original information for specifying a parameter of the image data input in said inputting step, and retransmission information for specifying a parameter of the image data which has been converted in said converting step, in a case where the retransmitting of the electronic mail in said transmitting step has been carried out.

13. A communication method according to claim 12, wherein said converting step includes converting the size of the image data specified by the electronic mail analyzed in said analyzing step.

14. A communication method according to claim 12, wherein said converting step includes reducing the size of the image data by lowering a resolution of an image represented by the image data inputted in said input step.

15. A communication method according to claim 12, wherein said converting step includes reducing the size of the image data by reducing a size of an image represented by the image data inputted in said input step.

16. A communication method according to claim 12, wherein said converting step includes reducing a size per electronic mail by dividing the image data inputted in said input step into a plurality of pieces.

17. A communication method according to claim 12, wherein said converting step includes reducing the size of the image data by raising a compression rate of the image data inputted in said input step.

18. A communication method according to claim 12, wherein said converting step includes reducing the size of the image data by converting the image data which is color image data, inputted in said input step, into black-and-white image data.

19. A communication method according to claim 12, wherein said converting step includes reducing the size of the image data by converting the image data which is multivalued image data, inputted in said input step, into binary image data.

20. A communication method according to claim 12, further comprising a setting step, of setting, for said converting step, one of a plurality of conversion methods to be used, and wherein said converting step includes converting the size of the image data by means of a conversion method set in said setting step.

21. A communication method according to claim 12, wherein said converting step includes converting the size of the image data by using a combination of a plurality of converting methods.

22. A communication method according to claim 12, wherein said controlling step includes repeating a conversion in said converting step and a retransmission in said transmitting step every time an electronic mail as notification for an error is received in said receiving step.

23. A computer-readable storage medium which stores a program for causing a computer to execute a communication method by a computer, the communication method used in a communication apparatus connected via connecting means to a communication network containing an electronic mail exchange device, the program comprising:

an inputting step, of inputting image data representing an image;

a transmitting step, of transmitting an electronic mail to which the image data inputted in said inputting step is attached, via the connecting means;

a receiving step, of receiving an electronic mail as notification of an error, via the connecting means;

an analyzing step, of analyzing the electronic mail as notification of the error, received in said receiving step;

a converting step, of converting a size of the image data inputted in said inputting step into a smaller size according to an analysis result obtained in said analyzing step;

a controlling step, of automatically carrying out a controlling operation so as to retransmit the electronic mail to which the image data with the size thereof converted in said converting step is attached, by execution of said transmitting step, in response to reception in said receiving step of the electronic mail as notification of the error which indicates that the size of the electronic mail transmitted in said transmitting step is too large; and an outputting step, of outputting a report including at least a transmitting date, a destination, original information for specifying a parameter of the image data input in said inputting step, and retransmission information for specifying a parameter of the image data which has been converted in said converting step, in a case where the retransmitting of the electronic mail in said transmitting step has been carried out.

* * * * *

UNITED STATES PATENT AND TRADEMARK OFFICE
CERTIFICATE OF CORRECTION

PATENT NO. : 7,397,575 B2 Page 1 of 1
APPLICATION NO. : 09/918499
DATED : July 8, 2008
INVENTOR(S) : Kenzo Sekiguchi It is certified that error appears in the above-identified patent and that said Letters Patent is hereby corrected as shown below:

ON THE TITLE PAGE ITEM [56] REFERENCES CITED:

FOREIGN PATENT DOCUMENTS, "11196218 A" should read --11-196218 A--.

COLUMN 3:

Line 24, "image-data." should read --image data--.

COLUMN 4:

Line 11, "FIG 1;" should read --FIG. 1; ¶FIGS. 21-24 are flow charts showing the procedure for executing the retransmission controlling process by the digital copying machine in FIG. 1;--.
Line 12, "FIGS. 21-28" should read --FIGS. 25-28--.

Signed and Sealed this

Seventh Day of April, 2009

JOHN DOLL
*Acting Director of the United States Patent and Trademark Office*